US012281050B2

(12) United States Patent
Gonthier et al.

(10) Patent No.: US 12,281,050 B2
(45) Date of Patent: Apr. 22, 2025

(54) PROCESS FOR DRYING ANODE COATING

(71) Applicants: Ghislain Gonthier, Blainville (CA); Claude Allaire, St-Eustache (CA)

(72) Inventors: Ghislain Gonthier, Blainville (CA); Claude Allaire, St-Eustache (CA)

(73) Assignee: Ghislain Gonthier, Blainville (CA)

( * ) Notice: Subject to any disclaimer, the term of this patent is extended or adjusted under 35 U.S.C. 154(b) by 373 days.

(21) Appl. No.: 17/768,931

(22) PCT Filed: Oct. 16, 2020

(86) PCT No.: PCT/CA2020/051391
§ 371 (c)(1),
(2) Date: Apr. 14, 2022

(87) PCT Pub. No.: WO2021/072548
PCT Pub. Date: Apr. 22, 2021

(65) Prior Publication Data
US 2023/0174436 A1   Jun. 8, 2023

Related U.S. Application Data

(60) Provisional application No. 62/938,543, filed on Nov. 21, 2019, provisional application No. 62/923,064, filed on Oct. 18, 2019.

(51) Int. Cl.
*C04B 41/00* (2006.01)
*C04B 41/45* (2006.01)
(Continued)

(52) U.S. Cl.
CPC ...... *C04B 41/0045* (2013.01); *C04B 41/0072* (2013.01); *C04B 41/009* (2013.01);
(Continued)

(58) Field of Classification Search
CPC .... C04B 41/0045; C04B 41/0072; F26B 3/30
See application file for complete search history.

(56) References Cited

U.S. PATENT DOCUMENTS 3,859,198 A * 1/1975 Emblem ............... C25C 3/125
106/286.2
4,567,103 A   1/1986 Sara
(Continued)

FOREIGN PATENT DOCUMENTS

CN   103132104 A   6/2013
CN   104005056 A   8/2014
(Continued)

OTHER PUBLICATIONS

Jahedi et al., "Anode coating to prevent airburn in aluminium smelters", Light Metals 2009—TMS Annual Meeting, (20090000), pp. 951-955.
(Continued)

*Primary Examiner* — Dah-Wei D. Yuan
*Assistant Examiner* — Kristen A Dagenais
(74) *Attorney, Agent, or Firm* — Benoit & Cote Inc.; Mathieu Miron

(57) ABSTRACT

The present document describes methods for drying an aqueous priming coating composition covering an external surface exposed to air of a carbon material, or an aqueous coating composition covering an intermediate substrate covering an external surface exposed to air of a carbon material,
(Continued)

to form a layer thereon. Also described are systems for drying a coating composition covering a surface of a carbon material.

21 Claims, 24 Drawing Sheets

(51) Int. Cl.
    *C04B 41/50*     (2006.01)
    *C04B 41/52*     (2006.01)
    *C04B 41/87*     (2006.01)
    *C04B 41/89*     (2006.01)
    *F26B 3/30*     (2006.01)
    *F26B 9/06*     (2006.01)
    *F26B 21/08*     (2006.01)
    *F26B 21/10*     (2006.01)
    *F26B 21/12*     (2006.01)
    *C25C 3/12*     (2006.01)
(52) U.S. Cl.
    CPC ...... *C04B 41/4539* (2013.01); *C04B 41/5031* (2013.01); *C04B 41/522* (2013.01); *C04B 41/87* (2013.01); *C04B 41/89* (2013.01); *F26B 3/30* (2013.01); *F26B 9/06* (2013.01); *F26B 21/08* (2013.01); *F26B 21/10* (2013.01); *F26B 21/12* (2013.01); *C25C 3/125* (2013.01)

(56) References Cited

U.S. PATENT DOCUMENTS

| | | |
|---|---|---|
| 5,364,513 A | 11/1994 | Sekhar et al. |
| 6,475,358 B2 | 11/2002 | Mirtchi et al. |
| 2003/0224105 A1* | 12/2003 | Chondroudis ......... B05D 1/002 506/40 |
| 2009/0029034 A1* | 1/2009 | Jahedi ..................... C25C 3/125 427/78 |
| 2011/0000793 A1* | 1/2011 | Kruse .................... C25D 21/18 205/198 |

FOREIGN PATENT DOCUMENTS

| | | |
|---|---|---|
| EP | 0701635 B1 | 5/1998 |
| WO | WO2018/129621 A1 | 7/2018 |

OTHER PUBLICATIONS

International Search Report of PCT/CA2020/051391, Dec. 29, 2020, David Chamberlain.

* cited by examiner

PROCESS FOR DRYING ANODE COATING

CROSS-REFERENCE TO RELATED APPLICATIONS

This application is a U.S. National Phase application under 35 U.S.C. § 371 of PCT/CA20201051391, filed Oct. 16, 2020, which claims priority from and the benefit of U.S. Provisional Patent Application No. 62/923,064 filed on Oct. 18, 2019, and U.S. Provisional Patent Application No. 62/938,543 filed on Nov. 21, 2019, the specifications of which are hereby incorporated by reference in their entireties.

BACKGROUND

(a) Field

The subject matter disclosed generally relates to methods and systems for drying aqueous compositions, and more particularly methods and systems for drying aqueous priming coating compositions and aqueous priming coating compositions covering surfaces of carbon materials, to form layers thereon.

(b) RELATED PRIOR ART

Drying—free water removal—of aqueous solutions of carbonates may lead to efflorescence (anhydride carbonate powder formation), if it is performed too fast. This is the case with the carbonate coatings that contain $Li_2CO_3$, $Na_2CO_3$ and $K_2CO_3$. Among these three carbonates, the latter is the most problematic and requires drying for several hours—typically between 24 to 48 hours—to prevent efflorescence. When efflorescence takes place, the dried coating becomes deliquescent—dissolution of the carbonate into its hygroscopic absorbed water. In such conditions, the carbonate coating is damaged during the insertion of the anodes directly into the molten cryolitic bath since it promotes excessively fast absorbed water evaporation, which causes localized spalling or pop-out of the carbonate coating.

Total removal of free water from the carbonate coating prior to storage helps prevent coating damage during the coated anode storage. Indeed, if the carbonate coating continues to loose water during storage at temperature between about 2° C. and 34° C., $NaKCO_3(H_2O)_6$ (hexahydrate) prismatic crystals form. After complete free water loss in such conditions, the hexahydrate becomes unstable and decomposes to form $Na_2CO_3(H_2O)$ (monohydrate) acicular crystals. The growth of these crystals leads to the formation of free (unbounded) flakes, which are undesirable.

Furthermore, for industrial commercialization of anode protective coating chemical treatment comprising an intermediate layer followed by a carbonate coating, it should be possible to dry each layer within a few minutes. For the top paint—i.e. the carbonate coating, this must be accomplished without creating efflorescence problems.

Therefore, there is a need for processes for drying aqueous solutions of carbonates that prevent or at least mitigate efflorescence issues.

Also, there is a need for processes for drying aqueous solutions of carbonates that totally remove free water to prevent or at least mitigate water loss during storage.

Also, there is a need for processes for drying coatings for carbon materials such as anodes used in aluminum electrolysis cells that mitigate the disadvantages of the existing processes.

SUMMARY

According to an embodiment, there is provided a method for drying an aqueous priming coating composition covering an external surface exposed to air of a carbon material, to form a layer thereon,
the aqueous priming coating composition comprising a mixture of aluminum oxide ($Al_2O_3$), comprising a combination of aluminum oxide selected from the group consisting of calcined aluminum oxide, reactive aluminum oxide, and white fused aluminum oxide; and water;
the method comprising:
in an environment at a temperature of from about 74° C. to about 124° C., applying to the aqueous priming coating composition forced air at a temperature of from about 80° C. to about 126° C., a velocity of about 2 to about 20 m/s, and a relative humidity of 15% or less, in combination with actinic infrared radiation from a distance from the external surface of about 5 cm to about 15 cm, for a time sufficient to dry the aqueous priming coating composition.

According to another embodiment, there is provided a method for drying an aqueous coating composition covering an intermediate substrate covering an external surface exposed to air of a carbon material, to form a layer thereon,
the aqueous coating composition comprising a combination of a sodium salt of carbonate and a potassium salt of carbonate providing an equivalent $Na_2O:K_2O$ molar ratio of about 0.4 to about 2.0, and water, the aqueous coating composition having a melting temperature of up to about 600° C.;
the method comprising:
in an environment at a temperature of from about 108° C. to about 127° C., applying to the aqueous coating composition forced air at a temperature of from about 110° C. to about 275° C., a velocity of about 2 to about 22 m/s, and a relative humidity of 15% or less, in combination with actinic infrared radiation from a distance from the external surface of about 5 cm to about 15 cm, for a time sufficient to dry the aqueous coating composition.

According to another embodiment, there is provided a method of coating a carbon material with a chemical treatment for preventing or reducing air oxidation of the carbon material, the chemical treatment comprising a first layer comprising an aqueous priming coating composition covering an external surface exposed to air of the carbon material; and a second layer, covering the first layer, comprising an aqueous coating composition, the aqueous priming coating composition comprising a mixture of aluminum oxide ($Al_2O_3$), comprising a combination of aluminum oxide selected from the group consisting of calcined aluminum oxide, reactive aluminum oxide, and white fused aluminum oxide; and water, the aqueous coating composition comprising a combination of a sodium salt of carbonate and a potassium salt of carbonate providing an equivalent $Na_2O:K_2O$ molar ratio of about 0.4 to about 2.0, and water, the aqueous coating composition having a melting temperature of up to about 600° C.;
the method comprising:
a) applying the aqueous priming coating composition to the external surface exposed to air of the carbon material and in an environment at a temperature of from about 74° C. to about 124° C., applying to the aqueous priming coating composition forced air at a temperature of from about 80° C. to about 126° C., a velocity of about 2 to about 20 m/s, and a relative humidity of 15% or less, in combination with actinic infrared radiation from a distance from the external surface of about 5 cm to about 15 cm, for a time sufficient to dry the aqueous priming coating composition, to form the first layer, b) applying the aqueous coating composition to the first layer having a surface temperature of about 59° C. to about 100° C. and in an environment at a temperature of from about 108° C. to about 127° C., applying to the aqueous coating composition forced air at a temperature of from about 110° C. to about 275° C., a velocity of about 2 to about 22 m/s, and a relative humidity of 15% or less, in combination with actinic infrared radiation from a distance from the external surface of about 5 cm to about 15 cm, for a time sufficient to dry the aqueous coating composition and form the second layer.

According to another embodiment, there is provided a method of coating a carbon material with a chemical treatment for preventing or reducing air oxidation of said carbon material, said chemical treatment comprising a first layer comprising an aqueous priming coating composition covering an external surface exposed to air of said carbon material; and a second layer, covering said first layer, comprising an aqueous coating composition, the aqueous priming coating composition comprising a mixture of aluminum oxide ($Al_2O_3$), comprising a combination of aluminum oxide selected from the group consisting of calcined aluminum oxide, reactive aluminum oxide, and white fused aluminum oxide; and water, the aqueous coating composition comprising a combination of a sodium salt of carbonate and a potassium salt of carbonate providing an equivalent $Na_2O:K_2O$ molar ratio of about 0.4 to about 2.0, and water, said aqueous coating composition having a melting temperature of up to about 600° C.;

the method comprising:

a) applying said aqueous priming coating composition to said external surface exposed to air of said carbon material and in an environment at a temperature of from about 74° C. to about 124° C., applying to said aqueous priming coating composition forced air at a temperature of from about 80° C. to about 126° C., a velocity of about 2 to about 20 m/s, and a relative humidity of 15% or less, in combination with actinic infrared radiation from a distance from said external surface of about 5 cm to about 15 cm, for a time sufficient to dry said aqueous priming coating composition, to form said first layer, b) applying said aqueous coating composition to said first layer having a surface temperature of about 60° C. to about 80° C. and then introduce said carbon material in an environment at a temperature of from about 40° C. to about 60° C. and a relative humidity of 12 to 16% for a time sufficient to dry said aqueous coating composition and form said second layer.

The carbon material may be a carbon anode, preferably a prebaked consumable carbon anode.

The actinic infrared radiation may be infrared radiation comprising a wavelength of about 2 μm to about 4 μm.

The distance from the external surface may be about 10 cm.

The first layer comprises one or more application of the aqueous priming coating composition.

A first aqueous priming coating composition layer may be dried at room temperature for about 2 minutes or more.

A second aqueous priming coating composition layer may be dried at room temperature for about 45 second or more.

In the step a) the aqueous coating composition may be applied at a temperature of 32° C. to 80° C. onto the first layer.

In the step b) when applying the aqueous coating composition to the first layer, the first layer has a surface temperature of about 74° C. to about 100° C.

The layer of aqueous coating composition reaches a temperature of about 190° C. to about 210° C. within a first minute of drying, to provide a dried second layer.

The actinic infrared radiation may be provided with a shield configured to prevent cooling of an actinic infrared radiation source by said forced air, to maximize actinic infrared radiation wave energy.

The shield may be a glass plate, a glass tube, or combination thereof.

The shield may be a glass shield made from borosilicate glass, a glass-ceramic material, or a combination thereof.

The glass shield may be made from a glass or a glass material having a thermal expansion of from about $2\times10^{-7\circ}$ $C.^{-1}$ to about $33\times10^{-7\circ}$ $C.^{-1}$.

The glass shield may be made from a glass or a glass material having a thermal shock of from about 150° C. to about 700° C.

The glass shield may be made from a glass or a glass material having a density of from about 2 $g/cm^3$ to about 3 $g/cm^3$.

According to another embodiment, there may be provided a system for drying a coating composition covering a surface of a carbon material, the apparatus comprising:

a temperature-controlled environment configured to provide temperatures from about 70° C. to about 130° C.;

means to provide forced air, configured to provide the forced air at a temperature of from about 80° C. to about 275° C., a velocity of about 2 to about 22 m/s, and a relative humidity of 15% or less;

an actinic infrared radiation source;

wherein the means to provide forced air and the actinic infrared radiation source are configured to direct forced air and actinic infrared radiation onto the surface of a carbon material to provide a drying action.

The temperature-controlled environment comprises a heating element to provide the temperature.

The means to provide forced air comprises a blower element.

The system comprises a humidifier element.

The system comprises a dehumidifier element.

The actinic infrared radiation source may be at a distance from the surface of a carbon material of about 5 cm to about 15 cm.

The distance from the external surface may be about 10 cm.

The actinic infrared radiation may be infrared radiation comprising a wavelength of about 2 μm to about 4 μm.

The actinic infrared radiation source comprises a shield configured to prevent cooling of an actinic infrared radiation source by said forced air, to maximize actinic infrared radiation wave energy.

The shield may be a glass plate, a glass tube, or combination thereof.

The shield may be a glass shield made from borosilicate glass, a glass-ceramic material, or a combination thereof.

The glass shield may be made from a glass or a glass material having a thermal expansion of from about $2\times10^{-7\circ}$ $C.^{-1}$ to about $33\times10^{-7\circ}$ $C.^{-1}$.

The glass shield may be made from a glass or a glass material having a thermal shock of from about 150° C. to about 700° C.

The glass shield may be made from a glass or a glass material having a density of from about 2 g/cm$^3$ to about 3 g/cm$^3$.

The system may further comprise a temperature sensor to measure environment temperature, a temperature sensor to measure surface of a carbon material temperature, an air velocity sensor, a relative humidity sensor, and combinations thereof.

According to another embodiment, there is provided a method for drying an aqueous coating composition covering an intermediate substrate covering an external surface exposed to air of a carbon material, to form a layer of aqueous coating composition thereon, the aqueous coating composition comprising a combination of a sodium salt of carbonate and a potassium salt of carbonate providing an equivalent Na$_2$O:K$_2$O molar ratio of about 0.4 to about 2.0, and water, said aqueous coating composition having a melting temperature of up to about 600° C.;

the method may comprise:

gradually moving the carbon material toward a heat source providing an environment at a temperature of about 900° to 1100° C., to provide a zone of the layer of aqueous coating composition closest to the heat source with a heating rate for a time sufficient to remove a free water from the layer of aqueous coating composition, wherein when the aqueous priming coating is applied onto an intermediate substrate at a temperature T of ≤100° C., the heating rate is ≤22.33° C./sec for a time t elapsed since beginning of the method of 0≤t≤15 sec;

≤14.2° C./sec for a time t elapsed since beginning of the method of 15<t≤21 sec;

≤7.13° C./sec for a time t elapsed since beginning of the method of 21<t≤32 sec;

≤5.66° C./sec for a time t elapsed since beginning of the method of 32<t≤40 sec; and ≤4.22° C./sec for a time t elapsed since beginning of the method of 40<t≤60 sec, or wherein when the aqueous coating composition is applied onto an intermediate substrate at a temperature T of 100° C.<T≤113° C., the heating rate is ≤38.15° C./sec for a time t elapsed since beginning of the method of 0≤t≤15 sec;

≤23.28° C./sec for a time t elapsed since beginning of the method of 15<t≤21 sec; and ≤9.78° C./sec for a time t elapsed since beginning of the method of 21<t≤32 sec.

The carbon material may be a carbon anode, preferably a prebaked consumable carbon anode.

The intermediate substrate may be an aqueous priming coating composition comprising a mixture of aluminum oxide (Al$_2$O$_3$), comprising a combination of aluminum oxide selected from the group consisting of calcined aluminum oxide, reactive aluminum oxide, and white fused aluminum oxide; and water.

The heat source may be a molten cryolitic bath.

The aqueous coating composition may be applied at a temperature of 32° C. to 90° C. on the intermediate substrate.

According to another embodiment, there is provided a system for drying an aqueous coating composition covering an intermediate substrate covering an external surface exposed to air of a carbon material, the system comprising:

a temperature controlled environment configured to provide a temperature of about 900° C. to 1100° C.;

means to gradually move the carbon material toward a heat source providing said environment with a temperature of about 900° C. to 1100° C.

The following terms are defined below.

The term "solution" is intended to mean a homogeneous mixture composed of two or more substances. Also, as used herein, the term aqueous solution is when one of the solvents is water. In such a mixture, a solute is a substance dissolved in another substance, known as a solvent. The mixing process of a solution happens at a scale where the effects of chemical polarity are involved, resulting in interactions that are specific to solvation. The solution assumes the phase of the solvent when the solvent is the larger fraction of the mixture, as is commonly the case. The concentration of a solute in a solution is the mass of that solute expressed as a percentage of the mass of the whole solution.

The term "carbon material" is intended to mean an object or item that is made from carbon (i.e., graphite, petroleum or metallurgical coke or any other partially graphitized carbon, amorphous carbon) such as prebaked consumable carbon anodes used in the process of aluminum smelting.

The term "liquid binder" is intended to mean a liquid or a colloidal suspension that can bind, at room temperature, following chemical transformations such as reactions, gelling or hydration, a set of particles. The latter, originally in the pulverulent state, are transformed by the action of the liquid binder into a rigid material (non-zero modulus of elasticity).

The term "actinic radiation" or "actinic infrared radiation" is intended to mean light, particularly infrared radiation that causes a chemical effect. This term is mainly used to describe the propensity of different wavelengths of light, in this case infrared light from about 0.2 to about 10 μm to cause a chemical reaction. In the case of the present invention, this leads to a drying reaction.

The term "heating rate" is intended to mean the speed at which heat is transferred to a zone of the layer of aqueous coating composition closest to the heat source. According to embodiments, it is expressed in ° C./sec.

The term "drying temperature" is intended to mean the temperature to which the layer of aqueous coating composition closest to the heat source is subjected to, as a function of the heating rate.

The terms "drying temperature high limit", "drying temperature mid limit" and "drying temperature low limit" refer to the drying temperature limits that should maintained to avoid damage when drying the aqueous coating composition. The qualifier "mid" and "low" may be used in conjunction to refer to the temperature and heating rates when the aqueous priming coating is applied onto an intermediate substrate at a temperature T of ≤100° C. The qualifier "mid" and "high" may be used in conjunction to refer to the temperature and heating rates when the aqueous priming coating is applied onto an intermediate substrate at a temperature T of 100° C. <T≤113° C.

The term "time sufficient" is intended to mean the time necessary to obtain the desired drying effect.

The term "free water" is intended to mean the water that needs to be removed from the layer of aqueous coating composition for it to be dry, and it does not refer to the water of hydration of the chemical compound(s) of the aqueous coating composition.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Drying (free water removal) of solutions of aqueous carbonates may lead to efflorescence—the formation of anhydride carbonate powder—if performed too fast. This happens with the top coating of carbon materials such as anodes used in aluminum electrolysis cells that contain $Li_2CO_3$, $Na_2CO_3$ and $K_2CO_3$. Among these three carbonates, the latter is the most problematic and requires drying to proceed during several hours, typically between 24 to 48 hours, to prevent efflorescence. When efflorescence takes place, the dried coating becomes deliquescent (dissolution of the carbonate into its hygroscopic absorbed water) after being exposed to relative humidity (RH) above the relative humidity of deliquescence (RHD)(sec FIG. 1). In such conditions, the carbonate coating is damaged during the insertion of the anodes directly into molten cryolitic bath since it promotes excessively fast absorbed water evaporation, which causes localized spalling or pop-out.

Figure 2:
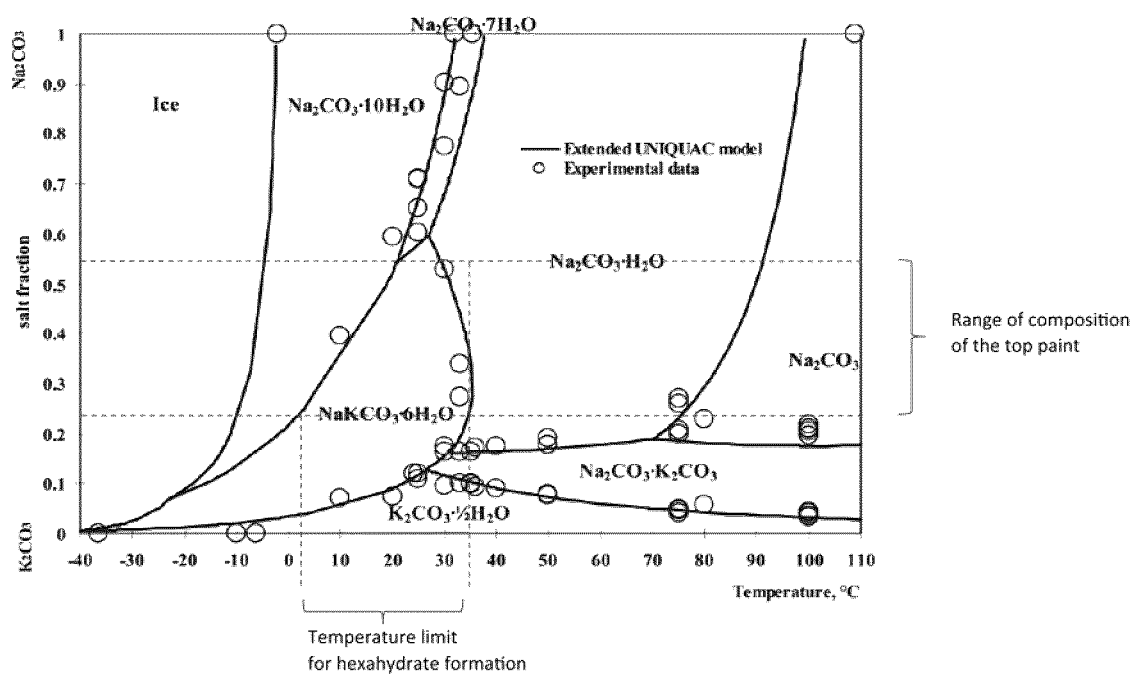
FIG. 2 illustrates the temperature-composition diagram for saturated solutions in the Na2CO3-K2CO3-H2O system as found in Chakravarty, K. H., Thomsen, K., & Fosbol, P. L. (2016). Modelling of Salt Solubilities for Smart Water flooding in Carbonate Reservoirs using Extended UNIQUAC Model. Kgs. Lyngby: Danmarks Tekniske Universitet.
Figure 3:
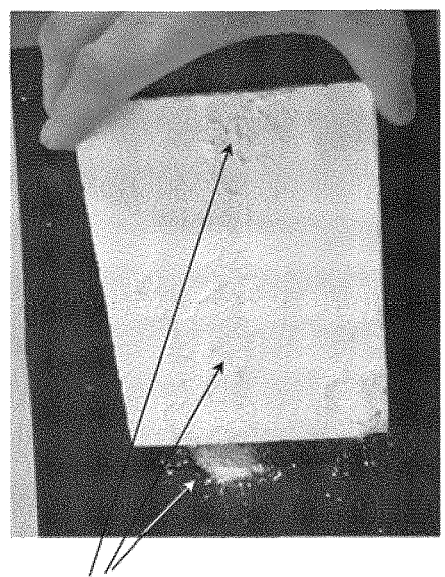
FIG. 3 illustrates carbonate coating damage due to hexahydrate formation and decomposition.
Figure 3:
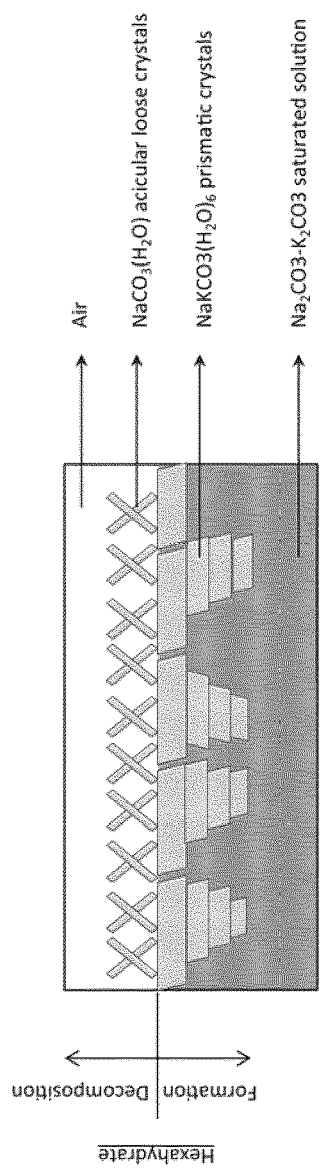

Another reason for totally removing free water from a carbonate coating prior to storage is to prevent damage during the coated anode storage. As shown in FIG. 2, if the top coating continue to loose water during storage at temperature between about 2° C. and 34° C., $NaKCO_3(H_2O)_6$ (hexahydrate) prismatic crystals will form. After complete free water loss in such conditions, the hexahydrate becomes unstable and decomposes to form $Na_2CO_3(H_2O)$ (monohydrate) acicular crystals. As shown in FIG. 3, the growing of these crystals leads to the formation of free (unbounded) flakes, which is not desirable.

For industrial commercialization of anode protective coating chemical treatment comprising intermediate layer followed by a carbonate coating, for practical purposes, it should be possible to dry each layer within a few minutes For the top paint—i.e. the carbonate coating, this must be accomplished without creating efflorescence problems.

In an embodiment there is disclosed a method for drying an aqueous priming coating composition covering an external surface exposed to air of a carbon material, to form a layer thereon. The aqueous priming coating composition comprises a mixture of aluminum oxide ($Al_2O_3$), comprising a combination of aluminum oxide selected from the group consisting of calcined aluminum oxide, reactive aluminum oxide, and white fused aluminum oxide; and water. The aqueous priming coating composition is described in greater details below.

The method comprises, in an environment at a temperature of from about 74° C. to about 124° C., applying to the aqueous priming coating composition forced air at a temperature of from about 80° C. to about 126° C., a velocity of about 2 to about 20 m/s, and a relative humidity of 15% or less, and preferably 10.5 to 13.3%, in combination with actinic infrared radiation from a distance from the external surface of about 5 cm to about 15 cm, for a time sufficient to dry the aqueous priming coating composition.

Priming Coating Composition

As used herein, aqueous priming coating composition refers to an aqueous priming coating composition as disclosed in PCT/CA2018/051083 which is incorporated herein by reference, for application to a carbon material which comprises a mixture of aluminum oxide ($Al_2O_3$), comprising a combination of aluminum oxide select from the group consisting of calcined aluminum oxide, reactive aluminum oxide, and white fused aluminum oxide; and water.

Carbon materials, such as carbon anodes, are not wetted by molten salts. The aqueous coating of the present invention is preferably applied on an intermediate substrate, such as a priming coating composition described herein. The priming coating composition of the present invention is a formulation of water-based paint (designated aqueous priming coating composition) that highly adheres mechanically on carbon materials, such as anodes, by filling their surface defects, such as open pores and microcracks or microfissures. This paint is preferably containing up to 94 to 96% w/w alumina—aluminum oxide—(on a dry basis). Colloidal binders may be included to act as substrate for the aqueous coating composition. During the application of the aqueous coating composition on the aqueous priming coating, the dissolved salts of sodium and potassium carbonate contained into the aqueous coating composition penetrate the open pores of the aqueous priming coating while most of the lithium salt of carbonate (e.g. $Li_2CO_3$) from the aqueous coating composition is accumulated on the aqueous priming coating surface. Due to the much lower solubility of the $NaHCO_3$ and $KHCO_3$ salts compared to $Na_2CO_3$ and $K_2CO_3$, respectively, a lesser degree of penetration into the aqueous priming coating is obtained with the alternative aqueous coating composition whose adherence is consequently lower, as it has been observed that it is easier to dislodge a coating made with bicarbonates.

In embodiments, the concentration of the calcined aluminum oxide may be from about 32% to 41% w/w, or from about 32% to 40% w/w, or from about 32% to 39% w/w, or from about 32% to 38% w/w, or from about 32% to 37% w/w, or from about 32% to 36% w/w, or from about 32% to 35% w/w, or from about 32% to 34% w/w, or from about 32% to 33% w/w, or from about 33% to 41% w/w, or from about 33% to 40% w/w, or from about 33% to 39% w/w, or from about 33% to 38% w/w, or from about 33% to 37% w/w, or from about 33% to 36% w/w, or from about 33% to 35% w/w, or from about 33% to 34% w/w, or from about 34% to 41% w/w, or from about 34% to 40% w/w, or from about 34% to 39% w/w, or from about 34% to 38% w/w, or from about 34% to 37% w/w, or from about 34% to 36% w/w, or from about 34% to 35% w/w, or from about 35% to 41% w/w, or from about 35% to 40% w/w, or from about 35% to 39% w/w, or from about 35% to 38% w/w, or from about 35% to 37% w/w, or from about 35% to 36% w/w, or from about 36% to 41% w/w, or from about 36% to 40% w/w, or from about 36% to 39% w/w, or from about 36% to 38% w/w, or from about 36% to 37% w/w, or from about 37% to 41% w/w, or from about 37% to 40% w/w, or from about 37% to 39% w/w, or from about 37% to 38% w/w, or from about 38% to 41% w/w, or from about 38% to 40% w/w, or from about 38% to 39% w/w, or from about 39% to 41% w/w, or from about 39% to 40% w/w, or is from about 35.29% to 38.07% w/w or from about 40% to 41% w/w, or about 31%, 32%, 33%, 34%, 35%, 36%, 37%, 38%, 39%, 40%, 41%, 35.29% or 38.07% w/w of the aqueous priming coating composition.

In embodiments, the concentration of reactive aluminum oxide may be from about 6% to 9% w/w, or from about 6% to 8% w/w, or from about 6% to 7% w/w, or from about 7% to 9% w/w, or from about 7% to 8% w/w, or from about 8% to 9% w/w, or from about 7.41% to 7.99% w/w or 6%, 7%, 8%, 9%, or 7.41% or 7.99% w/w of the aqueous priming coating composition.

In embodiments, the concentration of white fused aluminum oxide may be from about 31% to 40% w/w, or from about 31% to 39% w/w, or from about 31% to 38% w/w, or from about 31% to 37% w/w, or from about 31% to 36% w/w, or from about 31% to 35% w/w, or from about 31% to 34% w/w, or from about 31% to 33% w/w, or from about 31% to 32% w/w, or from about 32% to 40% w/w, or from about 32% to 39% w/w, or from about 32% to 38% w/w, or from about 32% to 37% w/w, or from about 32% to 36% w/w, or from about 32% to 35% w/w, or from about 32% to 34% w/w, or from about 32% to 33% w/w, or from about 33% to 40% w/w, or from about 33% to 39% w/w, or from about 33% to 38% w/w, or from about 33% to 37% w/w, or from about 33% to 36% w/w, or from about 33% to 35% w/w, or from about 33% to 34% w/w, or from about 34% to 40% w/w, or from about 34% to 39% w/w, or from about 34% to 38% w/w, or from about 34% to 37% w/w, or from about 34% to 36% w/w, or from about 34% to 35% w/w, or from about 35% to 40% w/w, or from about 35% to 39% w/w, or from about 35% to 38% w/w, or from about 35% to 37% w/w, or from about 35% to 36% w/w, or from about 36% to 40% w/w, or from about 36% to 39% w/w, or from about 36% to 38% w/w, or from about 36% to 37% w/w, or from about 37% to 40% w/w, or from about 37% to 39% w/w, or from about 37% to 38% w/w, or from about 38% to 40% w/w, or from about 38% to 39% w/w, or from about 39% to 40% w/w, or is from about 34.13% to 36.81% w/w, or about 31%, 32%, 33%, 34%, 35%, 36%, 37%, 38%, 39%, 40%, 34.13% or 36.81% w/w of the aqueous priming coating composition.

In embodiments, the white fused aluminum oxide may have particle size of up to about 0.2 mm and less (i.e., passing across the No. 70 ASTM Tyler Mesh screen).

In embodiments, the aqueous priming coating composition may further comprise a calcium salt of carbonate, and the calcium salt of carbonate may be selected from the group consisting of calcium carbonate ($CaCO_3$), calcium bicarbonate [$Ca(HCO_3)_2$], and combinations thereof.

In embodiments, the concentration of the calcium carbonate may be up to 5% w/w, or up to 4% w/w, or up to 3% w/w, or up to 2% w/w, or up to 1% w/w, or up to 0.5%, or from about 0.5% to about 5%, or from about 0.5% to about 4%, or from about 0.5% to about 3%, or from about 0.5% to about 2%, or from about 0.5% to about 1%, or from about 1% to about 5%, or from about 1% to about 4%, or from about 1% to about 3%, or from about 1% to about 2%, or from about 2% to about 5%, or from about 2% to about 4%, or from about 2% to about 3%, or from about 3% to about 5%, or from about 3% to about 4%, or from about 4% to about 5%, or about 0.5%, 1%, 2%, 3%, 4%, 5%, or 3.8% w/w of the aqueous priming coating composition.

In embodiments, the aqueous priming coating composition may further comprise a liquid binder. The liquid binder may comprise colloidal silica, colloidal alumina, a deflocculant and combinations thereof.

In embodiments, the concentration of the colloidal silica may be up to 12% w/w, or up to 11% w/w, or up to 10% w/w, or up to 9% w/w, or up to 8% w/w, or up to 7% w/w, or up to 6% w/w, or up to 5% w/w, or up to 4% w/w, or up to 3% w/w, or up to 2% w/w, or up to 1% w/w, or up to 0.5%, or from about 0.5% to about 12%, or from about 0.5% to about 11%, or from about 0.5% to about 10%, or from about 0.5% to about 9%, or from about 0.5% to about 8%, or from about 0.5% to about 7%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 12%, or from about 1% to about 11%, or from about 1% to about 10%, or from about 1% to about 9%, or from about 1% to about 8%, or from about 1% to about 7%, or from about 1% to about 6%, or from about 1% to about 5%, or from about 1% to about 4%, or from about 1% to about 3%, or from about 1% to about 2%, or from about 2% to about 12%, or from about 2% to about 11%, or from about 2% to about 10%, or from about 2% to about 9%, or from about 2% to about 8%, or from about 2% to about 7%, or from about 2% to about 6%, or from about 2% to about 5%, or from about 2% to about 4%, or from about 2% to about 3%, or from about 3% to about 12%, or from about 3% to about 11%, or from about 3% to about 10%, or from about 3% to about 9%, or from about 3% to about 8%, or from about 3% to about 7%, or from about 3% to about 6%, or from about 3% to about 5%, or from about 3% to about 4%, or from about 4% to about 12%, or from about 4% to about 11%, or from about 4% to about 10%, or from about 4% to about 9%, or from about 4% to about 8%, or from about 4% to about 7%, or from about 4% to about 6%, or from about 4% to about 5%, or from about 5% to about 12%, or from about 5% to about 11%, or from about 5% to about 10%, or from about 5% to about 9%, or from about 5% to about 8%, or from about 5% to about 7%, or from about 5% to about 6%, or from about 6% to about 12%, or from about 6% to about 11%, or from about 6% to about 10%, or from about 6% to about 9%, or from about 6% to about 8%, or from about 6% to about 7%, or from about 7% to about 12%, or from about 7% to about 11%, or from about 7% to about 10%, or from about 7% to about 9%, or from about 7% to about 8%, or from about 8% to about 12%, or from about 8% to about 11%, or from about 8% to about 10%, or from about 8% to about 9%, or from about 9% to about 12%, or from about 9% to about 11%, or from about 9% to about 10%, or from about 10% to about 12%, or from about 10% to about 11%, or from about 11% to about 12%, or from about 1.22% to about 9.49% w/w, or about 0.5%, 1%, 2%, 3%, 4%, 5%, 6%, 7%, 8%, 9%, 10%, 11%, 12%, or 1.22%, or 9.49% w/w of the aqueous priming coating composition.

In embodiments, the concentration of the colloidal alumina may be up to 14% w/w, or up to 13% w/w, or up to 12% w/w, or up to 11% w/w, or up to 10% w/w, or up to 9% w/w, or up to 8% w/w, or up to 7% w/w, or up to 6% w/w, or up to 5% w/w, or up to 4% w/w, or up to 3% w/w, or up to 2% w/w, or up to 1% w/w, or up to 0.5%, or from about 0.5% to about 14%, or from about 0.5% to about 13%, or from about 0.5% to about 12%, or from about 0.5% to about 11%, or from about 0.5% to about 10%, or from about 0.5% to about 9%, or from about 0.5% to about 8%, or from about 0.5% to about 7%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 14%, or from about 1% to about 13%, or from about 1% to about 12%, or from about 1% to about 11%, or from about 1% to about 10%, or from about 1% to about 9%, or from about 1% to about 8%, or from about 1% to about 7%, or from about 1% to about 6%, or from about 1% to about 5%, or from about 1% to about 4%, or from about 1% to about 3%, or from about 1% to about 2%, or from about 2% to about 14%, or from about 2% to about 13%, or from about 2% to about 12%, or from about 2% to about 11%, or from about 2% to about 10%, or from about 2% to about 9%, or from about 2% to about 8%, or from about 2% to about 7%, or from about 2% to about 6%, or from about 2% to about 5%, or from about 2% to about 4%, or from about 2% to about 3%, or from about 3% to about 14%, or from about 3% to about 13%, or from about 3% to about 12%, or from about 3% to about 11%, or from about 3% to about 10%, or from about 3% to about 9%, or from about 3% to about 8%, or from about 3% to about 7%, or from about 3% to about 6%, or from about 3% to about 5%, or from about 3% to about 4%, or from about 4% to about 14%, or from about 4% to about 13%, or from about 4% to about 12%, or from about 4% to about 11%, or from about 4% to about 10%, or from about 4% to about 9%, or from about 4% to about 8%, or from about 4% to about 7%, or from about 4% to about 6%, or from about 4% to about 5%, or from about 5% to about 14%, or from about 5% to about 13%, or from about 5% to about 12%, or from about 5% to about 11%, or from about 5% to about 10%, or from about 5% to about 9%, or from about 5% to about 8%, or from about 5% to about 7%, or from about 5% to about 6%, or from about 6% to about 14%, or from about 6% to about 13%, or from about 6% to about 12%, or from about 6% to about 11%, or from about 6% to about 10%, or from about 6% to about 9%, or from about 6% to about 8%, or from about 6% to about 7%, or from about 7% to about 14%, or from about 7% to about 13%, or from about 7% to about 12%, or from about 7% to about 11%, or from about 7% to about 10%, or from about 7% to about 9%, or from about 7% to about 8%, or from about 8% to about 14%, or from about 8% to about 13%, or from about 8% to about 12%, or from about 8% to about 11%, or from about 8% to about 10%, or from about 8% to about 9%, or from about 9% to about 14%, or from about 9% to about 13%, or from about 9% to about 12%, or from about 9% to about 11%, or from about 9% to about 10%, or from about 10% to about 14%, or from about 10% to about 13%, or from about 10% to about 12%, or from about 10% to about 11%, or from about 11% to about 14%, or from about 11% to about 13%, or from about 11% to about 12%, or from about 12% to about 14%, or from about 12% to about 13%, or from about 13% to about 14%, or about 0.5%, 1%, 2%, 3%, 4%, 5%, 6%, 7%, 8%, 9%, 10%, 11%, 12%, 13%, 14% or 10.36% w/w of the aqueous priming coating composition.

In embodiments, the liquid binder may also comprise a deflocculant, which is a compound that is added to the composition to minimize settling out, prevent flocculation and disperse the other ingredients, increase fluidity of the composition, and help form a colloid or suspension. The deflocculant may be selected from the group consisting of polyethylene glycol graft polymers such as Castament® FS10, FS20 or FS60.

In embodiments, the deflocculant may be from about 6% to about 10% w/w, or from about 6% to about 9% w/w, or from about 6% to about 8% w/w, or from about 6% to about 7% w/w, or from about 7% to about 10% w/w, or from about 7% to about 9% w/w, or from about 7% to about 8% w/w, or from about 8% to about 10% w/w, or from about 8% to about 9% w/w, or from about 9% to about 10% w/w, or about 7.42% to about 7.64% w/w, or about 6%, 7%, 8%, 9%, 10%, or 7.42%, or 7.64% w/w of the aqueous priming coating composition.

In embodiments, the layer of the aqueous coating composition may have a wet film thickness of about 0.3 mm to about 1 mm, or a wet film thickness of about 0.5±0.1 mm. In an embodiment, the layer of the aqueous coating composition may have a residual water content of about 12% w/w or less.

In an embodiment there is disclosed a method for drying an aqueous coating composition covering an intermediate substrate covering an external surface exposed to air of a carbon material, to form a layer thereon.

The method comprises, in an environment at a temperature of from about 108° C. to about 127° C., applying to the aqueous coating composition forced air at a temperature of from about 110° C. to about 275° C., a velocity of about 2 to about 22 m/s, and a relative humidity of 15% or less, and preferably 9.95 to 11.1%, in combination with actinic infrared radiation from a distance from the external surface of about 5 cm to about 15 cm, for a time sufficient to dry the aqueous coating composition.

Aqueous Carbonate Coating Composition

As used herein, aqueous carbonate coating composition or carbonate composition refers to an aqueous coating composition as disclosed in PCT/CA2018/051083 which is incorporated herein by reference, for preventing or reducing air oxidation of a carbon material (for example graphite, petroleum or metallurgical coke or any other partially graphitized carbon, amorphous carbon) comprising an aqueous solution comprising a combination of a sodium salt of carbonate and a potassium salt of carbonate, and water, the aqueous coating having a melting temperature of from about 600° C.

In an embodiment the aqueous coating composition for preventing or reducing air oxidation of a carbon material comprises an aqueous solution comprising a combination of a sodium salt of carbonate and a potassium salt of carbonate, a lithium salt, and water, the aqueous coating having a melting temperature of from about 370° C. to about 430° C. To the salts of sodium and potassium carbonate, an equivalent $Li_2O$ molar content varying between about 17% and 74% of the composition is added. The equivalent $Li_2O$ molar content is to be provided by lithium carbonate ($Li_2CO_3$), lithium bicarbonate ($LiHCO_3$), LiF, a mixture of LiF and NaF, or a combination or all of the above, to reach a theoretical melting temperature of 370° C. to 430° C., and preferably 400° C., although they have a very low solubility in water. Among $Li_2CO_3$, LiF and NaF, the former has the lowest density (2.11, versus 2.64 and 2.56 $g/cm^3$, respectively). Among these salts, $Li_2CO_3$ leads to the lowest sedimentation rate into concentrated aqueous solutions of $Na_2CO_3$ and $K_2CO_3$.

An embodiment of the present invention concerns the formulation of a water paint which may be made from a mixture sodium salts of carbonate, potassium salts of carbonate. The sodium salt of carbonate and a potassium salt of carbonate are mixed in quantities that provide an equivalent $Na_2O:K_2O$ molar ratio of about 0.4 to about 2.0, to provide an aqueous coating having a melting temperature of up to 600° C.

The equivalent molar ratio for sodium and potassium salts of carbonate may be derived according to the following:

| Reaction | Molar equivalent |
|---|---|
| 2 $NaHCO_3$ = $Na_2O$ + 2 $CO_2$ + $H_2O$ | 2 moles of sodium bicarbonate = 1 mole of $Na_2O$ equivalent |
| 2 $KHCO_3$ = $K_2O$ + 2 $CO_2$ + $H_2O$ | 2 moles of potassium bicarbonate = 1 mole of $K_2O$ equivalent |
| $Na_2CO_3$ = $Na_2O$ + $CO_2$ | 1 mole of sodium carbonate = 1 mole of equivalent |
| $K_2CO_3$ = $K_2O$ + $CO_2$ | 1 mole of potassium carbonate = 1 mole of $K_2O$ equivalent |
| NaF | 1 mole of NaF = 1 mole of sodium and thus 1/2 mole of $Na_2O$ qquivalent |
| KF | 1 mole de KF = 1 mole of potassium and thus 1/2 mole of $K_2O$ equivalent |

The aqueous coating composition comprises a combination of a sodium salt of carbonate and a potassium salt of carbonate providing an equivalent $Na_2O:K_2O$ molar ratio of about 0.4 to about 2.0, and water, the aqueous coating composition having a melting temperature of up to about 600° C. The aqueous coating composition is described in greater details below.

In embodiments, the equivalent $Na_2O:K_2O$ molar ratio is from about 0.4 to about 2.0, or about 0.4 to about 1.9, or about 0.4 to about 1.8, or about 0.4 to about 1.7, or about 0.4 to about 1.6, or about 0.4 to about 1.5, or about 0.4 to about 1.4, or about 0.4 to about 1.3, or about 0.4 to about 1.2, or about 0.4 to about 1.1, or about 0.4 to about 1.0, or about 0.4 to about 0.9, or about 0.4 to about 0.8, or about 0.4 to about 0.7, or about 0.4 to about 0.6, or about 0.4 to about 0.5, or about 0.5 to about 2.0, or about 0.5 to about 1.9, or about 0.5 to about 1.8, or about 0.5 to about 1.7, or about 0.5 to about 1.6, or about 0.5 to about 1.5, or about 0.5 to about 1.4, or about 0.5 to about 1.3, or about 0.5 to about 1.2, or about 0.5 to about 1.1, or about 0.5 to about 1.0, or about 0.5 to about 0.9, or about 0.5 to about 0.8, or about 0.5 to about 0.7, or about 0.5 to about 0.6, or from about 0.6 to about 2.0, or about 0.6 to about 1.9, or about 0.6 to about 1.8, or about 0.6 to about 1.7, or about 0.6 to about 1.6, or about 0.6 to about 1.5, or about 0.6 to about 1.4, or about 0.6 to about 1.3, or about 0.6 to about 1.2, or about 0.6 to about 1.1, or about 0.6 to about 1.0, or about 0.6 to about 0.9, or about 0.6 to about 0.8, or about 0.6 to about 0.7, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or about 0.7 to about 0.8, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or from about 0.8 to about 2.0, or about 0.8 to about 1.9, or about 0.8 to about 1.8, or about 0.8 to about 1.7, or about 0.8 to about 1.6, or about 0.8 to about 1.5, or about 0.8 to about 1.4, or about 0.8 to about 1.3, or about 0.8 to about 1.2, or about 0.8 to about 1.1, or about 0.8 to about 1.0, or about 0.8 to about 0.9, or from about 0.9 to about 2.0, or about 0.9 to about 1.9, or about 0.9 to about 1.8, or about 0.9 to about 1.7, or about 0.9 to about 1.6, or about 0.9 to about 1.5, or about 0.9 to about 1.4, or about 0.9 to about 1.3, or about 0.9 to about 1.2, or about 0.9 to about 1.1, or about 0.9 to about 1.0, or from about 1.0 to about 2.0, or about 1.0 to about 1.9, or about 1.0 to about 1.8, or about 1.0 to about 1.7, or about 1.0 to about 1.6, or about 1.0 to about 1.5, or about 1.0 to about 1.4, or about 1.0 to about 1.3, or about 1.0 to about 1.2, or about 1.0 to about 1.1, or from about 1.1 to about 2.0, or about 1.1 to about 1.9, or about 1.1 to about 1.8, or about 1.1 to about 1.7, or about 1.1 to about 1.6, or about 1.1 to about 1.5, or about 1.1 to about 1.4, or about 1.1 to about 1.3, or about 1.1 to about 1.2, or from about 1.2 to about 2.0, or about 1.2 to about 1.9, or about 1.2 to about 1.8, or about 1.2 to about 1.7, or about 1.2 to about 1.6, or about 1.2 to about 1.5, or about 1.2 to about 1.4, or about 1.2 to about 1.3, or from about 1.3 to about 2.0, or about 1.3 to about 1.9, or about 1.3 to about 1.8, or about 1.3 to about 1.7, or about 1.3 to about 1.6, or about 1.3 to about 1.5, or about 1.3 to about 1.4, or from about 1.4 to about 2.0, or about 1.4 to about 1.9, or about 1.4 to about 1.8, or about 1.4 to about 1.7, or about 1.4 to about 1.6, or about 1.4 to about 1.5, or from about 1.5 to about 2.0, or about 1.5 to about 1.9, or about 1.5 to about 1.8, or about 1.5 to about 1.7, or about 1.5 to about 1.6, or from about 1.6 to about 2.0, or about 1.6 to about 1.9, or about 1.6 to about 1.8, or about 1.6 to about 1.7, or from about 1.7 to about 2.0, or about 1.7 to about 1.9, or about 1.7 to about 1.8, or from about 1.8 to about 2.0, or about 1.8 to about 1.9, or from about 1.9 to about 2.0, or about 0.5, 0.6, 0.7, 0.8, 0.9, 1.0, 1.1, 1.2, 1.3, 1.4, 1.5, 1.6, 1.7, 1.8, 1.9, or 2.0. Such aqueous coatings comprising the sodium salts and potassium salts of carbonate, such as $Na_2CO_3$, $K_2CO_3$, and in the indicated equivalent molar ratio display melting temperatures that may be up to 600° C., such that they can prevent and/or reduce air oxidation from that temperature and above.

According to another embodiment, this invention concerns the formulation of a water paint which may be made from a mixture sodium salts of carbonate, potassium salts of carbonate, and lithium salts. The sodium salt of carbonate and a potassium salt of carbonate are mixed in quantities that provide an equivalent $Na_2O:K_2O$ molar ratio of about 0.4 to about 1.8, to provide an aqueous coating having a melting temperature of between about 370° C. and 430° C., and preferably about 400° C. In these embodiments, the combination of the sodium salt of carbonate and the potassium salt of carbonate provide an equivalent $Na_2O:K_2O$ molar ratio varying between about 0.4 to about 1.8, or from about 0.4 to about 1.7, or from about 0.4 to about 1.6, or from about 0.4 to about 1.5, or from about 0.4 to about 1.4, or from about 0.4 to about 1.3, or from about 0.4 to about 1.2, or from about 0.4 to about 1.0, or from about 0.4 to about 0.9, or from about 0.4 to about 0.8, or from about 0.4 to about 0.7, or from about 0.4 to about 0.6, or from about 0.4 to about 0.5, or from about 0.5 to about 1.8, or from about 0.5 to about 1.7, or from about 0.5 to about 1.6, or from about 0.5 to about 1.5, or from about 0.5 to about 1.4, or from about 0.5 to about 1.3, or from about 0.5 to about 1.2, or from about 0.5 to about 1.0, or from about 0.5 to about 0.9, or from about 0.5 to about 0.8, or from about 0.5 to about 0.7, or from about 0.5 to about 0.6, or from about 0.6 to about 1.8, or from about 0.6 to about 1.7, or from about 0.6 to about 1.6, or from about 0.6 to about 1.5, or from about 0.6 to about 1.4, or from about 0.6 to about 1.3, or from about 0.6 to about 1.2, or from about 0.6 to about 1.0, or from about 0.6 to about 0.9, or from about 0.6 to about 0.8, or from about 0.6 to about 0.7, or from about 0.7 to about 1.8, or from about 0.7 to about 1.7, or from about 0.7 to about 1.6, or from about 0.7 to about 1.5, or from about 0.7 to about 1.4, or from about 0.7 to about 1.3, or from about 0.7 to about 1.2, or from about 0.7 to about 1.0, or from about 0.7 to about 0.9, or from about 0.7 to about 0.8, or from about 0.8 to about 1.8, or from about 0.8 to about 1.7, or from about 0.8 to about 1.6, or from about 0.8 to about 1.5, or from about 0.8 to about 1.4, or from about 0.8 to about 1.3, or from about 0.8 to about 1.2, or from about 0.8 to about 1.0, or from about 0.8 to about 0.9, or from about 0.9 to about 1.8, or from about 0.9 to about 1.7, or from about 0.9 to about 1.6, or from about 0.9 to about 1.5, or from about 0.9 to about 1.4, or from about 0.9 to about 1.3, or from about 0.9 to about 1.2, or from about 0.9 to about 1.0, or from about 1.0 to about 1.8, or from about 1.0 to about 1.7, or from about 1.0 to about 1.6, or from about 1.0 to about 1.5, or from about 1.0 to about 1.4, or from about 1.0 to about 1.3, or from about 1.0 to about 1.2, or from about 1.1 to about 1.8, or from about 1.1 to about 1.7, or from about 1.1 to about 1.6, or from about 1.1 to about 1.5, or from about 1.1 to about 1.4, or from about 1.1 to about 1.3, or from about 1.2 to about 1.8, or from about 1.2 to about 1.7, or from about 1.2 to about 1.6, or from about 1.2 to about 1.5, or from about 1.2 to about 1.4, or from about 1.2 to about 1.3, or from about 1.3 to about 1.8, or from about 1.3 to about 1.7, or from about 1.3 to about 1.6, or from about 1.3 to about 1.5, or from about 1.3 to about 1.4, or from about 1.4 to about 1.8, or from about 1.4 to about 1.7, or from about 1.4 to about 1.6, or from about 1.4 to about 1.5, or from about 1.5 to about 1.8, or from about 1.5 to about 1.7, or from about 1.5 to about 1.6, or from about 1.6 to about 1.8, or from about 1.6 to about 1.7, or from about 1.7 to about 1.8, or about 0.4, 0.5, 0.6, 0.7, 0.8, 0.9, 1.0, 1.1, 1.2, 1.3, 1.4, 1.5, 1.6, 1.7, and 1.8. Such aqueous coatings comprising the sodium salts and potassium salts of carbonate, such as $Na_2CO_3$, $K_2CO_3$, in the indicated equivalent molar ratio, and the lithium salt, such as $Li_2CO_3$, display melting temperatures that may be between about 370° C. and 430° C., and preferably about 400° C., such that they can prevent and/or reduce air oxidation from that temperature and above.

Therefore, in embodiments of the present invention, the sodium salt of carbonate may be selected from the group consisting of sodium carbonate ($Na_2CO_3$), and sodium bicarbonate ($NaHCO_3$), and combinations thereof. The potassium salt of carbonate may be selected from the group consisting of potassium carbonate ($K_2CO_3$), and potassium bicarbonate ($KHCO_3$), and combinations thereof. In preferred embodiments, the combination of a sodium salt of carbonate and a potassium salt of carbonate is a combination of sodium carbonate and potassium carbonate. In another preferred embodiments, the combination of a sodium salt of carbonate and a potassium salt of carbonate is a combination of sodium bicarbonate and potassium bicarbonate.

According to some embodiments, the concentration of sodium carbonate may be from about 7% to about 17% w/w, or from about 7% to about 16% w/w, or from about 7% to about 15% w/w, or from about 7% to about 14% w/w, or from about 7% to about 13% w/w, or from about 7% to about 12% w/w, or from about 7% to about 11% w/w, or from about 7% to about 10% w/w, or from about 7% to about 9% w/w, or from about 7% to about 8% w/w, or 8% to about 17% w/w, or from about 8% to about 16% w/w, or from about 8% to about 15% w/w, or from about 8% to about 14% w/w, or from about 8% to about 13% w/w, or from about 8% to about 12% w/w, or from about 8% to about 11% w/w, or from about 8% to about 10% w/w, or from about 8% to about 9% w/w, or 9% to about 17% w/w, or from about 9% to about 16% w/w, or from about 9% to about 15% w/w, or from about 9% to about 14% w/w, or from about 9% to about 13% w/w, or from about 9% to about 12% w/w, or from about 9% to about 11% w/w, or from about 9% to about 10% w/w, or 10% to about 17% w/w, or from about 10% to about 16% w/w, or from about 10% to about 15% w/w, or from about 10% to about 14% w/w, or from about 10% to about 13% w/w, or from about 10% to about 12% w/w, or from about 10% to about 11% w/w, or 11% to about 17% w/w, or from about 11% to about 16% w/w, or from about 11% to about 15% w/w, or from about 11% to about 14% w/w, or from about 11% to about 13% w/w, or from about 11% to about 12% w/w, or 12% to about 17% w/w, or from about 12% to about 16% w/w, or from about 12% to about 15% w/w, or from about 12% to about 14% w/w, or from about 12% to about 13% w/w, or 13% to about 17% w/w, or from about 13% to about 16% w/w, or from about 13% to about 15% w/w, or from about 13% to about 14% w/w, or 14% to about 17% w/w, or from about 14% to about 16% w/w, or from about 14% to about 15% w/w, or 15% to about 17% w/w, or from about 15% to about 16% w/w, or 16% to about 17% w/w, or about 7%, 8%, 9%, 10%, 11%, 12%, 13%, 14%, 15%, 16%, 17%, or about 12.75%, or about 13.59% w/w of the aqueous coating composition.

According to another embodiment, the concentration of sodium bicarbonate may be from about 11% to about 31% w/w, or from about 11% to about 30% w/w, or from about 11% to about 29% w/w, or from about 11% to about 28% w/w, or from about 11% to about 27% w/w, or from about 11% to about 26% w/w, or from about 11% to about 25% w/w, or from about 11% to about 24% w/w, or from about 11% to about 23% w/w, or from about 11% to about 22% w/w, or from about 11% to about 21% w/w, or from about 11% to about 20% w/w, or from about 11% to about 19% w/w, or from about 11% to about 18% w/w, or from about 11% to about 17% w/w, or from about 11% to about 16% w/w, or from about 11% to about 15% w/w, or from about 11% to about 14% w/w, or from about 11% to about 13% w/w, or from about 11% to about 12% w/w, or from about 12% to about 31% w/w, or from about 12% to about 30% w/w, or from about 12% to about 29% w/w, or from about 12% to about 28% w/w, or from about 12% to about 27% w/w, or from about 12% to about 26% w/w, or from about 12% to about 25% w/w, or from about 12% to about 24% w/w, or from about 12% to about 23% w/w, or from about 12% to about 22% w/w, or from about 12% to about 21% w/w, or from about 12% to about 20% w/w, or from about 12% to about 19% w/w, or from about 12% to about 18% w/w, or from about 12% to about 17% w/w, or from about 12% to about 16% w/w, or from about 12% to about 15% w/w, or from about 12% to about 14% w/w, or from about 12% to about 13% w/w, or from about 13% to about 31% w/w, or from about 13% to about 30% w/w, or from about 13% to about 29% w/w, or from about 13% to about 28% w/w, or from about 13% to about 27% w/w, or from about 13% to about 26% w/w, or from about 13% to about 25% w/w, or from about 13% to about 24% w/w, or from about 13% to about 23% w/w, or from about 13% to about 22% w/w, or from about 13% to about 21% w/w, or from about 13% to about 20% w/w, or from about 13% to about 19% w/w, or from about 13% to about 18% w/w, or from about 13% to about 17% w/w, or from about 13% to about 16% w/w, or from about 13% to about 15% w/w, or from about 13% to about 14% w/w, or from about 14% to about 31% w/w, or from about 14% to about 30% w/w, or from about 14% to about 29% w/w, or from about 14% to about 28% w/w, or from about 14% to about 27% w/w, or from about 14% to about 26% w/w, or from about 14% to about 25% w/w, or from about 14% to about 24% w/w, or from about 14% to about 23% w/w, or from about 14% to about 22% w/w, or from about 14% to about 21% w/w, or from about 14% to about 20% w/w, or from about 14% to about 19% w/w, or from about 14% to about 18% w/w, or from about 14% to about 17% w/w, or from about 14% to about 16% w/w, or from about 14% to about 15% w/w, or from about 15% to about 31% w/w, or from about 15% to about 30% w/w, or from about 15% to about 29% w/w, or from about 15% to about 28% w/w, or from about 15% to about 27% w/w, or from about 15% to about 26% w/w, or from about 15% to about 25% w/w, or from about 15% to about 24% w/w, or from about 15% to about 23% w/w, or from about 15% to about 22% w/w, or from about 15% to about 21% w/w, or from about 15% to about 20% w/w, or from about 15% to about 19% w/w, or from about 15% to about 18% w/w, or from about 15% to about 17% w/w, or from about 15% to about 16% w/w, or from about 16% to about 31% w/w, or from about 16% to about 30% w/w, or from about 16% to about 29% w/w, or from about 16% to about 28% w/w, or from about 16% to about 27% w/w, or from about 16% to about 26% w/w, or from about 16% to about 25% w/w, or from about 16% to about 24% w/w, or from about 16% to about 23% w/w, or from about 16% to about 22% w/w, or from about 16% to about 21% w/w, or from about 16% to about 20% w/w, or from about 16% to about 19% w/w, or from about 16% to about 18% w/w, or from about 16% to about 17% w/w, or from about 17% to about 31% w/w, or from about 17% to about 30% w/w, or from about 17% to about 29% w/w, or from about 17% to about 28% w/w, or from about 17% to about 27% w/w, or from about 17% to about 26% w/w, or from about 17% to about 25% w/w, or from about 17% to about 24% w/w, or from about 17% to about 23% w/w, or from about 17% to about 22% w/w, or from about 17% to about 21% w/w, or from about 17% to about 20% w/w, or from about 17% to about 19% w/w, or from about 17% to about 18% w/w, or from about 18% to about 31% w/w, or from about 18% to about 30% w/w, or from about 18% to about 29% w/w, or from about 18% to about 28% w/w, or from about 18% to about 27% w/w, or from about 18% to about 26% w/w, or from about 18% to about 25% w/w, or from about 18% to about 24% w/w, or from about 18% to about 23% w/w, or from about 18% to about 22% w/w, or from about 18% to about 21% w/w, or from about 18% to about 20% w/w, or from about 18% to about 19% w/w, or from about 19% to about 31% w/w, or from about 19% to about 30% w/w, or from about 19% to about 29% w/w, or from about 19% to about 28% w/w, or from about 19% to about 27% w/w, or from about 19% to about 26% w/w, or from about 19% to about 25% w/w, or from about 19% to about 24% w/w, or from about 19% to about 23% w/w, or from about 19% to about 22% w/w, or from about 19% to about 21% w/w, or from about 19% to about 20% w/w, or from about 20% to about 31% w/w, or from about 20% to about 30% w/w, or from about 20% to about 29% w/w, or from about 20% to about 28% w/w, or from about 20% to about 27% w/w, or from about 20% to about 26% w/w, or from about 20% to about 25% w/w, or from about 20% to about 24% w/w, or from about 20% to about 23% w/w, or from about 20% to about 22% w/w, or from about 20% to about 21% w/w, or from about 21% to about 31% w/w, or from about 21% to about 30% w/w, or from about 21% to about 29% w/w, or from about 21% to about 28% w/w, or from about 21% to about 27% w/w, or from about 21% to about 26% w/w, or from about 21% to about 25% w/w, or from about 21% to about 24% w/w, or from about 21% to about 23% w/w, or from about 21% to about 22% w/w, or from about 22% to about 31% w/w, or from about 22% to about 30% w/w, or from about 22% to about 29% w/w, or from about 22% to about 28% w/w, or from about 22% to about 27% w/w, or from about 22% to about 26% w/w, or from about 22% to about 25% w/w, or from about 22% to about 24% w/w, or from about 22% to about 23% w/w, or from about 23% to about 31% w/w, or from about 23% to about 30% w/w, or from about 23% to about 29% w/w, or from about 23% to about 28% w/w, or from about 23% to about 27% w/w, or from about 23% to about 26% w/w, or from about 23% to about 25% w/w, or from about 23% to about 24% w/w, or from about 24% to about 31% w/w, or from about 24% to about 30% w/w, or from about 24% to about 29% w/w, or from about 24% to about 28% w/w, or from about 24% to about 27% w/w, or from about 24% to about 26% w/w, or from about 24% to about 25% w/w, or from about 25% to about 31% w/w, or from about 25% to about 30% w/w, or from about 25% to about 29% w/w, or from about 25% to about 28% w/w, or from about 25% to about 27% w/w, or from about 25% to about 26% w/w, or from about 26% to about 31% w/w, or from about 26% to about 30% w/w, or from about 26% to about 29% w/w, or from about 26% to about 28% w/w, or from about 26% to about 27% w/w, or from about 27% to about 31% w/w, or from about 27% to about 30% w/w, or from about 27% to about 29% w/w, or from about 27% to about 28% w/w, or from about 28% to about 31% w/w, or from about 28% to about 30% w/w, or from about 28% to about 29% w/w, or from about 29% to about 31% w/w, or from about 29% to about 30% w/w, or from about 30% to about 31% w/w, or about 11%, 12%, 13%, 14%, 15%, 16%, 17%, 18%, 19%, 20%, 21%, 22%, 23%, 24%, 25%, 26%, 27%, 28%, 29%, 30%, 31%, or about 21.68% w/w, of the aqueous coating composition.

According to another embodiment, the concentration of potassium carbonate may be from about 15% to about 25% w/w, or from about 15% to about 24% w/w, or from about 15% to about 23% w/w, or from about 15% to about 22% w/w, or from about 15% to about 21% w/w, or from about 15% to about 20% w/w, or from about 15% to about 19% w/w, or from about 15% to about 18% w/w, or from about 15% to about 17% w/w, or from about 15% to about 16% w/w, or from about 16% to about 25% w/w, or from about 16% to about 24% w/w, or from about 16% to about 23% w/w, or from about 16% to about 22% w/w, or from about 16% to about 21% w/w, or from about 16% to about 20% w/w, or from about 16% to about 19% w/w, or from about 16% to about 18% w/w, or from about 16% to about 17% w/w, or from about 17% to about 25% w/w, or from about 17% to about 24% w/w, or from about 17% to about 23% w/w, or from about 17% to about 22% w/w, or from about 17% to about 21% w/w, or from about 17% to about 20% w/w, or from about 17% to about 19% w/w, or from about 17% to about 18% w/w, or from about 18% to about 25% w/w, or from about 18% to about 24% w/w, or from about 18% to about 23% w/w, or from about 18% to about 22% w/w, or from about 18% to about 21% w/w, or from about 18% to about 20% w/w, or from about 18% to about 19% w/w, or from about 19% to about 25% w/w, or from about 19% to about 24% w/w, or from about 19% to about 23% w/w, or from about 19% to about 22% w/w, or from about 19% to about 21% w/w, or from about 19% to about 20% w/w, or from about 20% to about 25% w/w, or from about 20% to about 24% w/w, or from about 20% to about 23% w/w, or from about 20% to about 22% w/w, or from about 20% to about 21% w/w, or from about 21% to about 25% w/w, or from about 21% to about 24% w/w, or from about 21% to about 23% w/w, or from about 21% to about 22% w/w, or from about 22% to about 25% w/w, or from about 22% to about 24% w/w, or from about 22% to about 23% w/w, or from about 23% to about 25% w/w, or from about 23% to about 24% w/w, or from about 24% to about 25% w/w, or about 15%, 16%, 17%, 18%, 19%, 20%, 21%, 22%, 23%, 24%, 25%, or about 20.32% or about 21.67% w/w of the aqueous coating composition.

According to another embodiment, the concentration of potassium bicarbonate may be from about 19% to about 43% w/w, or from about 19% to about 42% w/w, or from about 19% to about 41% w/w, or from about 19% to about 40% w/w, or from about 19% to about 39% w/w, or from about 19% to about 38% w/w, or from about 19% to about 37% w/w, or from about 19% to about 36% w/w, or from about 19% to about 35% w/w, or from about 19% to about 34% w/w, or from about 19% to about 33% w/w, or from about 19% to about 32% w/w, or from about 19% to about 31% w/w, or from about 19% to about 30% w/w, or from about 19% to about 29% w/w, or from about 19% to about 28% w/w, or from about 19% to about 27% w/w, or from about 19% to about 26% w/w, or from about 19% to about 25% w/w, or from about 19% to about 24% w/w, or from about 19% to about 23% w/w, or from about 19% to about 22% w/w, or from about 19% to about 21% w/w, or from about 19% to about 20% w/w, or from about 20% to about 43% w/w, or from about 20% to about 42% w/w, or from about 20% to about 41% w/w, or from about 20% to about 40% w/w, or from about 20% to about 39% w/w, or from about 20% to about 38% w/w, or from about 20% to about 37% w/w, or from about 20% to about 36% w/w, or from about 20% to about 35% w/w, or from about 20% to about 34% w/w, or from about 20% to about 33% w/w, or from about 20% to about 32% w/w, or from about 20% to about 31% w/w, or from about 20% to about 30% w/w, or from about 20% to about 29% w/w, or from about 20% to about 28% w/w, or from about 20% to about 27% w/w, or from about 20% to about 26% w/w, or from about 20% to about 25% w/w, or from about 20% to about 24% w/w, or from about 20% to about 23% w/w, or from about 20% to about 22% w/w, or from about 20% to about 21% w/w, or from about 21% to about 43% w/w, or from about 21% to about 42% w/w, or from about 21% to about 41% w/w, or from about 21% to about 40% w/w, or from about 21% to about 39% w/w, or from about 21% to about 38% w/w, or from about 21% to about 37% w/w, or from about 21% to about 36% w/w, or from about 21% to about 35% w/w, or from about 21% to about 34% w/w, or from about 21% to about 33% w/w, or from about 21% to about 32% w/w, or from about 21% to about 31% w/w, or from about 21% to about 30% w/w, or from about 21% to about 29% w/w, or from about 21% to about 28% w/w, or from about 21% to about 27% w/w, or from about 21% to about 26% w/w, or from about 21% to about 25% w/w, or from about 21% to about 24% w/w, or from about 21% to about 23% w/w, or from about 21% to about 22% w/w, or from about 22% to about 43% w/w, or from about 22% to about 42% w/w, or from about 22% to about 41% w/w, or from about 22% to about 40% w/w, or from about 22% to about 39% w/w, or from about 22% to about 38% w/w, or from about 22% to about 37% w/w, or from about 22% to about 36% w/w, or from about 22% to about 35% w/w, or from about 22% to about 34% w/w, or from about 22% to about 33% w/w, or from about 22% to about 32% w/w, or from about 22% to about 31% w/w, or from about 22% to about 30% w/w, or from about 22% to about 29% w/w, or from about 22% to about 28% w/w, or from about 22% to about 27% w/w, or from about 22% to about 26% w/w, or from about 22% to about 25% w/w, or from about 22% to about 24% w/w, or from about 22% to about 23% w/w, or from about 23% to about 43% w/w, or from about 23% to about 42% w/w, or from about 23% to about 41% w/w, or from about 23% to about 40% w/w, or from about 23% to about 39% w/w, or from about 23% to about 38% w/w, or from about 23% to about 37% w/w, or from about 23% to about 36% w/w, or from about 23% to about 35% w/w, or from about 23% to about 34% w/w, or from about 23% to about 33% w/w, or from about 23% to about 32% w/w, or from about 23% to about 31% w/w, or from about 23% to about 30% w/w, or from about 23% to about 29% w/w, or from about 23% to about 28% w/w, or from about 23% to about 27% w/w, or from about 23% to about 26% w/w, or from about 23% to about 25% w/w, or from about 23% to about 24% w/w, or from about 24% to about 43% w/w, or from about 24% to about 42% w/w, or from about 24% to about 41% w/w, or from about 24% to about 40% w/w, or from about 24% to about 39% w/w, or from about 24% to about 38% w/w, or from about 24% to about 37% w/w, or from about 24% to about 36% w/w, or from about 24% to about 35% w/w, or from about 24% to about 34% w/w, or from about 24% to about 33% w/w, or from about 24% to about 32% w/w, or from about 24% to about 31% w/w, or from about 24% to about 30% w/w, or from about 24% to about 29% w/w, or from about 24% to about 28% w/w, or from about 24% to about 27% w/w, or from about 24% to about 26% w/w, or from about 24% to about 25% w/w, or from about 25% to about 43% w/w, or from about 25% to about 42% w/w, or from about 25% to about 41% w/w, or from about 25% to about 40% w/w, or from about 25% to about 39% w/w, or from about 25% to about 38% w/w, or from about 25% to about 37% w/w, or from about 25% to about 36% w/w, or from about 25% to about 35% w/w, or from about 25% to about 34% w/w, or from about 25% to about 33% w/w, or from about 25% to about 32% w/w, or from about 25% to about 31% w/w, or from about 25% to about 30% w/w, or from about 25% to about 29% w/w, or from about 25% to about 28% w/w, or from about 25% to about 27% w/w, or from about 25% to about 26% w/w, or from about 25% to about 43% w/w, or from about 25% to about 42% w/w, or from about 25% to about 41% w/w, or from about 25% to about 40% w/w, or from about 25% to about 39% w/w, or from about 25% to about 38% w/w, or from about 25% to about 37% w/w, or from about 25% to about 36% w/w, or from about 25% to about 35% w/w, or from about 25% to about 34% w/w, or from about 25% to about 33% w/w, or from about 25% to about 32% w/w, or from about 25% to about 31% w/w, or from about 25% to about 30% w/w, or from about 25% to about 29% w/w, or from about 25% to about 28% w/w, or from about 25% to about 27% w/w, or from about 26% to about 43% w/w, or from about 26% to about 42% w/w, or from about 26% to about 41% w/w, or from about 26% to about 40% w/w, or from about 26% to about 39% w/w, or from about 26% to about 38% w/w, or from about 26% to about 37% w/w, or from about 26% to about 36% w/w, or from about 26% to about 35% w/w, or from about 26% to about 34% w/w, or from about 26% to about 33% w/w, or from about 26% to about 32% w/w, or from about 26% to about 31% w/w, or from about 26% to about 30% w/w, or from about 26% to about 29% w/w, or from about 26% to about 28% w/w, or from about 27% to about 43% w/w, or from about 27% to about 42% w/w, or from about 27% to about 41% w/w, or from about 27% to about 40% w/w, or from about 27% to about 39% w/w, or from about 27% to about 38% w/w, or from about 27% to about 37% w/w, or from about 27% to about 36% w/w, or from about 27% to about 35% w/w, or from about 27% to about 34% w/w, or from about 27% to about 33% w/w, or from about 27% to about 32% w/w, or from about 27% to about 31% w/w, or from about 27% to about 30% w/w, or from about 27% to about 29% w/w, or from about 29% to about 43% w/w, or from about 29% to about 42% w/w, or from about 29% to about 41% w/w, or from about 29% to about 40% w/w, or from about 29% to about 39% w/w, or from about 29% to about 38% w/w, or from about 29% to about 37% w/w, or from about 29% to about 36% w/w, or from about 29% to about 35% w/w, or from about 29% to about 34% w/w, or from about 29% to about 33% w/w, or from about 29% to about 32% w/w, or from about 29% to about 31% w/w, or from about 29% to about 30% w/w, or from about 30% to about 43% w/w, or from about 30% to about 42% w/w, or from about 30% to about 41% w/w, or from about 30% to about 40% w/w, or from about 30% to about 39% w/w, or from about 30% to about 38% w/w, or from about 30% to about 37% w/w, or from about 30% to about 36% w/w, or from about 30% to about 35% w/w, or from about 30% to about 34% w/w, or from about 30% to about 33% w/w, or from about 30% to about 32% w/w, or from about 30% to about 31% w/w, or from about 31% to about 43% w/w, or from about 31% to about 42% w/w, or from about 31% to about 41% w/w, or from about 31% to about 40% w/w, or from about 31% to about 39% w/w, or from about 31% to about 38% w/w, or from about 31% to about 37% w/w, or from about 31% to about 36% w/w, or from about 31% to about 35% w/w, or from about 31% to about 34% w/w, or from about 31% to about 33% w/w, or from about 31% to about 32% w/w, or from about 32% to about 43% w/w, or from about 32% to about 42% w/w, or from about 32% to about 41% w/w, or from about 32% to about 40% w/w, or from about 32% to about 39% w/w, or from about 32% to about 38% w/w, or from about 32% to about 37% w/w, or from about 32% to about 36% w/w, or from about 32% to about 35% w/w, or from about 32% to about 34% w/w, or from about 32% to about 33% w/w, or from about 33% to about 43% w/w, or from about 33% to about 42% w/w, or from about 33% to about 41% w/w, or from about 33% to about 40% w/w, or from about 33% to about 39% w/w, or from about 33% to about 38% w/w, or from about 33% to about 37% w/w, or from about 33% to about 36% w/w, or from about 33% to about 35% w/w, or from about 33% to about 34% w/w, or from about 34% to about 43% w/w, or from about 34% to about 42% w/w, or from about 34% to about 41% w/w, or from about 34% to about 40% w/w, or from about 34% to about 39% w/w, or from about 34% to about 38% w/w, or from about 34% to about 37% w/w, or from about 34% to about 36% w/w, or from about 34% to about 35% w/w, or from about 35% to about 43% w/w, or from about 35% to about 42% w/w, or from about 35% to about 41% w/w, or from about 35% to about 40% w/w, or from about 35% to about 39% w/w, or from about 35% to about 38% w/w, or from about 35% to about 37% w/w, or from about 35% to about 36% w/w, or from about 36% to about 43% w/w, or from about 36% to about 42% w/w, or from about 36% to about 41% w/w, or from about 36% to about 40% w/w, or from about 36% to about 39% w/w, or from about 36% to about 38% w/w, or from about 36% to about 37% w/w, or from about 37% to about 43% w/w, or from about 37% to about 42% w/w, or from about 37% to about 41% w/w, or from about 37% to about 40% w/w, or from about 37% to about 39% w/w, or from about 37% to about 38% w/w, or from about 38% to about 43% w/w, or from about 38% to about 42% w/w, or from about 38% to about 41% w/w, or from about 38% to about 40% w/w, or from about 38% to about 39% w/w, or from about 39% to about 43% w/w, or from about 39% to about 42% w/w, or from about 39% to about 41% w/w, or from about 39% to about 40% w/w, or from about 40% to about 43% w/w, or from about 40% to about 42% w/w, or from about 40% to about 41% w/w, or from about 41% to about 43% w/w, or from about 41% to about 42% w/w, or from about 42% to about 43% w/w, or 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, or 31.58% w/w of the aqueous coating composition.

According to embodiments, the equivalent $Li_2O$ molar content should be between about 17% and about 74% of the composition. The equivalent $Li_2O$ molar content may be provided from a lithium salt which may be selected from the group consisting of lithium carbonate ($Li_2CO_3$), lithium bicarbonate ($LiHCO_3$), LiF, a mixture of LiF and NaF, and combination of all of the above.

The equivalent molar ratio for lithium salts may be derived according to the following:

| Reaction | Molar equivalent |
| --- | --- |
| $Li_2CO_3 = Li_2O + CO_2$ | 1 mole de $Li_2CO_3$ = 2 moles of Lithium and thus 1 mole de $Li_2O$ equivalent |
| $2\ LiHCO_3 = Li_2O + 2\ CO_2 + H_2O$ | 2 moles de $LiHCO_3$ = 1 mole de $Li_2O$ equivalent |
| LIF | 1 mole de LiF = 1 mole de lithium and thus 1/2 mole de $Li_2O$ equivalent |

The equivalent $Li_2O$ molar content may be from about 17% to about 74% of the composition, or from about 20% to about 74%, or from about 25% to about 74%, or from about 30% to about 74%, or from about 35% to about 74%, or from about 40% to about 74%, or from about 45% to about 74%, or from about 50% to about 74%, or from about 55% to about 74%, or from about 60% to about 74%, or from about 65% to about 74%, or from about 70% to about 74%, or from 17% to about 70%, or from about 20% to about 70%, or from about 25% to about 70%, or from about 30% to about 70%, or from about 35% to about 70%, or from about 40% to about 70%, or from about 45% to about 70%, or from about 50% to about 70%, or from about 55% to about 70%, or from about 60% to about 70%, or from about 65% to about 70%, or from 17% to about 65%, or from about 20% to about 65%, or from about 25% to about 65%, or from about 30% to about 70%, or from about 35% to about 65%, or from about 40% to about 65%, or from about 45% to about 65%, or from about 50% to about 65%, or from about 55% to about 65%, or from about 60% to about 65%, or from 17% to about 60%, or from about 20% to about 60%, or from about 25% to about 60%, or from about 30% to about 60%, or from about 35% to about 60%, or from about 40% to about 60%, or from about 45% to about 60%, or from about 50% to about 60%, or from about 55% to about 60%, or from 17% to about 55%, or from about 20% to about 55%, or from about 25% to about 55%, or from about 30% to about 55%, or from about 35% to about 55%, or from about 40% to about 55%, or from about 45% to about 55%, or from about 50% to about 55%, or from 17% to about 50%, or from about 20% to about 50%, or from about 25% to about 50%, or from about 30% to about 50%, or from about 35% to about 50%, or from about 40% to about 50%, or from about 45% to about 50%, or from 17% to about 45%, or from about 20% to about 45%, or from about 25% to about 45%, or from about 30% to about 45%, or from about 35% to about 45%, or from about 40% to about 45%, or from 17% to about 40%, or from about 20% to about 40%, or from about 25% to about 40%, or from about 30% to about 40%, or from about 35% to about 40%, or from 17% to about 35%, or from about 20% to about 35%, or from about 25% to about 35%, or from about 30% to about 35%, or from 17% to about 30%, or from about 20% to about 30%, or from about 25% to about 30%, or from 17% to about 25%, or from about 20% to about 25%, or from 17% to about 20%, or 17%, 20%, 25%, 30%, 35%, 40%, 45%, 50%, 55%, 60%, 65%, 70%, or 74% of the composition.

In a preferred embodiment, the lithium salt is lithium carbonate. In a preferred embodiment, the lithium carbonate may be in suspension in the aqueous coating composition. The lithium carbonate may be any powdered form of lithium carbonate. However, smaller particles may be used in order to favor the homogeneity of the suspension. For example, nano-sized particles of lithium carbonate may be used to obtain stable suspensions.

Lithium bicarbonate may also be used in the composition of the present invention. It is however mostly available in solution form at maximum concentration of 5.39% w/w.

According to embodiments, the concentration of the lithium carbonate may be from about 8% to about 18% w/w, or from about 8% to about 17% w/w, or from about 8% to about 16% w/w, or from about 8% to about 15% w/w, or from about 8% to about 14% w/w, or from about 8% to about 13% w/w, or from about 8% to about 12% w/w, or from about 8% to about 11% w/w, or from about 8% to about 10% w/w, or from 8% to about 9% w/w, or from about 9% to about 18% w/w, or from about 9% to about 17% w/w, or from about 9% to about 16% w/w, or from about 9% to about 15% w/w, or from about 9% to about 14% w/w, or from about 9% to about 13% w/w, or from about 9% to about 12% w/w, or from about 9% to about 11% w/w, or from about 9% to about 10% w/w, or from about 10% to about 18% w/w, or from about 10% to about 17% w/w, or from about 10% to about 16% w/w, or from about 10% to about 15% w/w, or from about 10% to about 14% w/w, or from about 10% to about 13% w/w, or from about 10% to about 12% w/w, or from about 10% to about 11% w/w, or from about 11% to about 18% w/w, or from about 11% to about 17% w/w, or from about 11% to about 16% w/w, or from about 11% to about 15% w/w, or from about 11% to about 14% w/w, or from about 11% to about 13% w/w, or from about 11% to about 12% w/w, or from about 12% to about 18% w/w, or from about 12% to about 17% w/w, or from about 12% to about 16% w/w, or from about 12% to about 15% w/w, or from about 12% to about 14% w/w, or from about 12% to about 13% w/w, or from about 13% to about 18% w/w, or from about 13% to about 17% w/w, or from about 13% to about 16% w/w, or from about 13% to about 15% w/w, or from about 13% to about 14% w/w, or from about 14% to about 18% w/w, or from about 14% to about 17% w/w, or from about 14% to about 16% w/w, or from about 14% to about 15% w/w, or from about 15% to about 18% w/w, or from about 15% to about 17% w/w, or from about 15% to about 16% w/w, or from about 16% to about 18% w/w, or from about 17% to about 17% w/w, or from about 17% to about 18% w/w, or 8%, 9%, 10%, 11%, 12%, 13%, 14%, 15%, 16%, 17%, 18%, or 13.83% to about 14.74% w/w, or 13.83% w/w, or 14.74% w/w of the aqueous coating composition.

According to another embodiment, the LiF or LiF mixed with NaF may be used as salts of lithium according to concentrations that provide the adequate equivalent $Li_2O$ molar content.

According to another embodiment, the aqueous coating of the present invention may further comprise a liquid binder. As used herein, the term "liquid binder" means a liquid or a colloidal suspension that can, bind at room temperature, following chemical transformations such as reactions, gelling or hydration, a set of particles. The latter, originally in the pulverulent state, are transformed by the action of the liquid binder into a rigid material (non-zero modulus of elasticity). The liquid binder may comprise colloidal silica, colloidal alumina, a deflocculant and combinations thereof.

In embodiments, the concentration of colloidal silica may be up to 5% w/w, or up to 4% w/w, or up to 3% w/w, or up to 2% w/w, or up to 1% w/w, or up to 0.5%, or from about 0.5% to about 5%, or from about 0.5% to about 4%, or from about 0.5% to about 3%, or from about 0.5% to about 2%, or from about 0.5% to about 1%, or from about 1% to about 5%, or from about 1% to about 4%, or from about 1% to about 3%, or from about 1% to about 2%, or from about 2% to about 5%, or from about 2% to about 4%, or from about 2% to about 3%, or from about 3% to about 5%, or from about 3% to about 4%, or from about 4% to about 5%, or about 0.5%, 1%, 2%, 3%, 4%, 5%, or 0.65% w/w of the aqueous coating composition.

In embodiments, the concentration of colloidal alumina may be up to 8% w/w, or up to 7% w/w, or up to 6% w/w, or up to 5% w/w, or up to 4% w/w, or up to 3% w/w, or up to 2% w/w, or up to 1% w/w, or up to 0.5%, or from about 0.5% to about 8%, or from about 0.5% to about 7%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 8%, or from about 1% to about 7%, or from about 1% to about 6%, or from about 1% to about 5%, or from about 1% to about 4%, or from about 1% to about 3%, or from about 1% to about 2%, or from about 2% to about 8%, or from about 2% to about 7%, or from about 2% to about 6%, or from about 2% to about 5%, or from about 2% to about 4%, or from about 2% to about 3%, or from about 3% to about 8%, or from about 3% to about 7%, or from about 3% to about 6%, or from about 3% to about 5%, or from about 3% to about 4%, or from about 4% to about 8%, or from about 4% to about 7%, or from about 4% to about 6%, or from about 4% to about 5%, or from about 5% to about 8%, or from about 5% to about 7%, or from about 5% to about 6%, or from about 6% to about 8%, or from about 6% to about 7%, or from about 7% to about 8%, or about 0.5%, 1%, 2%, 3%, 4%, 5%, 6%, 7%, 8%, or 5.55% w/w of the aqueous coating composition.

In embodiments, the liquid binder may also comprise a deflocculant, which is a compound that is added to the composition to minimize settling out, prevent flocculation and disperse the other ingredients, increase fluidity of the composition, and help form a colloid or suspension. The deflocculant may be selected from the group consisting of polyethylene glycol graft polymers, such as Castament® FS10, FS20 or FS60.

In embodiments, the concentration of the deflocculant may be up to 6% w/w, or up to 5% w/w, or up to 4% w/w, or up to 3% w/w, or up to 2% w/w, or up to 1% w/w, or up to 0.5%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 6%, or from about 1% to about 5%, or from about 1% to about 4%, or from about 1% to about 3%, or from about 1% to about 2%, or from about 2% to about 6%, or from about 2% to about 5%, or from about 2% to about 4%, or from about 2% to about 3%, or from about 3% to about 6%, or from about 3% to about 5%, or from about 3% to about 4%, or from about 4% to about 6%, or from about 4% to about 5%, or from about 5% to about 6%, or about 0.5%, 1%, 2%, 3%, 4%, 5%, 6% w/w of the aqueous coating composition.

In embodiments, the layer aqueous coating composition may have a wet film thickness of about 0.15 mm to about 0.50 mm, or a wet film thickness of about 0.25±0.05 mm. In embodiments, the layer aqueous coating composition may have a residual water content of about 12% w/w or less.

In another embodiment there is disclosed a method of coating a carbon material with a chemical treatment for preventing or reducing air oxidation of the carbon material, the chemical treatment comprising a first layer comprising an aqueous priming coating composition covering an external surface exposed to air of the carbon material; and a second layer, covering the first layer, comprising an aqueous coating composition.

In embodiments, the aqueous priming coating composition comprises a mixture of aluminum oxide ($Al_2O_3$), comprising a combination of aluminum oxide selected from the group consisting of calcined aluminum oxide, reactive aluminum oxide, and white fused aluminum oxide; and water, as detailed above.

In embodiments, the aqueous coating composition comprising a combination of a sodium salt of carbonate and a potassium salt of carbonate providing an equivalent $Na_2O$:$K_2O$ molar ratio of about 0.4 to about 2.0, and water, the aqueous coating composition having a melting temperature of up to about 600° C.

The method comprises the steps of:

First, applying the aqueous priming coating composition to the external surface exposed to air of the carbon material and in an environment at a temperature of from about 74° C. to about 124° C., applying to the aqueous priming coating composition forced air at a temperature of from about 80° C. to about 126° C., a velocity of about 2 to about 20 m/s, and a relative humidity of 15% or less, preferably from about 10.5 to about 13.3%, in combination with actinic infrared radiation from a distance from the external surface of about 5 cm to about 15 cm, for a time sufficient to dry the aqueous priming coating composition, to form the first layer.

In embodiments, the temperature of the environment may be from about 74° C. to about 124° C., or from about 75° C. to about 124° C., or from about 80° C. to about 124° C., or from about 85° C. to about 124° C., or from about 90° C. to about 124° C., or from about 95° C. to about 124° C., or from about 100° C. to about 124° C., or from about 105° C. to about 124° C., or from about 110° C. to about 124° C., or from about 115° C. to about 124° C., or from about 120° C. to about 124° C., or from about 74° C. to about 120° C., or from about 75° C. to about 120° C., or from about 80° C. to about 120° C., or from about 85° C. to about 120° C., or from about 90° C. to about 120° C., or from about 95° C. to about 120° C., or from about 100° C. to about 120° C., or from about 105° C. to about 120° C., or from about 110° C. to about 120° C., or from about 115° C. to about 120° C., or from about 74° C. to about 115° C., or from about 75° C. to about 115° C., or from about 80° C. to about 115° C., or from about 85° C. to about 115° C., or from about 90° C. to about 115° C., or from about 95° C. to about 115° C., or from about 100° C. to about 115° C., or from about 105° C. to about 115° C., or from about 110° C. to about 115° C., or from about 74° C. to about 110° C., or from about 75° C. to about 110° C., or from about 80° C. to about 110° C., or from about 85° C. to about 110° C., or from about 90° C. to about 110° C., or from about 95° C. to about 110° C., or from about 100° C. to about 110° C., or from about 105° C. to about 110° C., or from about 74° C. to about 105° C., or from about 75° C. to about 105° C., or from about 80° C. to about 105° C., or from about 85° C. to about 105° C., or from about 90° C. to about 105° C., or from about 95° C. to about 105° C., or from about 100° C. to about 105° C., or from about 74° C. to about 100° C., or from about 75° C. to about 100° C., or from about 80° C. to about 100° C., or from about 85° C. to about 100° C., or from about 90° C. to about 100° C., or from about 95° C. to about 100° C., or from about 74° C. to about 95° C., or from about 75° C. to about 95° C., or from about 80° C. to about 95° C., or from about 85° C. to about 95° C., or from about 90° C. to about 95° C., or from about 74° C. to about 90° C., or from about 75° C. to about 90° C., or from about 80° C. to about 90° C., or from about 85° C. to about 90° C., or from about 74° C. to about 85° C., or from about 75° C. to about 85° C., or from about 80° C. to about 85° C., or from about 74° C. to about 80° C., or from about 75° C. to about 80° C., or from about 74° C. to about 75° C., or about 75, 76, 77, 78, 79, 80, 81, 82, 83, 84, 85, 85, 87, 88, 89, 90, 91, 92, 93, 94, 95, 96, 97, 98, 99, 100, 101, 102, 103, 104, 105, 106, 107, 108, 109, 110, 111, 112,113, 114, 115, 116, 117, 118, 119, 120, 121, 122, 123, 124° C.

In embodiments, the forced air may be at a temperature of from about 80° C. to about 126° C., or from about 85° C. to about 126° C., or from about 90° C. to about 126° C., or from about 95° C. to about 126° C., or from about 100° C. to about 126° C., or from about 105° C. to about 126° C., or from about 110° C. to about 126° C., or from about 115° C. to about 126° C., or from about 120° C. to about 126° C., or from about 125° C. to about 126° C., or from about 80° C. to about 125° C., or from about 85° C. to about 125° C., or from about 90° C. to about 125° C., or from about 95° C. to about 125° C., or from about 100° C. to about 125° C., or from about 105° C. to about 125° C., or from about 110° C. to about 125° C., or from about 115° C. to about 125° C., or from about 120° C. to about 125° C., or from about 80° C. to about 124° C., or from about 85° C. to about 124° C., or from about 90° C. to about 124° C., or from about 95° C. to about 124° C., or from about 100° C. to about 124° C., or from about 105° C. to about 124° C., or from about 110° C. to about 124° C., or from about 115° C. to about 124° C., or from about 120° C. to about 124° C., or from about 80° C. to about 120° C., or from about 85° C. to about 120° C., or from about 90° C. to about 120° C., or from about 95° C. to about 120° C., or from about 100° C. to about 120° C., or from about 105° C. to about 120° C., or from about 110° C. to about 120° C., or from about 115° C. to about 120° C., or from about 80° C. to about 115° C., or from about 85° C. to about 115° C., or from about 90° C. to about 115° C., or from about 95° C. to about 115° C., or from about 100° C. to about 115° C., or from about 105° C. to about 115° C., or from about 110° C. to about 115° C., or from about 80° C. to about 110° C., or from about 85° C. to about 110° C., or from about 90° C. to about 110° C., or from about 95° C. to about 110° C., or from about 100° C. to about 110° C., or from about 105° C. to about 110° C., or from about 80° C. to about 105° C., or from about 85° C. to about 105° C., or from about 90° C. to about 105° C., or from about 95° C. to about 105° C., or from about 100° C. to about 105° C., or from about 80° C. to about 100° C., or from about 85° C. to about 100° C., or from about 90° C. to about 100° C., or from about 95° C. to about 100° C., or from about 80° C. to about 95° C., or from about 85° C. to about 95° C., or from about 90° C. to about 95° C., or from about 80° C. to about 90° C., or from about 85° C. to about 90° C., or from about 80° C. to about 85° C., about 80, 81, 82, 83, 84, 85, 85, 87, 88, 89, 90, 91, 92, 93, 94, 95, 96, 97, 98, 99, 100, 101, 102, 103, 104, 105, 106, 107, 108, 109, 110, 111, 112,113, 114, 115, 116, 117, 118, 119, 120, 121, 122, 123, 124, 125, 126° C.

In embodiments, the forced air velocity may be of about 2 to about 20 m/s, or about 3 to about 20 m/s, or about 4 to about 20 m/s, or about 4 to about 20 m/s, or about 5 to about 20 m/s, or about 6 to about 20 m/s, or about 7 to about 20 m/s, or about 8 to about 20 m/s, or about 9 to about 20 m/s, or about 10 to about 20 m/s, or about 11 to about 20 m/s, or about 12 to about 20 m/s, or about 13 to about 20 m/s, or about 14 to about 20 m/s, or about 15 to about 20 m/s, or about 16 to about 20 m/s, or about 17 to about 20 m/s, or about 18 to about 20 m/s, or about 19 to about 20 m/s, or about 2 to about 19 m/s, or about 3 to about 19 m/s, or about 4 to about 19 m/s, or about 4 to about 19 m/s, or about 5 to about 19 m/s, or about 6 to about 19 m/s, or about 7 to about 19 m/s, or about 8 to about 19 m/s, or about 9 to about 19 m/s, or about 10 to about 19 m/s, or about 11 to about 19 m/s, or about 12 to about 19 m/s, or about 13 to about 19 m/s, or about 14 to about 19 m/s, or about 15 to about 19 m/s, or about 16 to about 19 m/s, or about 17 to about 19 m/s, or about 18 to about 19 m/s, or about 2 to about 18 m/s, or about 3 to about 18 m/s, or about 4 to about 18 m/s, or about 4 to about 18 m/s, or about 5 to about 18 m/s, or about 6 to about 18 m/s, or about 7 to about 18 m/s, or about 8 to about 18 m/s, or about 9 to about 18 m/s, or about 10 to about 18 m/s, or about 11 to about 18 m/s, or about 12 to about 18 m/s, or about 13 to about 18 m/s, or about 14 to about 18 m/s, or about 15 to about 18 m/s, or about 16 to about 18 m/s, or about 17 to about 18 m/s, or about 2 to about 17 m/s, or about 3 to about 17 m/s, or about 4 to about 17 m/s, or about 4 to about 17 m/s, or about 5 to about 17 m/s, or about 6 to about 17 m/s, or about 7 to about 17 m/s, or about 8 to about 17 m/s, or about 9 to about 17 m/s, or about 10 to about 17 m/s, or about 11 to about 17 m/s, or about 12 to about 17 m/s, or about 13 to about 17 m/s, or about 14 to about 17 m/s, or about 15 to about 17 m/s, or about 16 to about 17 m/s, or about 2 to about 16 m/s, or about 3 to about 16 m/s, or about 4 to about 16 m/s, or about 4 to about 16 m/s, or about 5 to about 16 m/s, or about 6 to about 16 m/s, or about 7 to about 16 m/s, or about 8 to about 16 m/s, or about 9 to about 16 m/s, or about 10 to about 16 m/s, or about 11 to about 16 m/s, or about 12 to about 16 m/s, or about 13 to about 16 m/s, or about 14 to about 16 m/s, or about 15 to about 16 m/s, or about 2 to about 15 m/s, or about 3 to about 15 m/s, or about 4 to about 15 m/s, or about 4 to about 15 m/s, or about 5 to about 15 m/s, or about 6 to about 15 m/s, or about 7 to about 15 m/s, or about 8 to about 15 m/s, or about 9 to about 15 m/s, or about 10 to about 15 m/s, or about 11 to about 15 m/s, or about 12 to about 15 m/s, or about 13 to about 15 m/s, or about 14 to about 15 m/s, or about 2 to about 14 m/s, or about 3 to about 14 m/s, or about 4 to about 14 m/s, or about 4 to about 14 m/s, or about 5 to about 14 m/s, or about 6 to about 14 m/s, or about 7 to about 14 m/s, or about 8 to about 14 m/s, or about 9 to about 14 m/s, or about 10 to about 14 m/s, or about 11 to about 14 m/s, or about 12 to about 14 m/s, or about 13 to about 14 m/s, or about 2 to about 13 m/s, or about 3 to about 13 m/s, or about 4 to about 13 m/s, or about 4 to about 13 m/s, or about 5 to about 13 m/s, or about 6 to about 13 m/s, or about 7 to about 13 m/s, or about 8 to about 13 m/s, or about 9 to about 13 m/s, or about 10 to about 13 m/s, or about 11 to about 13 m/s, or about 12 to about 13 m/s, or about 2 to about 12 m/s, or about 3 to about 12 m/s, or about 4 to about 12 m/s, or about 4 to about 12 m/s, or about 5 to about 12 m/s, or about 6 to about 12 m/s, or about 7 to about 12 m/s, or about 8 to about 12 m/s, or about 9 to about 12 m/s, or about 10 to about 12 m/s, or about 11 to about 12 m/s, or about 2 to about 11 m/s, or about 3 to about 11 m/s, or about 4 to about 11 m/s, or about 4 to about 11 m/s, or about 5 to about 11 m/s, or about 6 to about 11 m/s, or about 7 to about 11 m/s, or about 8 to about 11 m/s, or about 9 to about 11 m/s, or about 10 to about 11 m/s, or about 2 to about 10 m/s, or about 3 to about 10 m/s, or about 4 to about 10 m/s, or about 4 to about 10 m/s, or about 5 to about 10 m/s, or about 6 to about 10 m/s, or about 7 to about 10 m/s, or about 8 to about 10 m/s, or about 9 to about 10 m/s, or about 2 to about 9 m/s, or about 3 to about 9 m/s, or about 4 to about 9 m/s, or about 4 to about 9 m/s, or about 5 to about 9 m/s, or about 6 to about 9 m/s, or about 7 to about 9 m/s, or about 8 to about 9 m/s, or about 2 to about 8 m/s, or about 3 to about 8 m/s, or about 4 to about 8 m/s, or about 4 to about 8 m/s, or about 5 to about 8 m/s, or about 6 to about 8 m/s, or about 7 to about 8 m/s, or about 2 to about 7 m/s, or about 3 to about 7 m/s, or about 4 to about 7 m/s, or about 5 to about 7 m/s, or about 6 to about 7 m/s, or about 2 to about 6 m/s, or about 3 to about 6 m/s, or about 4 to about 6 m/s, or about 5 to about 6 m/s, or about 2 to about 5 m/s, or about 3 to about 5 m/s, or about 4 to about 5 m/s, or about 2 to about 5 m/s, or about 3 to about 5 m/s, or about 4 to about 5 m/s, or about 2 to about 4 m/s, or about 3 to about 4 m/s, or 2, 3, 4, 5, 6, 7, 8, 9, 10, 11, 12, 13, 14, 15, 16, 17, 18, 19, or 20 m/s.

In embodiments, the relative humidity may be 15% or less, or 14% or less, or 13% or less, or 12% or less, or 11% or less, or 10% or less, or 9% or less, or 8% or less, or 7% or less, or 6% or less, or 5% or less, or 4% or less, or 3% or less, or 2% or less, or 1% or less, or about 10.5 to about 15%, or about 10.5 to about 14.5%, or about 10.5 to about 14%, or about 10.5 to about 13.5%, or about 10.5 to about 13.3%, or about 10.5 to about 13%, or about 10.5 to about 12.5%, or about 10.5 to about 12%, or about 10.5 to about 11.5%, or about 10.5 to about 11%, or about 11 to about 15%, or about 11 to about 14.5%, or about 11 to about 14%, or about 11 to about 13.5%, or about 11 to about 13.3%, or about 11 to about 13%, or about 11 to about 12.5%, or about 11 to about 12%, or about 11 to about 11.5%, or about 11.5 to about 15%, or about 11.5 to about 14.5%, or about 11.5 to about 14%, or about 11.5 to about 13.5%, or about 11.5 to about 13.3%, or about 11.5 to about 13%, or about 11.5 to about 12.5%, or about 11.5 to about 12%, or about 12 to about 15%, or about 12 to about 14.5%, or about 12 to about 14%, or about 12 to about 13.5%, or about 12 to about 13.3%, or about 12 to about 13%, or about 12 to about 12.5%, or about 12.5 to about 15%, or about 12.5 to about 14.5%, or about 12.5 to about 14%, or about 12.5 to about 13.5%, or about 12.5 to about 13.3%, or about 12.5 to about 13%, or about 13 to about 15%, or about 13 to about 14.5%, or about 13 to about 14%, or about 13 to about 13.5%, or about 13 to about 13.3%, or about 14 to about 15%, or about 14 to about 14.5%, or about 14 to about 15%, or about 14.5 to about 15%.

In embodiments, the actinic infrared radiation may be from a distance from the external surface of about 5 cm to about 15 cm, or about 5 cm to about 14 cm, or about 5 cm to about 13 cm, or about 5 cm to about 12 cm, or about 5 cm to about 11 cm, or about 5 cm to about 10 cm, or about 5 cm to about 9 cm, or about 5 cm to about 8 cm, or about 5 cm to about 7 cm, or about 5 cm to about 6 cm, or about 6 cm to about 15 cm, or about 6 cm to about 14 cm, or about 6 cm to about 13 cm, or about 6 cm to about 12 cm, or about 6 cm to about 11 cm, or about 6 cm to about 10 cm, or about 6 cm to about 9 cm, or about 6 cm to about 8 cm, or about 6 cm to about 7 cm, or about 7 cm to about 15 cm, or about 7 cm to about 14 cm, or about 7 cm to about 13 cm, or about 7 cm to about 12 cm, or about 7 cm to about 11 cm, or about 7 cm to about 10 cm, or about 7 cm to about 9 cm, or about 7 cm to about 8 cm, or about 8 cm to about 15 cm, or about 8 cm to about 14 cm, or about 8 cm to about 13 cm, or about 8 cm to about 12 cm, or about 8 cm to about 11 cm, or about 8 cm to about 10 cm, or about 8 cm to about 9 cm, or about 9 cm to about 15 cm, or about 9 cm to about 14 cm, or about 9 cm to about 13 cm, or about 9 cm to about 12 cm, or about 9 cm to about 11 cm, or about 9 cm to about 10 cm, or about 10 cm to about 15 cm, or about 10 cm to about 14 cm, or about 10 cm to about 13 cm, or about 10 cm to about 12 cm, or about 10 cm to about 11 cm, or about 11 cm to about 15 cm, or about 11 cm to about 14 cm, or about 11 cm to about 13 cm, or about 11 cm to about 12 cm, or about 12 cm to about 15 cm, or about 12 cm to about 14 cm, or about 12 cm to about 13 cm, or about 13 cm to about 15 cm, or about 13 cm to about 14 cm, or about 14 cm to about 15 cm, or 5, 6, 7, 8, 9, 10, 11, 12, 13, 14, or 15 cm.

Secondly, applying the aqueous coating composition to the first layer having a surface temperature of about 59° C. to about 100° C. and in an environment at a temperature of from about 108° C. to about 127° C., applying to the aqueous coating composition forced air at a temperature of from about 110° C. to about 275° C., a velocity of about 2 to about 22 m/s, and a relative humidity of 15% or less, preferably 9.95 to 11.1%, in combination with actinic infrared radiation from a distance from the external surface of about 5 cm to about 15 cm, for a time sufficient to dry the aqueous coating composition and form the second layer.

According to another embodiment, the second step may be applying said aqueous coating composition to said first layer having a surface temperature of about 60° C. to about 80° C. and then introduce said carbon material in an environment at a temperature of from about 40° C. to about 60° C. and a relative humidity of 12 to 16% for a time sufficient to dry said aqueous coating composition and form said second layer.

In embodiments, the temperature of the environment may be from about 59° C. to about 100° C., or from about 60° C. to about 100° C., or from about 65° C. to about 100° C., or from about 70° C. to about 100° C., or from about 75° C. to about 100° C., or from about 80° C. to about 100° C., or from about 85° C. to about 100° C., or from about 90° C. to about 100° C., or from about 95° C. to about 100° C., or from about 59° C. to about 95° C., or from about 60° C. to about 95° C., or from about 65° C. to about 95° C., or from about 70° C. to about 95° C., or from about 75° C. to about 95° C., or from about 80° C. to about 95° C., or from about 85° C. to about 95° C., or from about 90° C. to about 95° C., or from about 59° C. to about 90° C., or from about 60° C. to about 90° C., or from about 65° C. to about 90° C., or from about 70° C. to about 90° C., or from about 75° C. to about 90° C., or from about 80° C. to about 90° C., or from about 85° C. to about 90° C., or from about 59° C. to about 85° C., or from about 60° C. to about 85° C., or from about 65° C. to about 85° C., or from about 70° C. to about 85° C., or from about 75° C. to about 85° C., or from about 80° C. to about 85° C., or from about 59° C. to about 80° C., or from about 60° C. to about 80° C., or from about 65° C. to about 80° C., or from about 70° C. to about 80° C., or from about 75° C. to about 80° C., or from about 59° C. to about 75° C., or from about 60° C. to about 75° C., or from about 65° C. to about 75° C., or from about 70° C. to about 75° C., or from about 59° C. to about 70° C., or from about 60° C. to about 70° C., or from about 65° C. to about 70° C., or from about 59° C. to about 65° C., or from about 60° C. to about 65° C., or from about 59° C. to about 60° C., or about 59, 60, 61, 62, 63, 64, 65, 66, 67, 68, 69, 70, 71, 72, 73, 74, 75, 76, 77, 78, 79, 80, 81, 82, 83, 84, 85, 85, 87, 88, 89, 90, 91, 92, 93, 94, 95, 96, 97, 98, 99, 100° C.

In embodiments, the forced air may be at a temperature of from about 108° C. to about 275° C., or from about 110° C. to about 275° C., or from about 115° C. to about 275° C., or from about 120° C. to about 275° C., or from about 125° C. to about 275° C., or from about 150° C. to about 275° C., or from about 175° C. to about 275° C., or from about 200° C. to about 275° C., or from about 225° C. to about 275° C., or from about 250° C. to about 275° C., or 108° C. to about 250° C., or from about 110° C. to about 250° C., or from about 115° C. to about 250° C., or from about 120° C. to about 250° C., or from about 125° C. to about 250° C., or from about 150° C. to about 250° C., or from about 175° C. to about 250° C., or from about 200° C. to about 250° C., or from about 225° C. to about 250° C., or 108° C. to about 225° C., or from about 110° C. to about 225° C., or from about 115° C. to about 225° C., or from about 120° C. to about 225° C., or from about 125° C. to about 225° C., or from about 150° C. to about 225° C., or from about 175° C. to about 225° C., or from about 200° C. to about 225° C., or 108° C. to about 200° C., or from about 110° C. to about 200° C., or from about 115° C. to about 200° C., or from about 120° C. to about 200° C., or from about 125° C. to about 200° C., or from about 150° C. to about 200° C., or from about 175° C. to about 200° C., or 108° C. to about 175° C., or from about 110° C. to about 175° C., or from about 115° C. to about 175° C., or from about 120° C. to about 175° C., or from about 125° C. to about 175° C., or from about 150° C. to about 175° C., or 108° C. to about 150° C., or from about 110° C. to about 150° C., or from about 115° C. to about 150° C., or from about 120° C. to about 150° C., or from about 125° C. to about 150° C., or 108° C. to about 127° C., or from about 110° C. to about 127° C., or from about 115° C. to about 127° C., or from about 120° C. to about 127° C., or from about 125° C. to about 127° C., 108° C. to about 126° C., or from about 110° C. to about 126° C., or from about 115° C. to about 126° C., or from about 120° C. to about 126° C., or from about 125° C. to about 126° C., or from about 108° C. to about 125° C., or from about 110° C. to about 125° C., or from about 115° C. to about 125° C., or from about 120° C. to about 125° C., or from about 108° C. to about 120° C., or from about 110° C. to about 120° C., or from about 115° C. to about 120° C., or from about 108° C. to about 115° C., or from about 110° C. to about 115° C., or from about 108° C. to about 110° C., or about 108, 109, 110, 111, 112,113, 114, 115, 116, 117, 118, 119, 120, 121, 122, 123, 124, 125, 126, 127, 150, 175, 200, 225, 250, or 275° C.

In embodiments, the forced air velocity may be of 2 to about 22 m/s, or about 3 to about 22 m/s, or about 4 to about 22 m/s, or about 4 to about 22 m/s, or about 5 to about 22 m/s, or about 6 to about 22 m/s, or about 7 to about 22 m/s, or about 8 to about 22 m/s, or about 9 to about 22 m/s, or about 10 to about 22 m/s, or about 11 to about 22 m/s, or about 12 to about 22 m/s, or about 13 to about 22 m/s, or about 14 to about 22 m/s, or about 15 to about 22 m/s, or about 16 to about 22 m/s, or about 17 to about 22 m/s, or about 18 to about 22 m/s, or about 19 to about 22 m/s, or about 20 to about 22 m/s, or about 21 to about 22 m/s, or 2 to about 21 m/s, or about 3 to about 21 m/s, or about 4 to about 21 m/s, or about 4 to about 21 m/s, or about 5 to about 21 m/s, or about 6 to about 21 m/s, or about 7 to about 21 m/s, or about 8 to about 21 m/s, or about 9 to about 21 m/s, or about 10 to about 21 m/s, or about 11 to about 21 m/s, or about 12 to about 21 m/s, or about 13 to about 21 m/s, or about 14 to about 21 m/s, or about 15 to about 21 m/s, or about 16 to about 21 m/s, or about 17 to about 21 m/s, or about 18 to about 21 m/s, or about 19 to about 21 m/s, or about 20 to about 21 m/s, or about 2 to about 20 m/s, or about 3 to about 20 m/s, or about 4 to about 20 m/s, or about 4 to about 20 m/s, or about 5 to about 20 m/s, or about 6 to about 20 m/s, or about 7 to about 20 m/s, or about 8 to about 20 m/s, or about 9 to about 20 m/s, or about 10 to about 20 m/s, or about 11 to about 20 m/s, or about 12 to about 20 m/s, or about 13 to about 20 m/s, or about 14 to about 20 m/s, or about 15 to about 20 m/s, or about 16 to about 20 m/s, or about 17 to about 20 m/s, or about 18 to about 20 m/s, or about 19 to about 20 m/s, or about 2 to about 19 m/s, or about 3 to about 19 m/s, or about 4 to about 19 m/s, or about 4 to about 19 m/s, or about 5 to about 19 m/s, or about 6 to about 19 m/s, or about 7 to about 19 m/s, or about 8 to about 19 m/s, or about 9 to about 19 m/s, or about 10 to about 19 m/s, or about 11 to about 19 m/s, or about 12 to about 19 m/s, or about 13 to about 19 m/s, or about 14 to about 19 m/s, or about 15 to about 19 m/s, or about 16 to about 19 m/s, or about 17 to about 19 m/s, or about 18 to about 19 m/s, or about 2 to about 18 m/s, or about 3 to about 18 m/s, or about 4 to about 18 m/s, or about 4 to about 18 m/s, or about 5 to about 18 m/s, or about 6 to about 18 m/s, or about 7 to about 18 m/s, or about 8 to about 18 m/s, or about 9 to about 18 m/s, or about 10 to about 18 m/s, or about 11 to about 18 m/s, or about 12 to about 18 m/s, or about 13 to about 18 m/s, or about 14 to about 18 m/s, or about 15 to about 18 m/s, or about 16 to about 18 m/s, or about 17 to about 18 m/s, or about 2 to about 17 m/s, or about 3 to about 17 m/s, or about 4 to about 17 m/s, or about 4 to about 17 m/s, or about 5 to about 17 m/s, or about 6 to about 17 m/s, or about 7 to about 17 m/s, or about 8 to about 17 m/s, or about 9 to about 17 m/s, or about 10 to about 17 m/s, or about 11 to about 17 m/s, or about 12 to about 17 m/s, or about 13 to about 17 m/s, or about 14 to about 17 m/s, or about 15 to about 17 m/s, or about 16 to about 17 m/s, or about 2 to about 16 m/s, or about 3 to about 16 m/s, or about 4 to about 16 m/s, or about 4 to about 16 m/s, or about 5 to about 16 m/s, or about 6 to about 16 m/s, or about 7 to about 16 m/s, or about 8 to about 16 m/s, or about 9 to about 16 m/s, or about 10 to about 16 m/s, or about 11 to about 16 m/s, or about 12 to about 16 m/s, or about 13 to about 16 m/s, or about 14 to about 16 m/s, or about 15 to about 16 m/s, or about 2 to about 15 m/s, or about 3 to about 15 m/s, or about 4 to about 15 m/s, or about 4 to about 15 m/s, or about 5 to about 15 m/s, or about 6 to about 15 m/s, or about 7 to about 15 m/s, or about 8 to about 15 m/s, or about 9 to about 15 m/s, or about 10 to about 15 m/s, or about 11 to about 15 m/s, or about 12 to about 15 m/s, or about 13 to about 15 m/s, or about 14 to about 15 m/s, or about 2 to about 14 m/s, or about 3 to about 14 m/s, or about 4 to about 14 m/s, or about 4 to about 14 m/s, or about 5 to about 14 m/s, or about 6 to about 14 m/s, or about 7 to about 14 m/s, or about 8 to about 14 m/s, or about 9 to about 14 m/s, or about 10 to about 14 m/s, or about 11 to about 14 m/s, or about 12 to about 14 m/s, or about 13 to about 14 m/s, or about 2 to about 13 m/s, or about 3 to about 13 m/s, or about 4 to about 13 m/s, or about 4 to about 13 m/s, or about 5 to about 13 m/s, or about 6 to about 13 m/s, or about 7 to about 13 m/s, or about 8 to about 13 m/s, or about 9 to about 13 m/s, or about 10 to about 13 m/s, or about 11 to about 13 m/s, or about 12 to about 13 m/s, or about 2 to about 12 m/s, or about 3 to about 12 m/s, or about 4 to about 12 m/s, or about 4 to about 12 m/s, or about 5 to about 12 m/s, or about 6 to about 12 m/s, or about 7 to about 12 m/s, or about 8 to about 12 m/s, or about 9 to about 12 m/s, or about 10 to about 12 m/s, or about 11 to about 12 m/s, or about 2 to about 11 m/s, or about 3 to about 11 m/s, or about 4 to about 11 m/s, or about 4 to about 11 m/s, or about 5 to about 11 m/s, or about 6 to about 11 m/s, or about 7 to about 11 m/s, or about 8 to about 11 m/s, or about 9 to about 11 m/s, or about 10 to about 11 m/s, or about 2 to about 10 m/s, or about 3 to about 10 m/s, or about 4 to about 10 m/s, or about 4 to about 10 m/s, or about 5 to about 10 m/s, or about 6 to about 10 m/s, or about 7 to about 10 m/s, or about 8 to about 10 m/s, or about 9 to about 10 m/s, or about 2 to about 9 m/s, or about 3 to about 9 m/s, or about 4 to about 9 m/s, or about 4 to about 9 m/s, or about 5 to about 9 m/s, or about 6 to about 9 m/s, or about 7 to about 9 m/s, or about 8 to about 9 m/s, or about 2 to about 8 m/s, or about 3 to about 8 m/s, or about 4 to about 8 m/s, or about 4 to about 8 m/s, or about 5 to about 8 m/s, or about 6 to about 8 m/s, or about 7 to about 8 m/s, or about 2 to about 7 m/s, or about 3 to about 7 m/s, or about 4 to about 7 m/s, or about 5 to about 7 m/s, or about 6 to about 7 m/s, or about 2 to about 6 m/s, or about 3 to about 6 m/s, or about 4 to about 6 m/s, or about 5 to about 6 m/s, or about 2 to about 5 m/s, or about 3 to about 5 m/s, or about 4 to about 5 m/s, or about 2 to about 5 m/s, or about 3 to about 5 m/s, or about 4 to about 5 m/s, or about 2 to about 4 m/s, or about 3 to about 4 m/s, or about 2 to about 3 m/s, or 2, 3, 4, 5, 6, 7, 8, 9, 10, 11, 12, 13, 14, 15, 16, 17, 18, 19, 20, 21, or 22 m/s.

In embodiments, the relative humidity may be 15% or less, or 14% or less, or 13% or less, or 12% or less, or 11% or less, or 10% or less, or 9% or less, or 8% or less, or 7% or less, or 6% or less, or 5% or less, or 4% or less, or 3% or less, or 2% or less, or 1% or less, or about 9.95 to about 15%, or about 9.95 to about 14.5%, or about 9.95 to about 14%, or about 9.95 to about 13.5%, or about 9.95 to about 13%, or about 9.95 to about 12.5%, or about 9.95 to about 12%, or about 9.95 to about 11.5%, or about 9.95 to about 11.1%, or about 9.95 to about 11%, or about 9.95 to about 10.5%, or about 9.95 to about 10%, or about 10 to about 15%, or about 10 to about 14.5%, or about 10 to about 14%, or about 10 to about 13.5%, or about 10 to about 13%, or about 10 to about 12.5%, or about 10 to about 12%, or about 10 to about 11.5%, or about 10 to about 11.1%, or about 10 to about 11%, or about 10 to about 10.5%, or about 10.5 to about 15%, or about 10.5 to about 14.5%, or about 10.5 to about 14%, or about 10.5 to about 13.5%, or about 10.5 to about 13%, or about 10.5 to about 12.5%, or about 10.5 to about 12%, or about 10.5 to about 11.5%, or about 10.5 to about 11.1%, or about 10.5 to about 11%, or about 11 to about 15%, or about 11 to about 14.5%, or about 11 to about 14%, or about 11 to about 13.5%, or about 11 to about 13%, or about 11 to about 12.5%, or about 11 to about 12%, or about 11 to about 11.5%, or about 11 to about 11.1

In embodiments, the actinic infrared radiation may be from a distance from the external surface of about 5 cm to about 15 cm, or about 5 cm to about 14 cm, or about 5 cm to about 13 cm, or about 5 cm to about 12 cm, or about 5 cm to about 11 cm, or about 5 cm to about 10 cm, or about 5 cm to about 9 cm, or about 5 cm to about 8 cm, or about 5 cm to about 7 cm, or about 5 cm to about 6 cm, or about 6 cm to about 15 cm, or about 6 cm to about 14 cm, or about 6 cm to about 13 cm, or about 6 cm to about 12 cm, or about 6 cm to about 11 cm, or about 6 cm to about 10 cm, or about 6 cm to about 9 cm, or about 6 cm to about 8 cm, or about 6 cm to about 7 cm, or about 7 cm to about 15 cm, or about 7 cm to about 14 cm, or about 7 cm to about 13 cm, or about 7 cm to about 12 cm, or about 7 cm to about 11 cm, or about 7 cm to about 10 cm, or about 7 cm to about 9 cm, or about 7 cm to about 8 cm, or about 8 cm to about 15 cm, or about 8 cm to about 14 cm, or about 8 cm to about 13 cm, or about 8 cm to about 12 cm, or about 8 cm to about 11 cm, or about 8 cm to about 10 cm, or about 8 cm to about 9 cm, or about 9 cm to about 15 cm, or about 9 cm to about 14 cm, or about 9 cm to about 13 cm, or about 9 cm to about 12 cm, or about 9 cm to about 11 cm, or about 9 cm to about 10 cm, or about 10 cm to about 15 cm, or about 10 cm to about 14 cm, or about 10 cm to about 13 cm, or about 10 cm to about 12 cm, or about 10 cm to about 11 cm, or about 11 cm to about 15 cm, or about 11 cm to about 14 cm, or about 11 cm to about 13 cm, or about 11 cm to about 12 cm, or about 12 cm to about 15 cm, or about 12 cm to about 14 cm, or about 12 cm to about 13 cm, or about 13 cm to about 15 cm, or about 13 cm to about 14 cm, or about 14 cm to about 15 cm, or 5, 6, 7, 8, 9, 10, 11, 12, 13, 14, or 15 cm.

In embodiments of the methods of the present invention, the carbon material is a carbon anode, preferably a prebaked consumable carbon anode.

In embodiments of the methods of the present invention, the actinic infrared radiation is infrared radiation comprising a wavelength of from about 0.2 to about 10 µm, preferably of about 2 µm to about 4 µm, or about 2.5 µm to about 4 µm, or from about 3 µm to about 4 µm, or about 3.5 µm to about 4 µm, or about 2 µm to about 3.5 µm, or about 2.5 µm to about 3.5 µm, or from about 3 µm to about 3.5 µm, or about 2 µm to about 3 µm, or about 3 µm to about 3.5 µm, or about 2.5 µm to about 3 µm, or 2 µm, 2.5 µm, 3 µm, 4 µm.

In embodiments of the methods of the present invention, the distance from the external surface is about 10 cm.

In embodiments of the methods of the present invention, the first layer comprises one or more application of the aqueous priming coating composition.

In embodiments of the methods of the present invention, a first aqueous priming coating composition layer may be dried at room temperature for about 2 minutes or more. In embodiments of the methods of the present invention, a second aqueous priming coating composition layer may be dried at room temperature for about 45 second or more.

In embodiments of the methods of the present invention, the aqueous coating composition may be applied at a temperature of 32° C. to 80° C. onto the first layer.

In embodiments of the methods of the present invention, when applying the aqueous coating composition to the first layer, the first layer has a surface temperature of about 74° C. to about 100° C.

In embodiments of the methods of the present invention, the layer of aqueous coating composition may reach a temperature of about 190° C. to about 210° C. within a first minute of drying, to provide a dried second layer.

In embodiments of the methods of the present invention, the actinic infrared radiation is provided with a shield configured to prevent cooling of an actinic infrared radiation source by said forced air, to maximize actinic infrared radiation wave energy. The shield may be any form of shielding that does not entirely prevent transmission of the actinic infrared radiation. Also, the material of the shield may be any material that is resistant to the thermal shock that is caused by the forced air blown across the source of actinic infrared radiation. For example, the shield may be a glass plate, a glass tube, or combination thereof, such as Pyrex® glass from Corning® corporation, or equivalents. The presence of the shield prevents cooling of the actinic IR radiation by the forced air. Shielding allows the actinic IR radiation to maximally generate high temperatures, thereby drying the coating compositions. In embodiments, the shield may be a glass shield made from borosilicate glass, a glass-ceramic material, or a combination thereof. In embodiments, the glass shield may be made from a glass or a glass material having a thermal expansion of from about $2 \times 10^{-7}$° $C.^{-1}$ to about $33 \times 10^{-7}$° $C.^{-1}$. In embodiments, the glass shield may be made from a glass or a glass material having a thermal shock of from about 150° C. to about 700° C. In embodiments, the glass shield may be made from a glass or a glass material having a density of from about 2 g/cm³ to about 3 g/cm³.

In another embodiment there is disclosed a system for drying a coating composition covering a surface of a carbon material, the apparatus comprising:
a temperature controlled environment configured to provide temperatures from about 70° C. to about 130° C.;
means to provide forced air, configured to provide the forced air at a temperature of from about 80° C. to about 275° C., a velocity of about 2 to about 22 m/s, and a relative humidity of 15% or less, preferably 9.0 to 14%;
an actinic infrared radiation source;
wherein the means to provide forced air and the actinic infrared radiation source are configured to direct forced air and actinic infrared radiation onto the surface of a carbon material to provide a drying action.

According to an embodiment, the temperature controlled environment may comprise a heating element to provide the temperature.

According to an embodiment, the means to provide forced air may comprise a blower element.

According to an embodiment, the system may comprise a humidifier element.

According to an embodiment, the system may comprise a dehumidifier element.

According to an embodiment, the actinic infrared radiation source may be at a distance from the surface of a carbon material of about 5 cm to about 15 cm, or a distance from the external surface of about 10 cm.

According to an embodiment, the actinic infrared radiation may be infrared radiation comprising a wavelength of about 2 µm to about 4 µm, or about 2.5 µm to about 4 µm, or from about 3 µm to about 4 µm, or about 3.5 µm to about 4 µm, or about 2 µm to about 3.5 µm, or about 2.5 µm to about 3.5 µm, or from about 3 µm to about 3.5 µm, or about 2 µm to about 3 µm, or about 3 µm to about 3.5 µm, or about 2.5 µm to about 3 µm, or 2 µm, 2.5 µm, 3 µm, 4 µm.

According to an embodiment, the actinic infrared radiation source comprises a shield configured to prevent cooling of an actinic infrared radiation source by said forced air, to maximize actinic infrared radiation wave energy. The shield may be any form of shielding that does not entirely prevent transmission of the actinic infrared radiation. Also, the material of the shield may be any material that is resistant to the thermal shock that is caused by the forced air blown across the source of actinic infrared radiation. For example, the shield may be a glass plate, a glass tube, or combination thereof, such as Pyrex® glass from Corning® corporation, or equivalents. The presence of the shield prevents cooling of the actinic IR radiation by the forced air. Shielding allows the actinic IR radiation to maximally generate high temperatures, thereby drying the coating compositions. In embodiments, the shield may be a glass shield made from borosilicate glass, a glass-ceramic material, or a combination thereof. In embodiments, the glass shield may be made from a glass or a glass material having a thermal expansion of from about $2 \times 10^{-7}$° $C.^{-1}$ to about $33 \times 10^{-7}$° $C.^{-1}$. In embodiments, the glass shield may be made from a glass or a glass material having a thermal shock of from about 150° C. to about 700° C. In embodiments, the glass shield may be made from a glass or a glass material having a density of from about 2 g/cm³ to about 3 g/cm³.

According to an embodiment, the system may further comprise a temperature sensor to measure environment temperature, a temperature sensor to measure surface of a carbon material temperature, an air velocity sensor, a relative humidity sensor, and combinations thereof.

According to another embodiment, a method for drying an aqueous coating composition covering an intermediate substrate covering an external surface exposed to air of a carbon material, to form a layer of aqueous coating composition thereon,
the aqueous coating composition comprising a combination of a sodium salt of carbonate and a potassium salt of carbonate providing an equivalent $Na_2O:K_2O$ molar ratio of about 0.4 to about 2.0, and water, said aqueous coating composition having a melting temperature of up to about 600° C.;
the method comprising:
gradually moving said carbon material toward a heat source providing an environment at a temperature of about 900° C. to 1100° C., to provide a zone of said layer of aqueous coating composition closest to said heat source with a heating rate for a time sufficient to remove a free water from said layer of aqueous coating composition, wherein when said aqueous priming coating is applied onto an intermediate substrate at a temperature T of ≤100° C., said heating rate is ≤22.33° C./sec for a time t elapsed since beginning of said method of 0≤t≤15 sec;

≤14.2° C./sec for a time t elapsed since beginning of said method of 15<t≤21 sec;

≤7.13° C./sec for a time t elapsed since beginning of said method of 21<t≤32 sec;

≤5.66° C./sec for a time t elapsed since beginning of said method of 32<t≤40 sec; and ≤4.22° C./sec for a time t elapsed since beginning of said method of 40<t≤60 sec, or wherein when said aqueous priming coating is applied onto an intermediate substrate at a temperature T of 100° C.<T≤113° C., said heating rate is ≤38.15° C./sec for a time t elapsed since beginning of said method of 0≤t≤15 sec;

≤23.28° C./sec for a time t elapsed since beginning of said method of 15<t≤21 sec; and ≤9.78° C./sec for a time t elapsed since beginning of said method of 21<t≤32 sec.

The previously describe method are for drying the protective anode coating within a few minutes prior the direct immersion of the anode into the electrolytic cells molten bath. The present method is a different method where it has unexpectedly been found that the aqueous coating composition (top coat) drying may be achieved in less than one minute while inserting the coated anode inside the electrolytic cell, when a specific insertion procedure is followed prior to immersion of the anode into the molten bath, typically at 900° C. to 1100° C.

This procedure consists in inserting the coated anode inside the cell and then to move it down gradually toward the bath line such that the temperature and heating rate of the closest zone of the coating to that line remains inside specific limits up until the drying time limit is reached. Then the coating in this zone can safely be immersed into the molten bath without suffering damage caused by fast free water evaporation.

Figure 23:
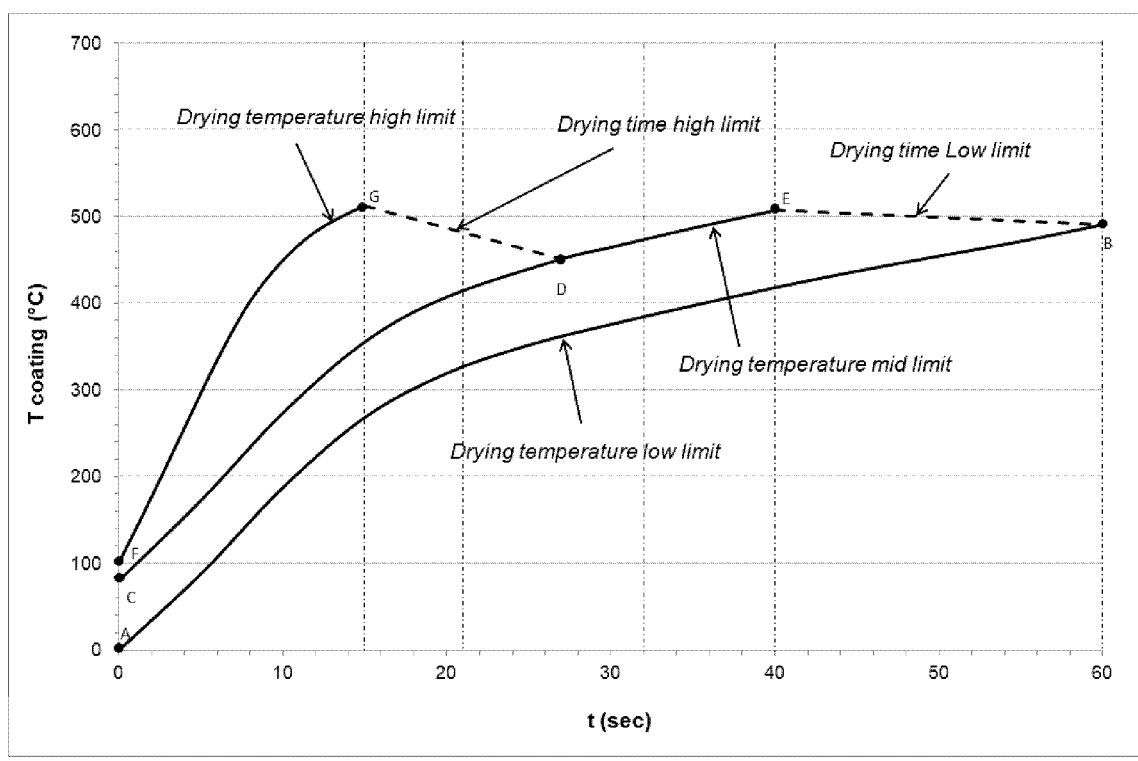
FIG. 23 illustrates the temperature and time limit to be met according to an embodiment of a method of the present invention.

The specific drying temperature and time limits are illustrated in FIG. 23, which shows two zones: Zone 1, delimited by curves or segments AB-BE-ED-DC-CA and Zone 2, delimited by curves or segments CD-DG-GF-FC.

The polynomial regression coefficients of the following limits shown on FIG. 23 are provided in Table 10 below.

Figure 1:
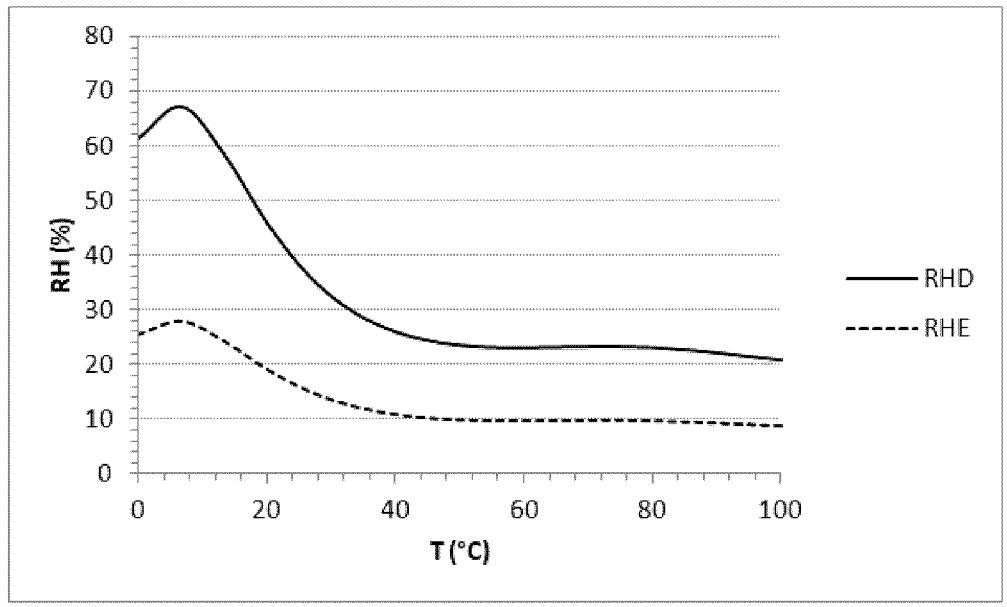
FIG. 1 illustrates the hygroscopic behavior of $K_2CO_3$. RH=relative humidity; RHD=relative humidity of deliquescence; RHE=relative humidity of efflorescence.

Zone 1 and Zone 2 on FIG. 1 must respectively be considered when the aqueous coating composition (top coat) is applied on an intermediate substrate (i.e. the aqueous priming coating, also referred to as the base coat) whose temperature is: (1) 100° C. or less or (2) above 100° C. and not higher than 113° C., respectively. For each zone, the coating maximum heating rate on drying must be as shown in Tables 11 and 12. Above these limits, coating damage occurs by spalling, bloating and/or pop-out formation.

TABLE 11

Maximum heating rate with base coat temperature at 100° C. or less

| Time elapsed since beginning of method of drying (t in sec) | Heating Rate (° C./sec) |
|---|---|
| 0 ≤ t ≤ 15 | 22.33 |
| 15 < t ≤ 21 | 14.20 |
| 21 < t ≤ 32 | 7.13 |
| 32 < t ≤ 40 | 5.66 |
| 40 < t ≤ 60 | 4.22 |

TABLE 12

Maximum heating rate with base coat temperature at above 100° C. and not higher than 113° C.

| Time elapsed since beginning of method of drying (t in sec) | Heating Rate (° C./sec) |
|---|---|
| 0 ≤ t ≤ 15 | 38.15 |
| 15 < t ≤ 21 | 23.28 |
| 21 < t ≤ 32 | 9.78 |
| 32 < t ≤ 40 | Not Applicable |
| 40 < t ≤ 60 | Not Applicable |

In embodiments, the carbon material may be a carbon anode, preferably a prebaked consumable carbon anode.

According to another embodiment, the intermediate substrate may be an aqueous priming coating composition comprising a mixture of aluminum oxide ($Al_2O_3$), compris-

TABLE 10 polynomial regression coefficients. The drying temperature low limit (curve AB). The drying temperature mid limit (curve CE). The drying temperature high limit (curve FG). The drying time low limit (segment EB). The drying time high limit (segment GD).

| Limit | Applicable elapsed time range (t in sec) | a | b | c | d | e | f | g |
|---|---|---|---|---|---|---|---|---|
| | | | | Drying temperature | | | | |
| Low | 0 ≤ t ≤ 60 | 2.381936E−07 | −4.689651E−05 | 3.490664E−03 | −1.172293E−01 | 1.426423E+00 | 1.321888E+01 | −2.789636E−01 |
| Mid | 0 ≤ t ≤ 40 | 2.270905E−07 | −4.967481E−05 | 3.823170E−03 | −1.284243E−01 | 1.549399E+00 | 1.340321E+01 | 8.002944E+01 |
| High | 0 ≤ t ≤ 15 | −1.612514E−04 | 7.759205E−03 | −1.308581E−01 | 8.236996E−01 | −1.726443E+00 | 3.936451E+01 | 1.000094E+02 |
| | | | | Drying time | | | | |
| Low | 40 ≤ t ≤ 60 | — | — | — | — | — | −7.966616E−01 | 5.390744E+02 |
| High | 15 ≤ t ≤ 27 | — | — | — | — | — | −5.203759E+00 | 5.910180E+02 |

The value of each limit is given by the following equation where "a" to "g" are the regression coefficients and "x" is the elapsed time since the beginning of the drying process or method:

Limit value=$a(x^6)+b(x^5)+c(x^4)+d(x^3)+e(x^2)+f(x)+g$ ing a combination of aluminum oxide selected from the group consisting of calcined aluminum oxide, reactive aluminum oxide, and white fused aluminum oxide; and water.

According to another embodiment, the heat source may be a molten cryolitic bath.

According to an embodiment, the aqueous coating composition may be applied at a temperature of 32 to 90° C. on the intermediate substrate.

According to another embodiment, there is disclosed a system for drying an aqueous coating composition covering an intermediate substrate covering an external surface exposed to air of a carbon material, the system comprising:
- a temperature controlled environment configured to provide a temperature of about 900° C. to 1100° C.;
- means to gradually move said carbon material toward a heat source providing said environment with a temperature of about 900° C. to 1100° C.

The present invention will be more readily understood by referring to the following examples which are given to illustrate the invention rather than to limit its scope.

Example 1

Drying Process 1

Several heat sources were considered: infrared radiation, forced air convection, heat conduction as well as their combination. The exact amount of heat transferred into a specific target is difficult to predict analytically or numerically since a perfect knowledge of several material properties that are very difficult to measure with high precision and representatively is required. Such properties include:
1) The emissivity of all involved materials (target, source and surrounding materials) as a function of the temperature and the IR wavelength;
2) The heat transfer coefficient between forced air and the target as a function of temperature and forced air velocity;
3) The thermal conductivity of all materials involved, as well as the thermal resistivity of the "Paints-Substrates" interfaces as a function of the temperature;
4) The variation of these three properties as a function of the microstructural and water content variation taking place into the target during the drying process.

A series of tests are therefore performed to identify the conditions leading to the shortest drying time of the anode protective coating chemical treatment comprising an intermediate layer followed by a carbonate coating. The intermediate layer may be referred to as the base coat, and the carbonate coating as the top coat or the finition coat. The testing system 10 used is schematically shown on FIG. 4.

The test results are presented in Tables 1 to 3. The variables appearing in Tables 1 and 2 are defined in Tables 4. When activated, the drying system components listed in Table 3 (humidifiers 20, dehumidifier 60, heating elements 30, IR element 70, blower 40, blower exit 80, room 50 having doors 100 for sample 90 insertion) were operating at maximum capacity, i.e., 3 KWatts for the IR element 70, 3.75 KWatts for each heating element and 1200 cubic feet per minute (cfm, i.e. 566,33694 L/s) for the blower. With the four domestic water evaporation humidifiers used, a maximal forced air relative humidity of 13.3% was achievable when its temperature was lying between 75° C. and 125° C. Inversely, a minimal relative humidity of 8.8% was obtained with the domestic dehumidifier used, for this same temperature range. The convecting forced air temperature was varied between 50° C. and 123° C., using an OMEGA™ controller (Ref. No.: CN7800B). The maximum tested air velocity was 30 m/s. Due to the decrease of the air density when increasing its temperature, such increase was also lowering the forced air velocity.

Figure 5A:
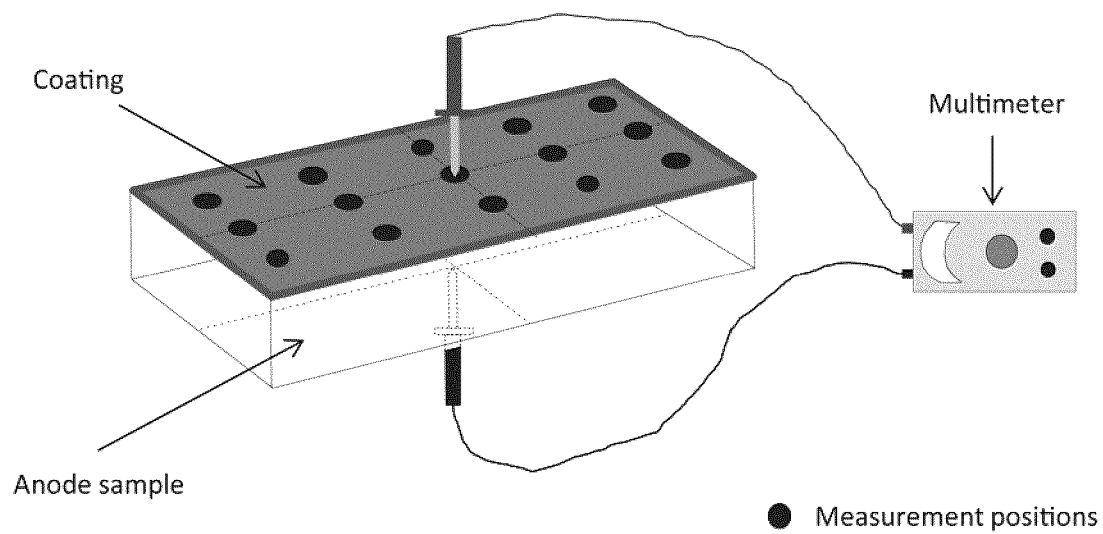
FIG. 5A illustrates the sample's coating electrical resistance measurement across the coating thickness.
Figure 5B:
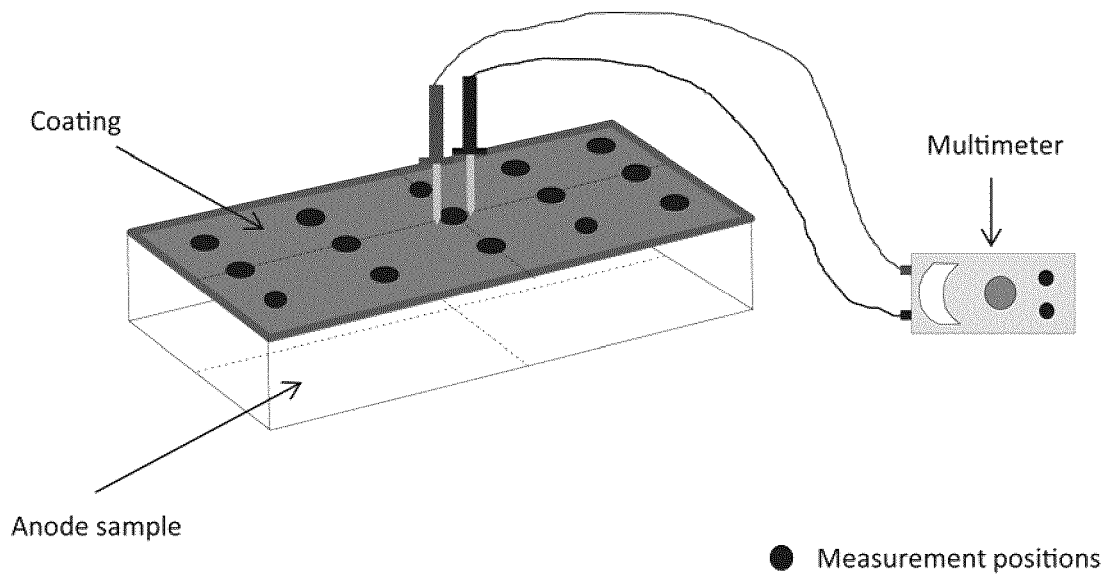
FIG. 5B illustrates the sample's coating electrical resistance measurement on the coating surface.

The drying tests were performed on coated carbon anode samples having dimensions of about 15.6×10.8×2.5 cm. Two layers of base paint, i.e. an aqueous priming coating composition for application to a carbon material which comprises a mixture of aluminum oxide ($Al_2O_3$), comprising a combination of aluminum oxide select from calcined aluminum oxide, reactive aluminum oxide, and white fused aluminum oxide; and water, as defined above, were first applied on a 15.6×10.8 cm sample's surface which was followed by the application of the top paint—the aqueous carbonate coating composition defined above, on the same surface, when applicable. Each sample was then inserted into the drying apparatus after the latter had operated for at least half an hour to approach temperature, humidity and air velocity equilibrium values. After each test, the sample's coating electrical resistance (R) was measured at 15 positions using the two techniques shown on FIG. 5. Drying of the coating was considered to be totally achieved when the measured resistance was above the limit of the apparatus (UNI-T UT203), i.e., 40 MΩ, which was considered as infinity (1/R=0).

Figure 6:
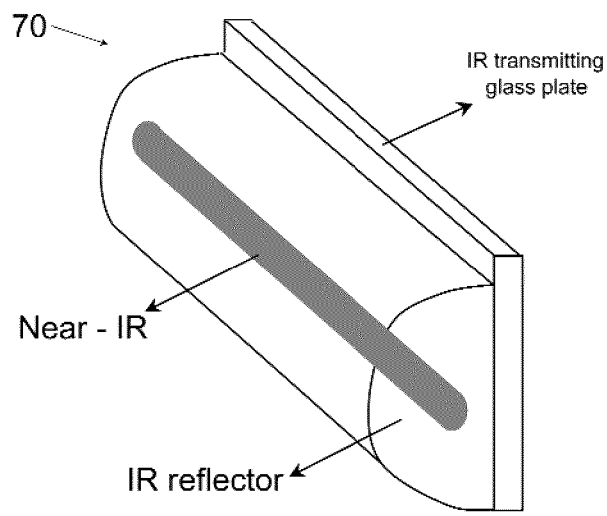
FIG. 6 illustrates an encapsulated IR element as used in system 10 according to an embodiment of the present invention.

Now referring to FIG. 6, which shows an encapsulated IR element 70, which when activated is operating under open or closed configuration conditions. In the latter case, a glass plate (Pyrex) is used for encapsulating the element inside its reflector (sec FIG. 6).

Based on the results presented in Tables 1 to 3, the fastest drying times for the two paints were obtained with the combination of convective and infrared heating.

TABLE 1

Paints application and drying procedures

| Test No. | Paint Type | Base-Layer 1 Application (min) | Base-Layer 1 Soaking (min) | Base-Layer 2 Application (min) | Base-Layer 2 Soaking (min) | Base-Layer 2 Drying (min) | Base-Layer 2 Soaking (min) | 1/R | Waving | TTop (°C.) | TBase (°C.) | Top Application (min) | Top Soaking (min) | Top Drying (min) | 1/R | Waving | Powdering | Bloating |
|---|---|---|---|---|---|---|---|---|---|---|---|---|---|---|---|---|---|---|
| 1 | Base | 1.00 | 1.50 | 0.50 | 0.00 | 10.00 | 0.00 | =0 | NO | — | — | — | — | — | — | — | — | — |
|   | Top | — | — | — | — | — | — | — | — | 44.00 | <30 | 0.17 | 3.00 | 5.00 | >0 | NO | NO | NO |
| 2 | Base | 1.00 | 1.50 | 0.50 | 0.00 | 5.00 | 0.00 | =0 | YES | — | — | — | — | — | — | — | — | — |
|   | Top | — | — | — | — | — | — | — | — | 58.00 | <30 | 0.17 | 1.50 | 5.00 | >0 | YES | NO | NO |
| 3 | Base | 0.67 | 7.17 | 0.38 | 0.73 | 5.00 | 0.77 | =0 | YES | — | — | — | — | — | — | — | — | — |
|   | Top | — | — | — | — | — | — | — | — | 65.00 | 70.00 | 0.17 | 0.00 | 5.00 | >0 | 0.00 | NO | NO |
| 4 | Base | — | — | — | — | 5.00 | 0.00 | ND | NO | — | — | — | — | — | — | — | — | — |
|   | Top | — | — | — | — | — | — | — | — | 55.00 | 113.00 | 0.67 | 1.00 | 4.00 | =0 | NO | YES | NO |
| 5 | Base | — | — | — | — | 5.00 | 0.00 | ND | NO | — | — | — | — | — | — | — | — | — |
|   | Top | — | — | — | — | — | — | — | — | 55.00 | ND | 1.00 | 0.00 | 5.00 | >0 | NO | NO | — |
| 6 | Base | — | — | — | — | 5.00 | 0.00 | ND | NO | — | — | — | — | — | — | — | — | — |
|   | Top | — | — | — | — | — | — | — | — | 47.00 | ND | 0.65 | 0.00 | 5.00 | >0 | NO | YES | NO |

TABLE 1-continued

Paints application and drying procedures

| | | Base-Layer 1 | | Base-Layer 2 | | | | | | Top | | | | | | | |
|---|---|---|---|---|---|---|---|---|---|---|---|---|---|---|---|---|---|
| Test No. | Paint Type | Appli-cation (min) | Soak-ing (min) | Appli-cation (min) | Soak-ing (min) | Dry-ing (min) | Soak-ing (min) | 1/R | Wav-ing | TTop (° C.) | TBase (° C.) | Appli-cation (min) | Soak-ing (min) | Dry-ing (min) | 1/R | Wav-ing | Pow-dering | Bloat-ing |
| 7 | Base | — | — | — | — | 5.00 | 0.00 | ND | NO | — | — | — | — | — | | | | |
| | Top | — | — | — | — | — | — | — | — | 55.00 | ND | 1.00 | 0.00 | 10.00 | >0 | NO | YES | NO |
| 8 | Base | — | — | — | — | 5.00 | 0.00 | ND | NO | — | — | — | — | — | | | | |
| | Top | — | — | — | — | — | — | — | — | 53.00 | 99.00 | 1.00 | 0.00 | 5.00 | =0 | NO | NO | NO |
| 9 | Base | — | — | — | — | 5.00 | 0.00 | ND | NO | — | — | — | — | — | | | | |
| | Top | — | — | — | — | — | — | — | — | 58.00 | 95.00 | 1.00 | 0.00 | 5.00 | >0 | NO | YES | NO |
| 10 | Base | 0.50 | 3.00 | 0.50 | 1.00 | 5.00 | 1.00 | ND | NO | — | — | — | — | — | | | | |
| | Top | — | — | — | — | — | — | — | — | 40.00 | 93.00 | 0.25 | 0.32 | 5.00 | =0 | NO | YES | NO |
| 11 | Base | 0.50 | 3.00 | 0.50 | 1.00 | 5.00 | 0.00 | ND | NO | — | — | — | — | — | | | | |
| | Top | — | — | — | — | — | — | — | — | 65.00 | 74.00 | ND | ND | 5.00 | =0 | NO | NO | NO |
| 12 | Base | 0.50 | 3.00 | 0.25 | 1.25 | 5.00 | 0.00 | ND | NO | — | — | — | — | — | | | | |
| | Top | — | — | — | — | — | — | — | — | 65.00 | 84.00 | 0.75 | 0.25 | 5.00 | >0 | NO | YES | NO |
| 13 | Base | 0.50 | 3.00 | 0.25 | 1.25 | 5.00 | 1.87 | ND | NO | — | — | — | — | — | | | | |
| | Top | — | — | — | — | — | — | — | — | 65.00 | 78.00 | 0.80 | 0.42 | 5.00 | >0 | NO | YES | NO |
| 14 | Base | 0.50 | 3.00 | 0.25 | 1.25 | 3.50 | ND | ND | NO | — | — | — | — | — | | | | |
| | Top | — | — | — | — | — | — | — | — | 65.00 | 70.00 | ND | ND | 5.00 | =0 | NO | YES | NO |
| 15 | Base | — | — | — | — | 5.00 | 0.00 | ND | NO | — | — | — | — | — | | | | |
| | Top | — | — | — | — | — | — | — | — | 42.00 | 75.00 | 1.00 | 0.00 | 5.00 | >0 | NO | YES | NO |
| 16 | Base | — | — | — | — | 5.00 | 0.00 | ND | NO | — | — | — | — | — | | | | |
| | Top | — | — | — | — | — | — | — | — | 50.00 | 84.00 | 0.25 | 0.00 | 5.00 | >0 | NO | YES | NO |
| 17 | Base | — | — | — | — | 5.00 | 0.00 | ND | NO | — | — | — | — | — | | | | |
| | Top | — | — | — | — | — | — | — | — | 54.00 | 88.00 | 0.25 | 0.00 | 5.00 | =0 | NO | NO | NO |
| 18 | Base | — | — | — | — | 5.00 | 0.00 | ND | NO | — | — | — | — | — | | | | |
| | Top | — | — | — | — | — | — | — | — | 65.00 | 93.00 | 1.00 | 0.00 | 5.00 | =0 | NO | NO | NO |
| 19 | Base | — | — | — | — | 5.00 | 0.00 | ND | NO | — | — | — | — | — | | | | |
| | Top | — | — | — | — | — | — | — | — | 73.00 | 100.00 | 1.00 | 0.00 | 5.00 | =0 | NO | NO | NO |
| 20 | Base | 0.50 | 3.00 | 0.25 | 1.25 | 2.50 | NA | >0 | NO | — | — | — | — | — | | | | |
| 21 | Base | 0.50 | 2.00 | 0.25 | 0.75 | 2.50 | NA | >0 | NO | — | — | — | — | — | | | | |
| 22 | Base | 0.50 | 3.00 | 0.25 | 1.25 | 3.00 | NA | 0.00 | NO | — | — | — | — | — | | | | |
| 23 | Base | 0.50 | 3.00 | 0.25 | 1.25 | 5.00 | 0.00 | =0 | NO | — | — | — | — | — | | | | |
| | Top | — | — | — | — | — | — | — | — | 80.00 | 78.00 | 0.25 | 0.25 | 5.00 | >0 | NO | NO | NO |
| 24 | Base | 0.50 | 2.00 | 0.25 | 0.75 | 5.00 | NA | >0 | NO | — | — | — | — | — | | | | |
| 25 | Base | 0.50 | 3.00 | 0.33 | 1.17 | 5.00 | 0.00 | ND | NO | — | — | — | — | — | | | | |
| | Top | — | — | — | — | — | — | — | — | 60.00 | 85.00 | 0.50 | 0.50 | 5.00 | >0 | NO | NO | NO |
| 26 | Base | 0.50 | 3.00 | 0.43 | 1.07 | 5.00 | 0.00 | ND | NO | — | — | — | — | — | | | | |
| | Top | — | — | — | — | — | — | — | — | 51.00 | 76.00 | 0.50 | 0.37 | 5.00 | >0 | NO | YES | NO |
| 27 | Base | 0.50 | 3.00 | 0.43 | 1.07 | 5.00 | 0.00 | ND | NO | — | — | — | — | — | | | | |
| | Top | — | — | — | — | — | — | — | — | 59.00 | 76.00 | 0.57 | 0.00 | 5.00 | >0 | NO | YES | NO |
| 28 | Base | 0.50 | 3.00 | 0.25 | 1.25 | 5.00 | 0.00 | ND | NO | — | — | — | — | — | | | | |
| | Top | — | — | — | — | — | — | — | — | 32.00 | 73.00 | 0.50 | 0.00 | 5.00 | >0 | NO | YES | NO |
| 29 | Base | 0.50 | 3.00 | 0.33 | 1.17 | 5.00 | 0.00 | ND | NO | — | — | — | — | — | | | | |
| | Top | — | — | — | — | — | — | — | — | 65.00 | 59.00 | 0.50 | 0.00 | 5.00 | >0 | NO | YES | NO |
| 30 | Base | 0.50 | 3.00 | 0.27 | 1.23 | 5.00 | 0.00 | ND | NO | — | — | — | — | — | | | | |
| | Top | — | — | — | — | — | — | — | — | 65.00 | 90.00 | 0.60 | 0.00 | 5.00 | >0 | NO | YES | YES |
| 31 | Base | 0.50 | 4.25 | 0.40 | 2.85 | 5.00 | NA | >0 | NO | — | — | — | — | — | | | | |
| 32 | Base | 0.50 | 3.00 | 0.33 | 1.17 | 5.00 | 0.00 | ND | NO | — | — | — | — | — | | | | |
| | Top | — | — | — | — | — | — | — | — | 73.00 | 100.00 | 0.52 | 0.00 | 5.00 | =0 | NO | YES | YES |

TABLE 2

Drying conditions

| Test No. | Paint Type | RH air (%) | T air (° C.) | V air (m/s) | T IR element (° C.) | T Glass IN (° C.) | T Glass OUT (° C.) | T substrate (° C.) | T Room (° C.) | T atm (° C.) | RH atm (%) |
|---|---|---|---|---|---|---|---|---|---|---|---|
| 1 | Base | 10.00 | 97.50 | 27.00 | NA | NA | NA | ND | 77.50 | ND | ND |
| | Finition | 10.00 | 90.00 | 29.40 | NA | NA | NA | ND | 67.00 | ND | ND |
| 2 | Base | 10.00 | 92.50 | 30.00 | NA | NA | NA | ND | 77.50 | ND | ND |
| | Finition | 10.00 | 90.00 | 30.00 | NA | NA | NA | ND | 67.00 | ND | ND |
| 3 | Base | 9.80 | 100.00 | 26.00 | NA | NA | NA | ND | 77.50 | ND | ND |
| | Finition | 10.00 | 90.00 | 25.00 | NA | NA | NA | ND | 65.00 | ND | ND |
| 4 | Base | 9.50 | 109.00 | 22.26 | 415.00 | NA | NA | 114.00 | 74.00 | ND | ND |
| | Finition | 9.10 | 108.00 | 21.69 | 390.00 | NA | NA | 114.00 | 67.00 | ND | ND |
| 5 | Base | 8.80 | 76.00 | 24.42 | 368.00 | NA | NA | 77.00 | 62.00 | ND | ND |
| | Finition | 9.20 | 76.00 | 24.30 | 362.00 | NA | NA | 81.00 | 60.00 | 21.50 | 31.20 |
| 6 | Base | 9.00 | 108.00 | 21.56 | 383.00 | NA | NA | ND | 79.00 | ND | ND |
| | Finition | 8.80 | 108.00 | 21.71 | 376.00 | NA | NA | 113.00 | 76.00 | 21.90 | 28.60 |

TABLE 2-continued

| | | Drying conditions | | | | | | | | | |
|---|---|---|---|---|---|---|---|---|---|---|---|
| Test No. | Paint Type | RH air (%) | T air (° C.) | V air (m/s) | T IR element (° C.) | T Glass IN (° C.) | T Glass OUT (° C.) | T substrate (° C.) | T Room (° C.) | T atm (° C.) | RH atm (%) |
| 7 | Base | ND | ND | ND | ND | ND | ND | ND | ND | ND | ND |
|   | Finition | 12.00 | 82.00 | 23.41 | ND | 401.00 | ND | 89.00 | ND | 21.00 | 49.00 |
| 8 | Base | 11.00 | 121.00 | 20.16 | ND | 411.00 | ND | ND | ND | 22.00 | 46.80 |
|   | Finition | 11.10 | 123.00 | 19.39 | ND | 421.00 | ND | 130.00 | ND | ND | ND |
| 9 | Base | ND | ND | ND | ND | ND | ND | ND | ND | ND | ND |
|   | Finition | 9.60 | 119.00 | 19.20 | ND | 462.00 | ND | 124.00 | ND | 22.40 | 46.50 |
| 10 | Base | 10.40 | 115.00 | 19.83 | ND | ND | ND | 119.00 | ND | 19.50 | 46.50 |
|   | Finition | 10.10 | 115.00 | 19.40 | ND | ND | ND | 121.00 | ND | 19.80 | 47.70 |
| 11 | Base | ND | ND | ND | ND | ND | ND | ND | ND | ND | ND |
|   | Finition | 9.95 | 117.00 | ND | 675.00 | ND | ND | 118.00 | ND | 22.20 | 35.80 |
| 12 | Base | 10.30 | 106.00 | ND | 646.00 | ND | ND | ND | ND | ND | ND |
|   | Finition | 10.00 | 107.00 | ND | 669.00 | ND | 112.00 | 111.00 | 86.00 | 20.20 | 47.20 |
| 13 | Base | 10.70 | ND | 20.58 | 646.00 | ND | ND | 115.00 | ND | 20.90 | 44.70 |
|   | Finition | 10.50 | ND | 20.00 | 669.00 | ND | 113.00 | 116.00 | 93.60 | 20.90 | 44.90 |
| 14 | Base | 10.50 | 118.00 | 21.00 | 676.00 | ND | ND | 120.00 | 103.00 | 21.70 | 40.00 |
|   | Finition | 10.50 | 119.00 | 20.00 | 686.00 | ND | 127.00 | 123.00 | 104.00 | 21.90 | 40.10 |
| 15 | Base | 10.50 | 90.00 | 23.00 | ND | 352.00 | 101.00 | 95.00 | ND | ND | ND |
|   | Finition | 10.90 | 90.00 | 23.00 | ND | 356.00 | 100.00 | 101.00 | ND | 19.50 | 45.70 |
| 16 | Base | 10.40 | 100.00 | 22.00 | ND | ND | 109.00 | 107.00 | ND | 19.50 | 41.70 |
|   | Finition | 10.50 | 100.00 | ND | ND | 356.00 | 109.00 | 108.00 | ND | 19.90 | 43.50 |
| 17 | Base | 10.00 | 110.00 | 22.00 | ND | ND | 117.00 | ND | ND | ND | ND |
|   | Finition | 10.20 | 110.00 | 22.00 | ND | 359.00 | 117.00 | 119.00 | ND | 20.30 | 44.70 |
| 18 | Base | 10.80 | 120.00 | 23.00 | ND | 330.00 | 118.00 | ND | 118.00 | 20.50 | 38.80 |
|   | Finition | 10.80 | 120.00 | 22.00 | ND | 390.00 | 127.00 | 123.00 | 127.00 | 20.60 | 40.50 |
| 19 | Base | 10.90 | 120.00 | 17.50 | ND | 424.00 | ND | 123.00 | 108.00 | 22.70 | 47.20 |
|   | Finition | 10.90 | 120.00 | 17.50 | ND | 404.00 | ND | 128.00 | 108.00 | 23.00 | 47.40 |
| 20 | Base | 10.80 | 120.00 | 22.50 | ND | 360.00 | 122.50 | ND | ND | 20.55 | 39.65 |
| 21 | Base | 9.65 | 120.00 | 20.00 | ND | 341.00 | ND | ND | 96.00 | 19.70 | 42.50 |
| 22 | Base | 10.50 | 110.00 | 17.00 | ND | ND | ND | ND | 124.00 | 22.80 | 50.00 |
| 23 | Base | 13.30 | 80.00 | 20.00 | 388.00 | NA | NA | ND | 74.00 | 20.80 | 53.30 |
|   | Finition | 13.10 | 80.00 | 20.00 | 399.00 | NA | NA | ND | 77.00 | 20.80 | 53.40 |
| 24 | Base | 31.40 | 50.00 | 23.00 | 372.00 | NA | NA | 52.00 | 46.00 | 20.80 | 54.10 |
| 25 | Base | 11.40 | 120.00 | 17.00 | — | — | — | 104.00 | 89.00 | 20.40 | 56.90 |
|   | Finition | 11.20 | 120.00 | 16.00 | — | — | — | 115.00 | 86.00 | 20.80 | 57.00 |
| 26 | Base | 10.90 | 115.00 | 18.00 | — | — | — | 100.00 | 81.00 | 21.10 | 56.40 |
|   | Finition | 11.10 | 115.00 | 17.00 | — | — | — | 110.00 | 82.00 | 21.10 | ND |
| 27 | Base | 11.30 | 110.00 | 18.00 | — | — | — | 100.00 | 83.00 | 21.50 | 58.40 |
|   | Finition | 11.30 | 110.00 | 18.00 | — | — | — | 107.00 | 83.00 | 21.60 | 58.60 |
| 28 | Base | 11.30 | 100.00 | 18.00 | — | — | — | 90.00 | 77.00 | 21.80 | 53.80 |
|   | Finition | 11.10 | 100.00 | 18.00 | — | — | — | 98.00 | 77.00 | 21.90 | 57.30 |
| 29 | Base | 12.20 | 110.00 | 20.00 | — | — | — | 100.00 | 83.00 | 22.50 | 58.80 |
|   | Finition | 12.10 | 110.00 | 19.00 | — | — | — | 107.00 | 83.00 | 22.70 | 55.30 |
| 30 | Base | 10.30 | 100.00 | 14.00 | — | — | — | 90.00 | 134.00 | ND | 55.60 |
|   | Finition | 11.30 | 100.00 | 14.00 | — | — | — | 98.00 | 136.00 | 22.30 | 56.70 |
| 31 | Base | 66.00 | 54.00 | 0.16 | 586.00 | — | — | 88.00 | 44.00 | 22.90 | 81.20 |
| 32 | Base | 11.70 | 115.00 | 19.00 | 345.00 | — | — | 117.00 | 100.00 | 19.90 | 48.60 |
|   | Finition | 11.70 | 115.00 | 19.00 | 345.00 | — | — | 124.00 | 101.00 | 20.10 | 50.20 |

TABLE 3

| | | Drying system components state | | | | | | | | | |
|---|---|---|---|---|---|---|---|---|---|---|---|
| | | | Humidifiers | | | | | Heating Elements | | | |
| Test No. | Paint Type | Dehumidifier | No. 1 | No. 2 | No. 3 | No. 4 | Blower | No. 1 | No. 2 | IR Element | Glass plate | Doors |
| 1 | Base | Active | | Inactive | | | Active | Active | | Innactive | Absent | Open |
|   | Finition | | | | | | | | | | | |
| 2 | Base | | | | | | | | | | | |
|   | Finition | | | | | | | | | | | |
| 3 | Base | | | | | | | | | | | |
|   | Finition | | | | | | | | | | | |
| 4 | Base | Active | | Inactive | | | Active | Active | | Active | Absent | Closed |
|   | Finition | | | | | | | | | | | |
| 5 | Base | | | | | | | | | | | |
|   | Finition | | | | | | | | | | | |
| 6 | Base | | | | | | | | | | | |
|   | Finition | | | | | | | | | | | |

TABLE 3-continued

| | | Drying system components state | | | | | | | | | | |
|---|---|---|---|---|---|---|---|---|---|---|---|---|
| | | | Humidifiers | | | | | Heating Elements | | IR | Glass | |
| Test No. | Paint Type | Dehumidifier | No. 1 | No. 2 | No. 3 | No. 4 | Blower | No. 1 | No. 2 | Element | plate | Doors |
| 7 | Base Finition | Inactive | Active | | Inactive | | Active | Active Active | Inactive | Active | Present | Closed |
| 8 | Base Finition | Inactive | Active | | Inactive | | Active | Active | | Active | Present | Closed |
| 9 | Base Finition | | | | | | | | | | | |
| 10 | Base Finition | | | | | | | | | | | |
| 11 | Base Base | | | | | | | | | | | |
| 12 | Base Finition | Inactive | | Active | | | Active | Active | | Active | Present | Closed |
| 13 | Base Finition | | | | | | | | | | | |
| 14 | Base Finition | | | | | | | | | | | |
| 15 | Base Finition | | | | | | | | | | | |
| 16 | Base Finition | | | | | | | | | | | |
| 17 | Base Finition | | | | | | | | | | | |
| 18 | Base Finition | | | | | | | | | | | |
| 19 | Base Finition | | | | | | | | | | | |
| 20 | Base | | | | | | | | | | | |
| 21 | Base | | | | | | | | | | | |
| 22 | Base | | | | | | | | | | | |
| 23 | Base Finition | Inactive | | Active | | Active | Active | Active | | Active | Absent | Closed |
| 24 | Base | Inactive | | Active | | Active | Active | Active | | Inactive | Absent | Closed |
| 25 | Base Finition | | | | | | | | | | | |
| 26 | Base Finition | | | | | | | | | | | |
| 27 | Base Finition | | | | | | | | | | | |
| 28 | Base Finition | | | | | | | | | | | |
| 29 | Base Finition | | | | | | | | | | | |
| 30 | Base Finition | | | | | | | | | | | |
| 31 | Base | Inactive | | Inactive | | Inactive | Inactive | Inactive | | Active | Absent | Closed |
| 32 | Base Finition | Inactive | | Active | | Active | Active | Active | | Active | Absent | Closed |

The best results were obtained in the following conditions:
Base Paint—Priming Coating Composition
  Forced air relative humidity: 10.5 to 13.3%;
  Forced air temperature: 80° C. to 110° C.;
  Forced air velocity: 17 to 20 m/s;
  Forced air incident angle: 0 degree (tangent);
  Room temperature: 74° C. to 124° C.;
  Infrared spectrum central wave length: about 3 microns with Pyrex® and 4 microns without;
  Distance between infrared element and anode sample: about 10 cm;
  Drying time: 3 min with Pyrex® encapsulation (see Test No. 22) and 5 min without (see Test No. 23);
Top Paint—Aqueous Carbonate Coating Composition
  Top paint temperature at application: 53° C. to 73° C.;
  Base paint temperature at top paint application: 74° C. to 100° C.;
  Forced air relative humidity: 9.95 to 11.10%;
  Forced air temperature: 110° C. to 123° C.;
  Forced air velocity: 17.5 to 22 m/s;
  Room temperature: 108° C. to 127° C.;
  Infrared spectrum central wave length: about 3 microns;
  Distance between infrared element and anode sample: about 10 cm;
  Drying time: 5 min only with Pyrex® encapsulation (see Tests No. 8, 11, 17, 18 and 19).

Under these best conditions, no signs of damage or efflorescence were detected by visual inspection of the dried coated surface, such as waving, powdering and bloating.

As shown in Tables 1 to 3, some other conditions led to 5 min drying time for both paints using the above heat sources combination but not without causing damages.

For the base paint, waving was observed at forced air velocity higher then about 25 m/sec (see Test No. 2 and 3). For the top paint, room temperature lower than about 105° C. and/or forced air relative humidity less than about 9.9% and/or base paint substrate temperature lower than about 50° C. led to powdery surfaces (see Tests No. 4, 10, 14 and 32). The results of Test No. 32 also suggest that a too high relative humidity of the forced air (more than about 11.5%) promotes the top paint bloating on drying.

Figure 7:
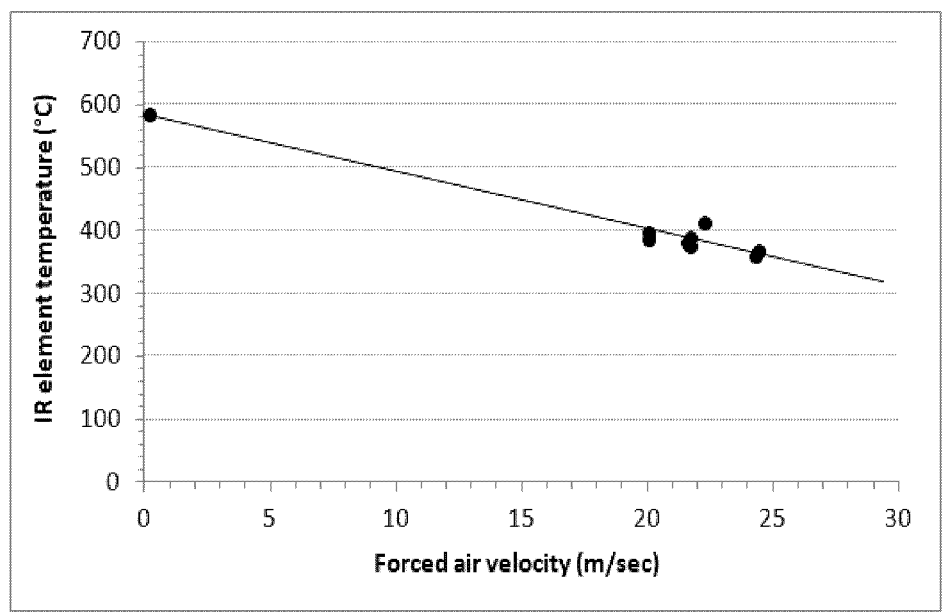
FIG. 7 illustrates the effect of forced air velocity on the IR element temperature when used with an open configuration.

Now referring to Table 2 and FIG. 7, the IR element temperature was significantly decreased by the forced air flux when used with the open configuration. The average IR element temperature obtained with this configuration is 407° C. as compared to 667° C. when a Pyrex® glass plate was used. Assuming that the IR element emissivity is close to 1, the emitted central IR wave length corresponding to these two temperatures are close to 4.3 and 3.1 microns, according to Wien's displacement law.

Figure 8:
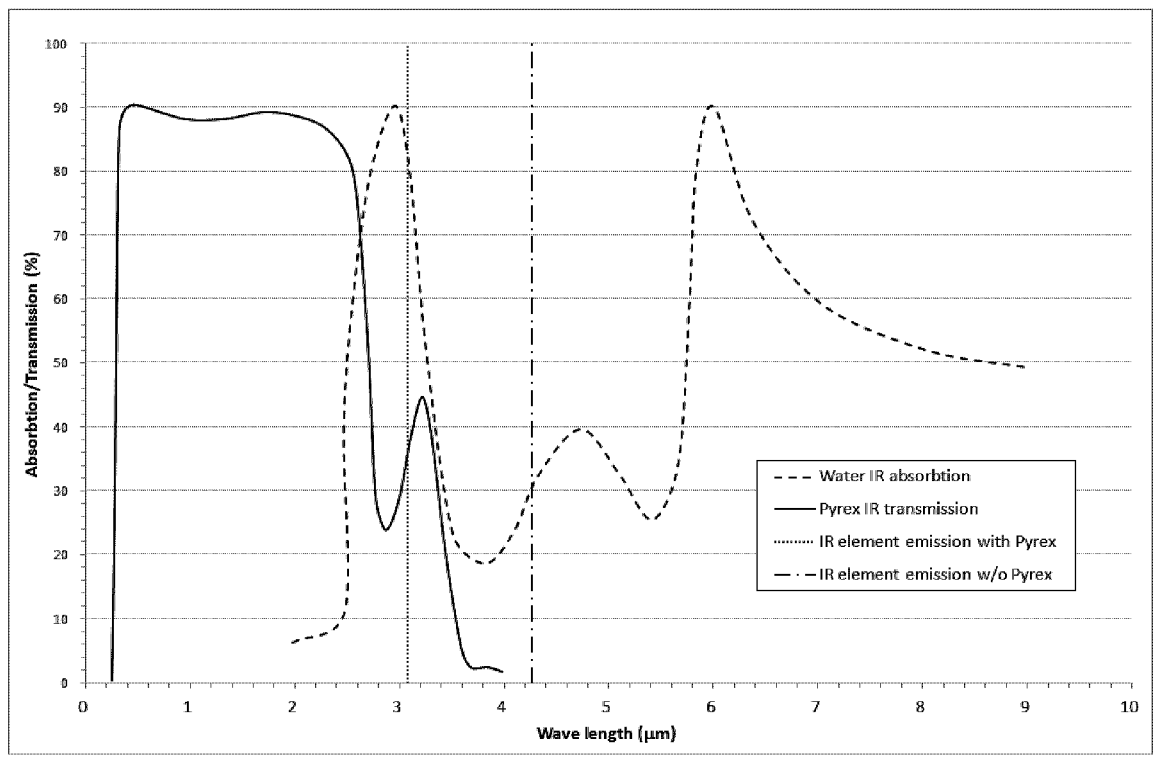
FIG. 8 illustrates the water absorption and Pyrex® transmission of infrared radiation.

Now referring to FIG. 8, at emitted IR wave length of 3.1 microns, the water IR absorption and the Pyrex® glass plate IR transmission are about 83 and 36%, respectively. At 4.3 microns, the water IR absorption is about 30%. Based on the Plank equation (Radiative energy $\propto T^4$ where T is the temperature in ° K), the absorbed radiative energy by water is 3.64 times higher, i.e., $((667+273)^{4*}36\%^{*}83\%)/((407+273)^{4*}30\%)$, with a Pyrex® glass plate.

Figure 9A:
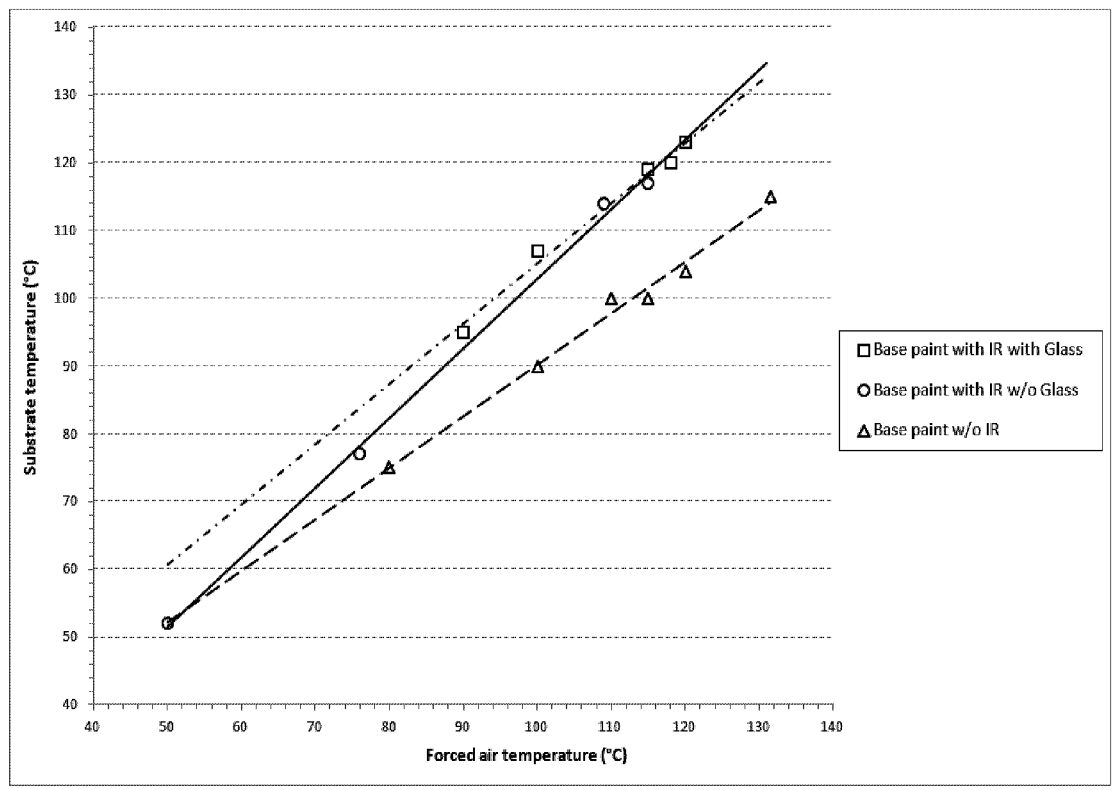
FIG. 9A illustrates the effect of forced air temperature on substrate temperature after 5 min base paint drying.
Figure 9B:
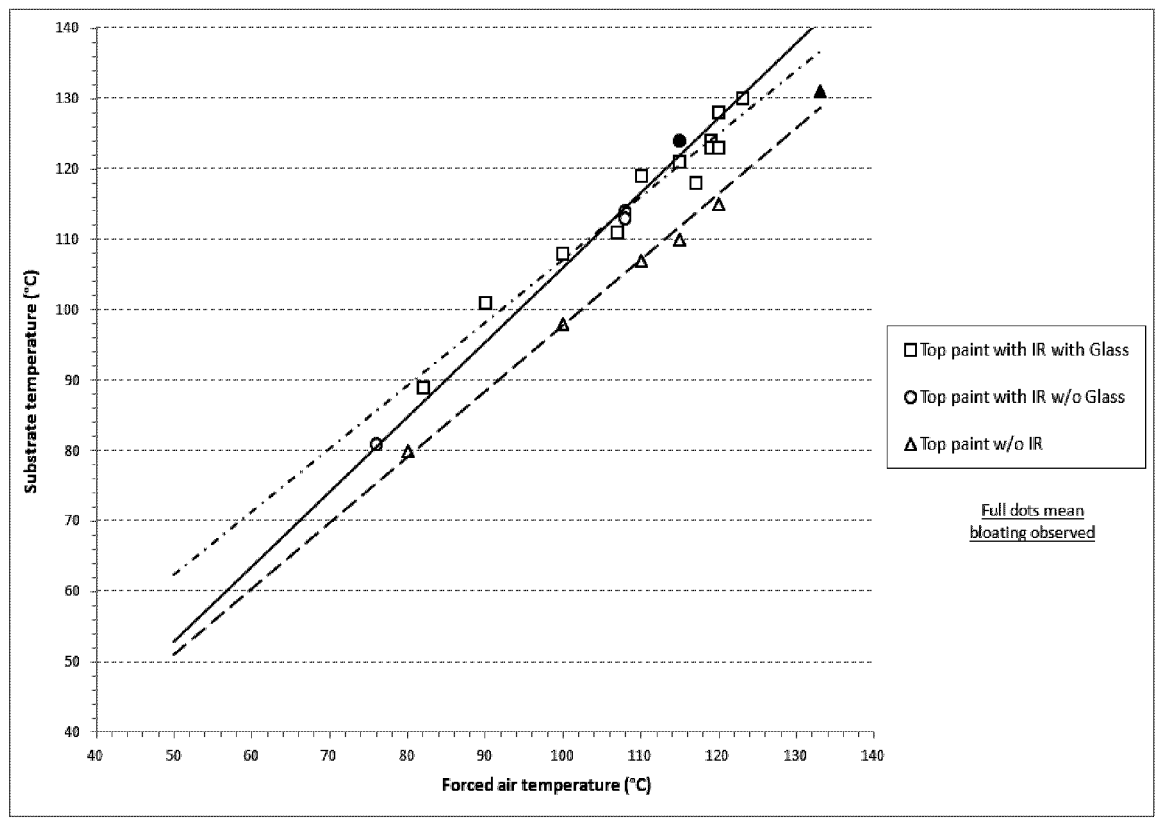
FIG. 9B illustrates the effect of forced air temperature on substrate temperature after 5 min top paint drying.

As shown on FIGS. 9A and B, an increase of substrate temperature was observed in the presence of infrared heating during both base and top paints drying. In both cases, the increase becomes almost independent of the presence of a Pyrex® glass plate at forced air temperature of about 110 to 135° C. Paint's water evaporation efficiency thus not only depends on substrate temperature since best results were only obtained with a Pyrex® glass plate, independently of the forced air temperature.

Figure 10:
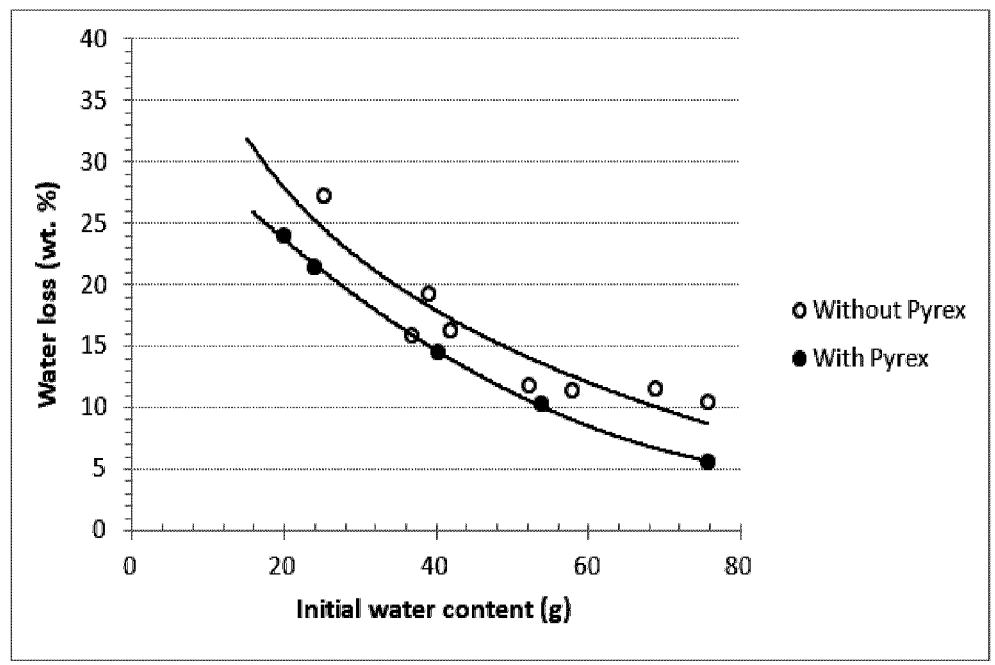
FIG. 10 illustrates the foam water loss after 1 min drying in the apparatus 10 using infrared heating only.
Figure 11:
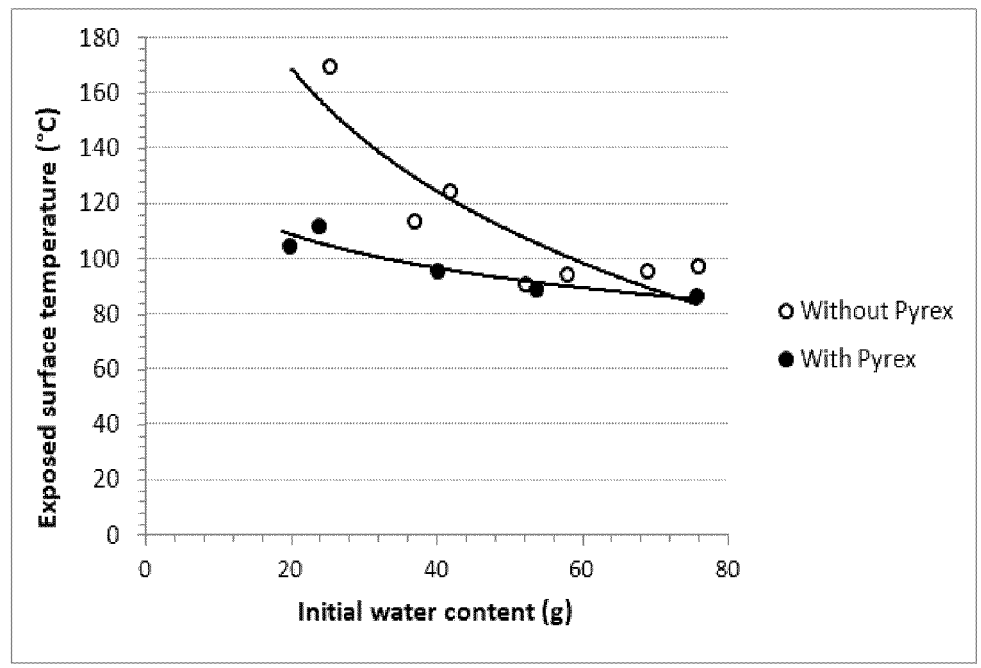
FIG. 11 illustrates the foam surface temperature after 1 min exposure to the apparatus 10 infrared heating component 70.

To better understand the effect of the emitted IR wavelength on water loss efficiency, a second set of experiments was conducted. A 13.2 g polymeric foam sample (21.6× 11.1×2.5 cm) was first impregnated with water and then dried in the drying apparatus only by the action of the IR element 70, with and without a Pyrex® glass plate. The exposed foam surface temperature and water loss after 1 min drying was measured as a function of the foam initial water content. The results are presented in FIGS. 10 and 11. It can be observed that with the Pyrex® glass plate, the IR promotes water evaporation more than heat generation while residual water decreases. The excess water vapor pressure reached at temperatures much higher than 100° C. is believed to be at the origin of the top paint bloating observed without the Pyrex® glass plate.

Figure 13:
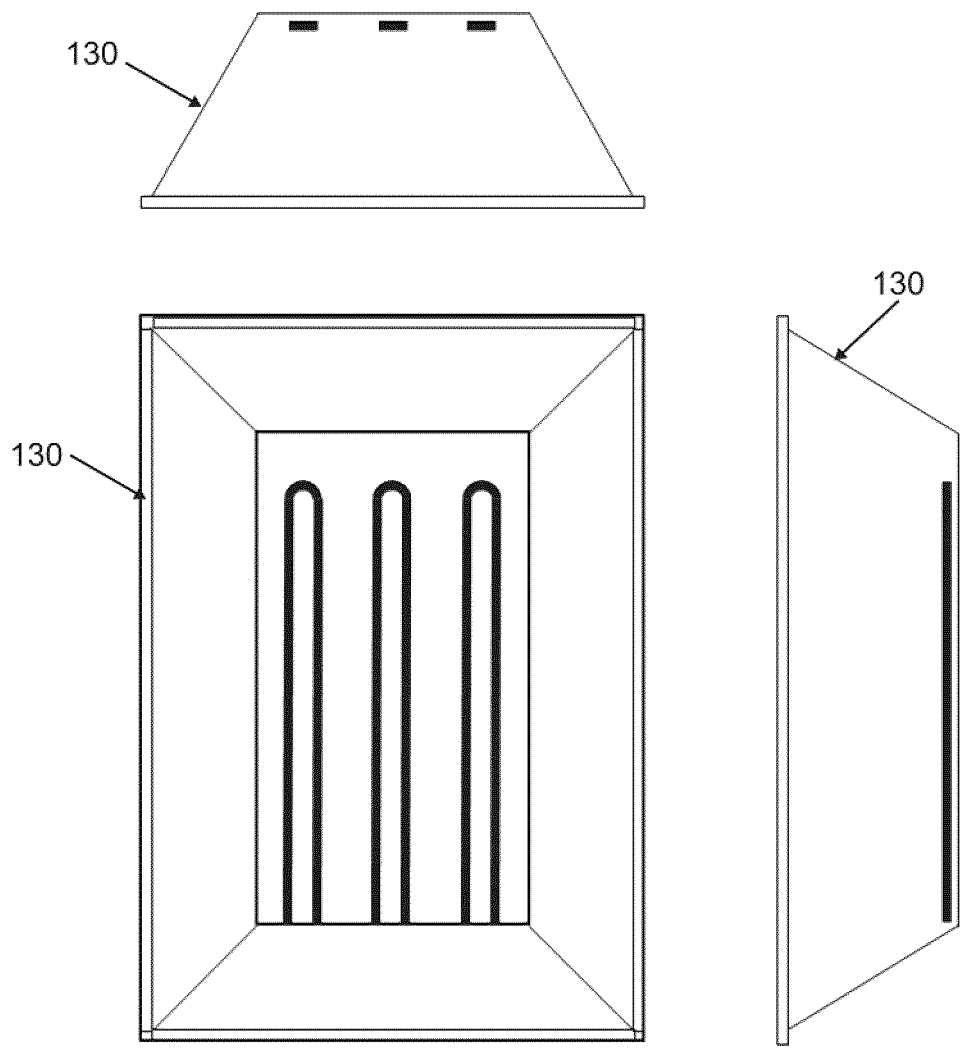
FIG. 13 illustrates an IR heating panel.
Figure 14:
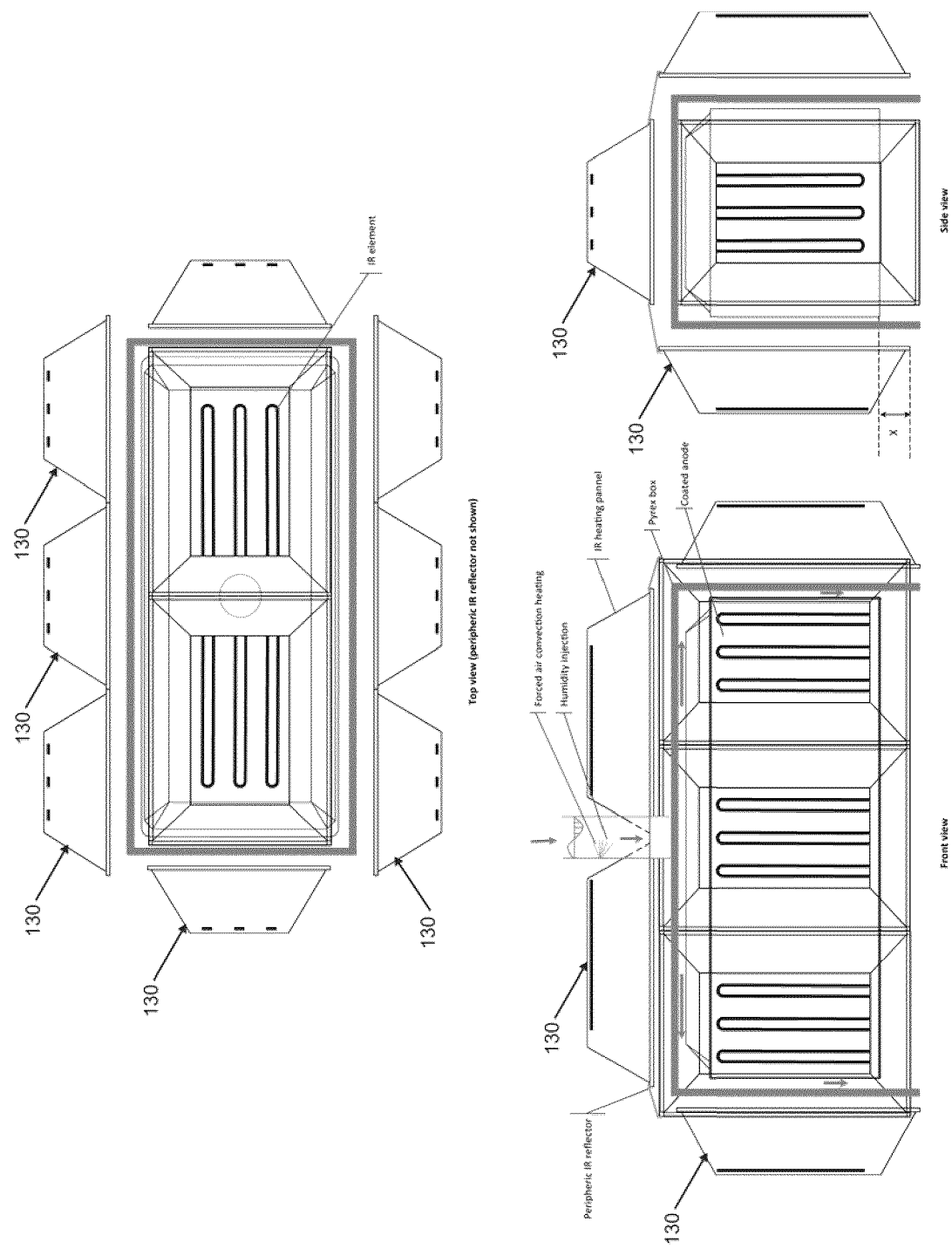
FIG. 14 illustrates an example of an apparatus for drying anode coatings within about 5 min. In configuration 1×=5 cm, in configuration 2×=15 cm and in configuration 3×=10 cm.
Figure 15:
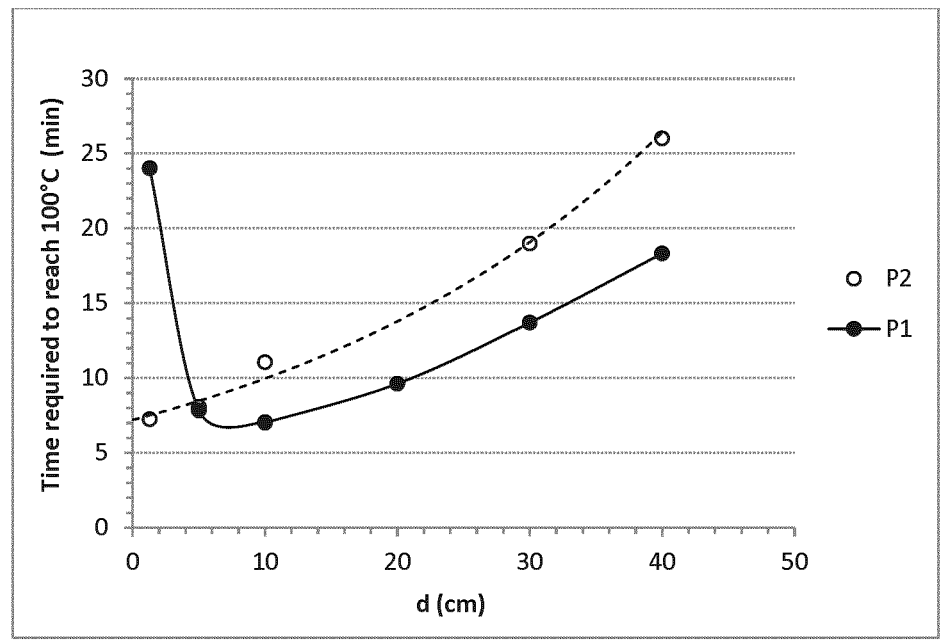
FIG. 15 illustrates the drying efficiency as a function of the distance between the IR heating panels and the anode 90. Also sec FIG. 17.
Figure 16:
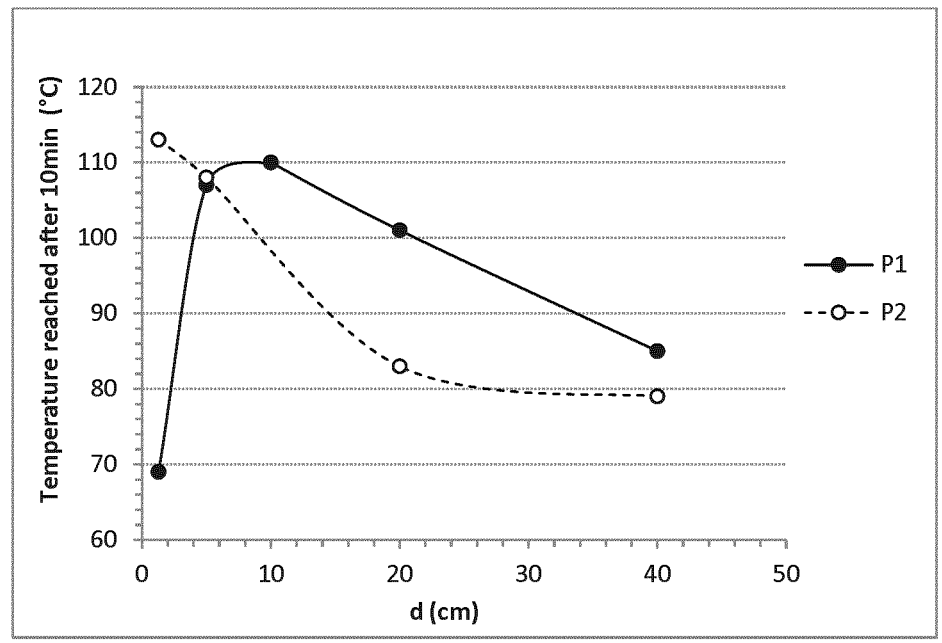
FIG. 16 illustrates the drying efficiency as a function of the distance between the IR heating panels and the anode 90. Also sec FIG. 17.
Figure 18:
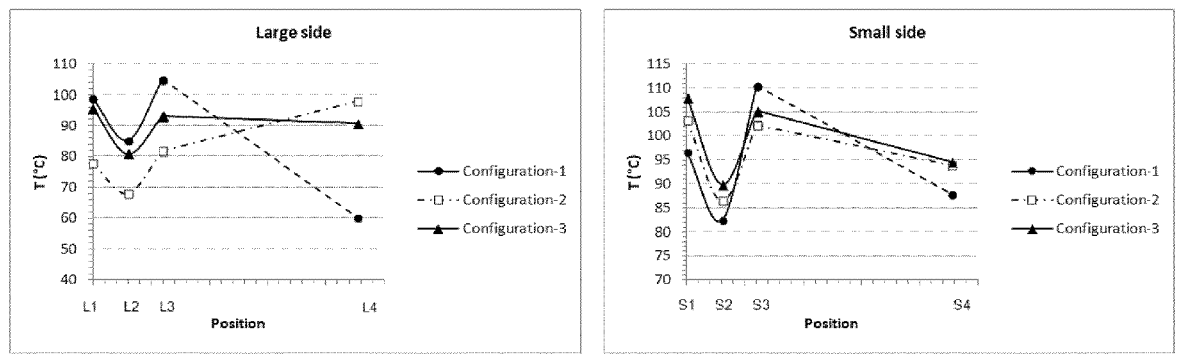
FIG. 18 illustrates the thermal gradient as a function of the panels configuration according to the configurations identified in FIG. 14 (sec above legend). See also FIG. 19.
Figure 19:
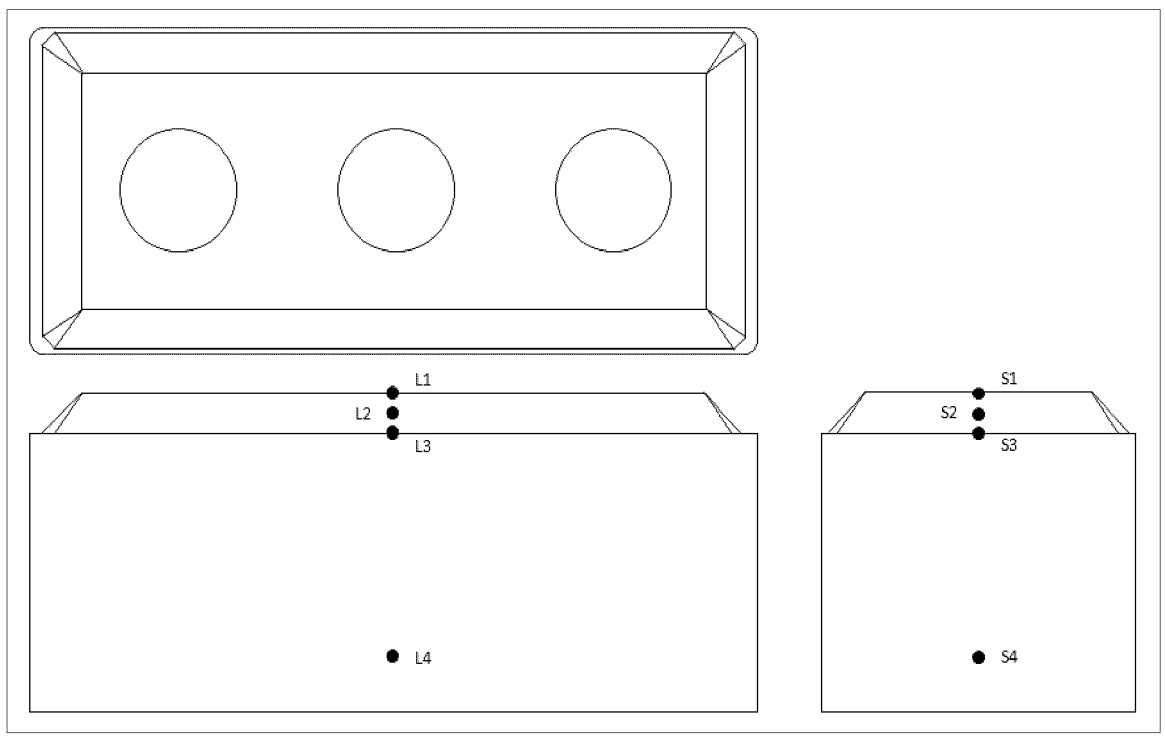
FIG. 19 illustrates the thermal gradient measurement positions according to the configurations identified in FIG. 14 (sec above legend).

An exemplary apparatus allowing for drying coated anodes using the above described drying technique is shown in FIG. 14. In this example, 10 near-infrared (0.7 to 5 mm) heating panels such as heating panels 130 shown in FIG. 13 are used. Each of these panels 130 are distributed symmetrically around the anode to be dried such that: (1) The distance between each panel and the anode must be between 5 and 10 cm (as per FIGS. 15 and 16), (2) the six lateral panels 130 in front of the anode 90 two large sides can be in contact, can be at the same level and at a distance of 10 cm between their base and that of the anode 90 (sec FIGS. 18 and 19), (3) The top of the two panels in front of the anode 90 small sides can be at the same level, (4) The two panels on top of the anode 90 can contact each other, (5) the level of the large side panels top part can be from about 1 cm to 2 cm less than that of the base of the top panels.

Figure 20:
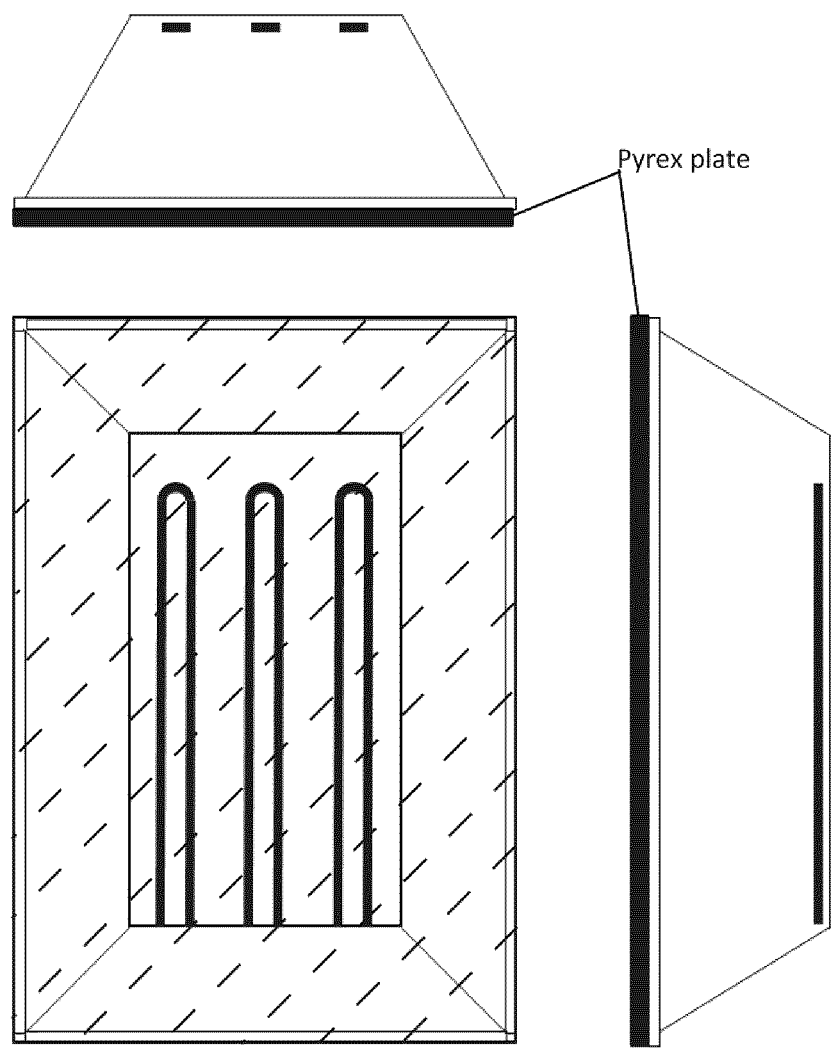
FIG. 20 illustrates an IR heating panel encapsulated with a Pyrex® plate in front of the radiating elements.
Figure 21:
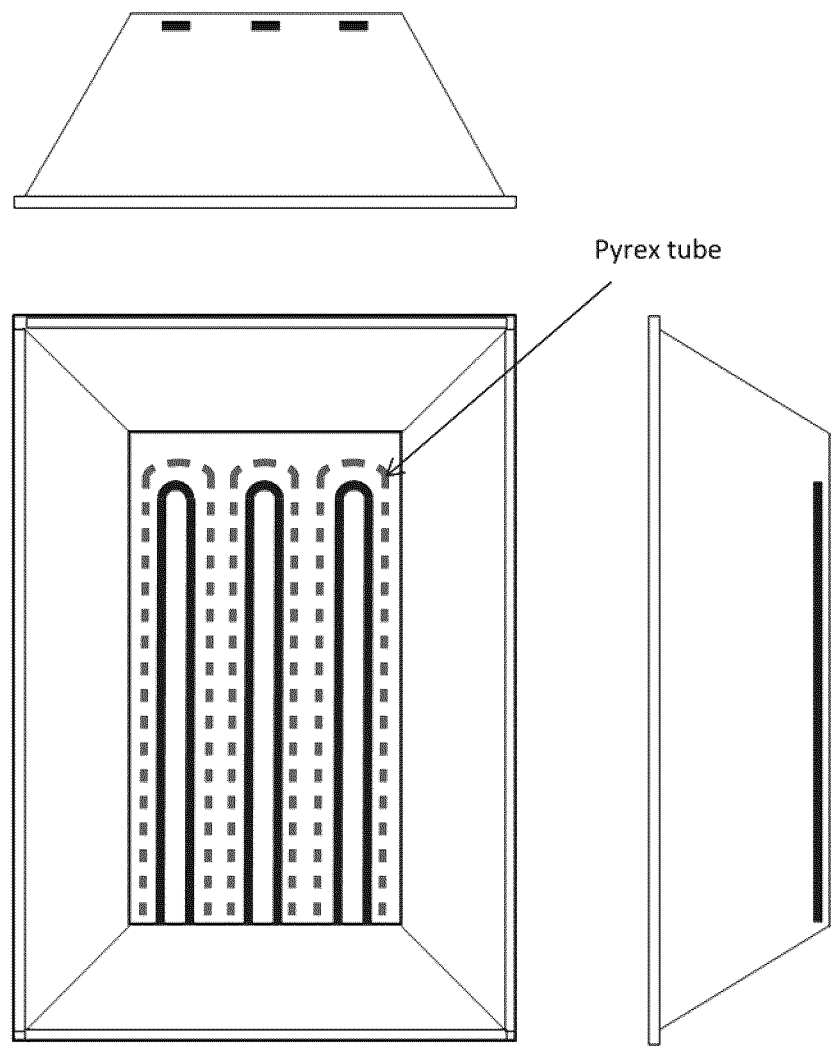
FIG. 21 illustrates an IR heating panel where the radiating elements are encapsulated within a Pyrex® tube.

Other examples of the use of a Pyrex® plate are shown in FIG. 20 (a plate in front of the heating panel) and 21 (tubes encompassing the IR elements). For such configurations to dry coated anodes in within 5 mins, the coatings should be applied as follow:

1) After the application of a first priming coating composition (the base coat) layer, it is allowed to dry at room temperature for at least 2 mins;
2) After the application of a second priming coating composition (the base coat) layer, the latter is allowed to dry at room temperature for at least 45 secs;
3) The coated anode is then dried for 5 mins into the above apparatus and then taken out;
4) During cooling, while the anode's dried priming coating composition layer temperature is still at least at 59° C. and at less than 100° C., the aqueous carbonate coating composition (i.e. the top coat) having a temperature between about 32° C. to 80° C. is applied;
5) The coated anode is then inserted into the above apparatus within the next 3 mins and allowed to dry for 5 mins.

It has been surprisingly and unexpectedly found that the drying of the aqueous carbonate coating composition (the top paint) could be achieved in such conditions in 1 minute, without any coating damage, if:

1) The base coat (the priming coating composition) temperature at top paint application is higher than 100° C. and not more than 113° C.
2) The aqueous carbonate coating composition (the top coat) temperature reaches 190° C. to 210° C. within the first minute of drying in the apparatus.

Figure 4:
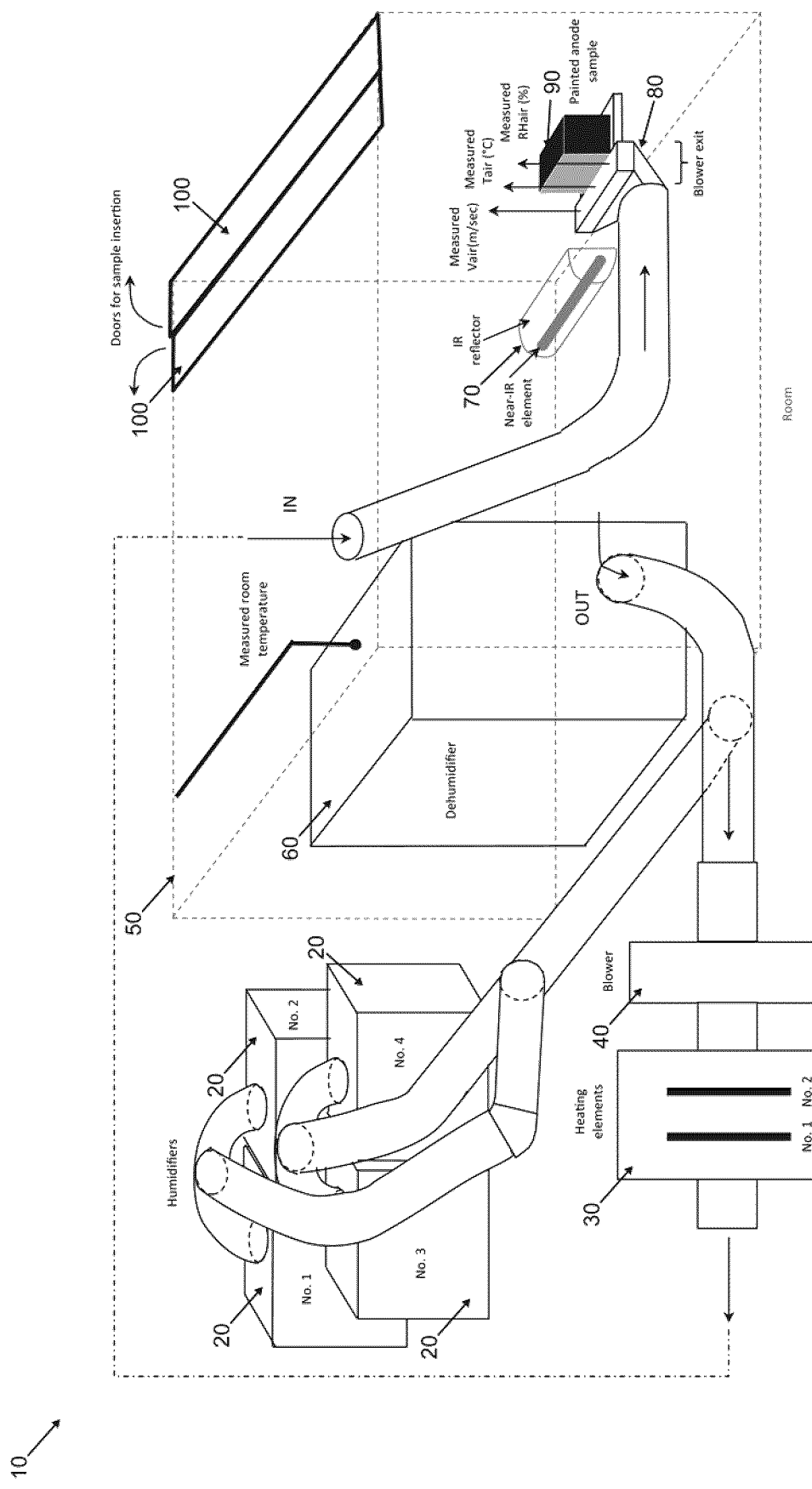
FIG. 4 illustrates a test system to perform a process according to the present invention.

An example of results obtained in such conditions with the experimental set-up shown on FIG. 4 is presented in Table V.

TABLE 5

| Test results | |
|---|---|
| Top paint application conditions | |
| Ttop (° C.) | 70 |
| Tbase (° C.) | 108 |
| Drying conditions | |
| RH air (%) | ND |
| T air (° C.) | 275 |
| V air (m/s) | 5-10 |
| T IR element (° C.) | 679 |
| T substrate (° C.) | 200 |
| T Room (° C.) | 133 |
| Drying system components state | |
| Dehumidifier | Innactive |
| Humidifiers | Innactive |
| Blower | Active |
| Heating elements (No. 1 and 2) | Active |
| IR Element | Active |
| Glass Plate | Present |
| Doors | Closed |
| Top paint after drying | |
| 1/R | =0 |
| Waving | No |
| Powdering | No |
| Bloating | No |

Figure 12:
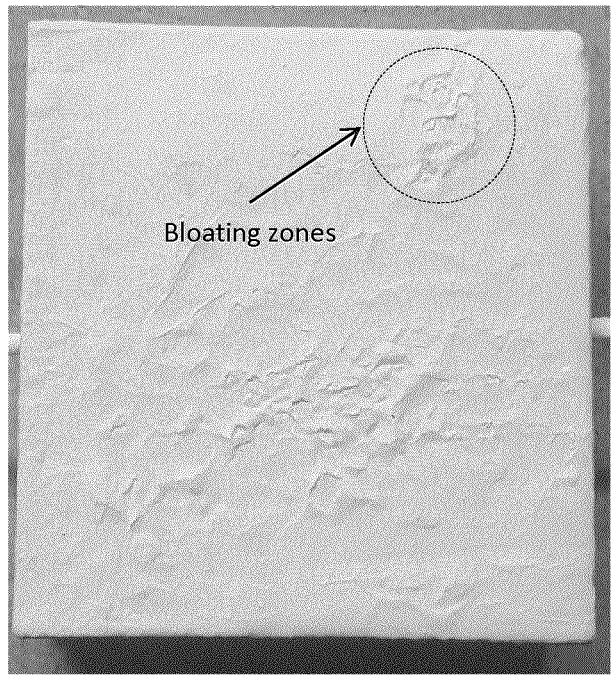
FIG. 12 illustrates damage observed on top coat (carbonate coating) after being applied on a 118° C. base coat surface.

The tested top paint boiling point was measured and found to be about 108±0.4° C. Thus, at temperature close to its boiling point, the water partial pressure generated by the top coat on drying is not sufficient to cause damage up to an over temperature of less than 5° C. (i.e., 113-108° C.). Above that limit, boiling promotes coating bloating as shown on FIG. 12.

Example 2

Drying Process 2

Figure 17:
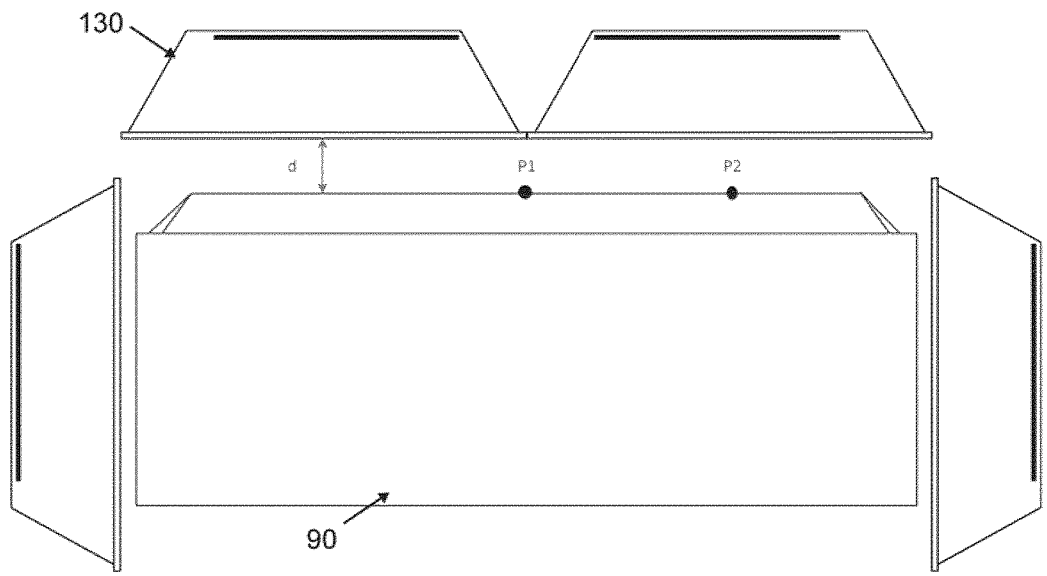
FIG. 17 illustrates the drying efficiency measurement positions on the anode 90.

The apparatus shown in FIG. 14, with IR only (X=10 cm) and without Pyrex® plate was used at maximum electric power to conduct the following tests on full size anodes (approximately 155×65×64 cm). The tested position was P1 as shown in FIG. 17. Under the tested conditions, the base coat could may be dried within 10 to 20 minutes while the free water into the top coat may be totally removed (1/R=0) after 19 minutes of drying.

TABLE 6A

Paints application and drying procedures

| Test No. | Paint Type | Base-Layer 1 | | Base-Layer 2 | | | | | |
|---|---|---|---|---|---|---|---|---|---|
| | | Application (min) | Soaking (min) | Application (min) | Soaking (min) | Drying (min) | Soaking (min) | 1/R | Waving |
| 33 | Base | ND | ND | ND | ND | 20.00 | 4.50 | =0 | NO |
| | Top | — | — | — | — | — | — | — | — |
| 34 | Base | ND | ND | ND | ND | 10.00 | 3.50 | =0 | NO |
| | Top | — | — | — | — | — | — | — | — |

TABLE 6B

Paints application and drying procedures

| Test No. | Paint Type | Top | | | | | | | | |
|---|---|---|---|---|---|---|---|---|---|---|
| | | TTop (°C.) | TBase (°C.) | Application (min) | Soaking (min) | Drying (min) | 1/R | Waving | Powdering | Bloating |
| 33 | Base | — | — | — | — | — | — | — | — | — |
| | Top | ND | 79.00 | 0.50 | 0.00 | 19.00 | =0 | NO | NO | NO |
| 34 | Base | — | — | — | — | — | — | — | — | — |
| | Top | 53.00 | 101.64 | ND | 0.00 | 15.00 | >0 | ND | ND | ND |

TABLE 7

Drying conditions
Drying conditions

| Test No. | Paint Type | T substrate (C.) | T atm (°C.) | RH atm (%) |
|---|---|---|---|---|
| 33 | Base | 132.00 | ND | ND |
| | Finition | 154.00 | 28.50 | 49.10 |
| 34 | Base | 103.00 | ND | ND |
| | Finition | 115.00 | 24.00 | 56.80 |

Example 3

Drying Process 3

Full anode size (approximately 155×65×64 cm) were tested at positions located between P1 and P2 as shown in FIG. 17. The base coat was dried using the set-up shown in FIG. 14, with IR only (X=10 cm) and without Pyrex® plate, which was operated at maximum electric power. The top coat was dried, at maximum electric power, with the set-up shown in FIG. 22. The latter was using the same blower and heating elements as those used in the apparatus shown on FIG. 2. Under the tested conditions, the free water into the top coat may be totally removed (1/R=0) after 10 minutes drying.

TABLE 8A

Paints application and drying procedures

| Test No. | Paint Type | Base-Layer 1 | | Base-Layer 2 | | | | | |
|---|---|---|---|---|---|---|---|---|---|
| | | Application (min) | Soaking (min) | Application (min) | Soaking (min) | Drying (min) | Soaking (min) | 1/R | Waving |
| 35 | Base | ND | ND | ND | ND | 10.00 | ND | =0 | NO |
| | Top | — | — | — | — | — | — | — | — |
| 36 | Base | 1.00 | 2.00 | 0.25 | 4.75 | 10.00 | 0.68 | =0 | NO |
| | Top | — | — | — | — | — | — | — | — |

TABLE 8B

Paints application and drying procedures

| Test No. | Paint Type | Top | | | | | | | | |
|---|---|---|---|---|---|---|---|---|---|---|
| | | TTop (°C.) | TBase (°C.) | Application (min) | Soaking (min) | Drying (min) | 1/R | Waving | Powdering | Bloating |
| 35 | Base | — | — | — | — | — | — | — | — | — |
| | Top | 54.00 | 64.00 | 0.25 | 3.00 | 10.00 | =0 | ND | ND | ND |

TABLE 8B-continued

| | | Paints application and drying procedures | | | | | | | |
|---|---|---|---|---|---|---|---|---|---|
| | | | Top | | | | | | |
| Test No. | Paint Type | TTop (° C.) | TBase (° C.) | Application (min) | Soaking (min) | Drying (min) | 1/R | Waving | Powdering | Bloating |
| 36 | Base | — | — | — | — | — | — | — | — | — |
| | Top | 57.00 | ND | 0.35 | 0.80 | 10.00 | =0 | ND | ND | ND |

TABLE 9

| | | Drying conditions | | | | | |
|---|---|---|---|---|---|---|---|
| Test No. | Paint Type | RH air (%) | T air (° C.) | V air (m/s) | T substrate (° C.) | T atm (° C.) | RH atm (%) |
| 35 | Base | — | — | — | 125.00 | ND | ND |
| | Finition | 11.5-12.4 | 69-71 | 21-25 | ND | ND | ND |
| 36 | Base | — | — | — | ND | ND | ND |
| | Finition | 10.5-10.6 | 81-84 | 21-23 | ND | ND | ND |

Example 4

Drying at Regulated Room Temperature

Three layers of base paint were sprayed on a full-size anode (approximately 155×65×64 cm) in within 10 to 20 minutes. The anodes were then inserted in the set-up shown in FIG. 14, with IR only (X=5 cm) and without Pyrex® plate, which was operated at maximum electric power. After 10 minutes drying, the anodes were removed from the set-up and allowed to cool until the base coat temperature reaches 60° C. to 80° C.

At that moment, the top coat was sprayed on the base coat within the next 2 minutes. Within the following 5 minutes, the anodes were brought inside a room where the temperature and relative humidity were maintained at 40° C. to 60° C. and 12 to 16%, respectively. After 48 hours drying in such conditions, the anodes coating was totally dried (1/R=0) and defect-free (no waving, no powdering, no bloating and no trace of free (unbounded) flakes.

Example 5

Figure 24:
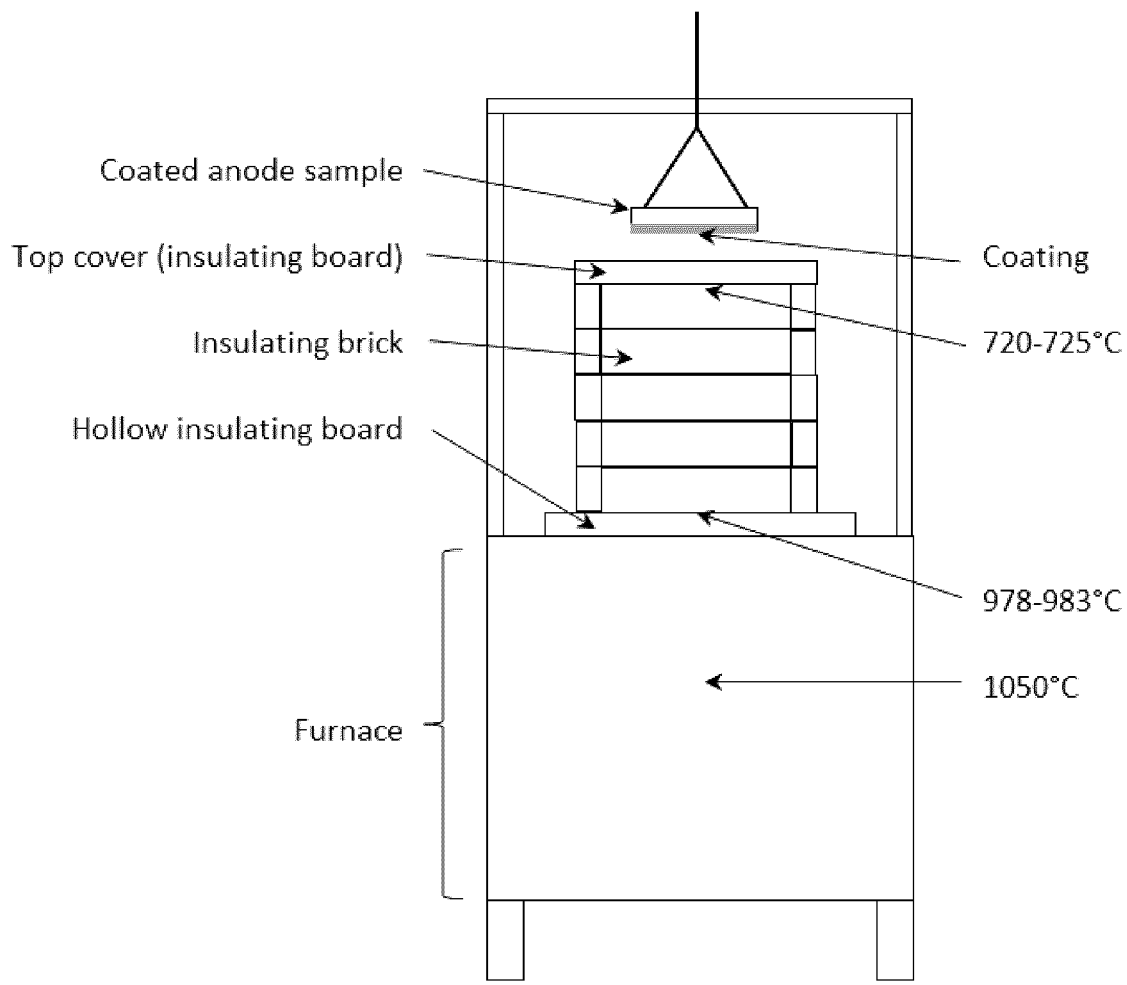
FIG. 24 illustrates an experimental heating apparatus used for simulating anode insertion into an electrolytic cell.

Drying During Insertion into a High Temperature Environment Such as an Electrolitic Cell For simulating coated anode insertion into an electrolytic cell, the apparatus shown on FIG. 24 was used. This apparatus uses a vertical electric furnace whose top cover was replaced by a chimney made from insulating bricks for producing a thermal gradient. Prior the test, the top of the chimney was closed with an insulating board cover to bring the furnace at 1050° C. and to achieve the stable thermal gradient shown on the figure.

The intermediate substrate/aqueous priming composition (base paint or coat) was first applied on an anode sample (15.6×10.8×2.5 cm) and was then totally dried before the application of the aqueous coating composition (top coat). The latter, at temperature of 32 to 90° C. was then applied on the base coat in less than 30 seconds, and was then maintained at room temperature (20-23° C.) for 3 minutes and was finally inserted from the top into the set-up and then gradually moved down toward the center of the furnace.

Low Temperature Base Coat

A first series of tests (tests A to H) was made by applying the aqueous coating composition (top coat) on a 100° C. or less intermediate substrate/aqueous priming composition (base paint or coat) surface.

Figure 25:
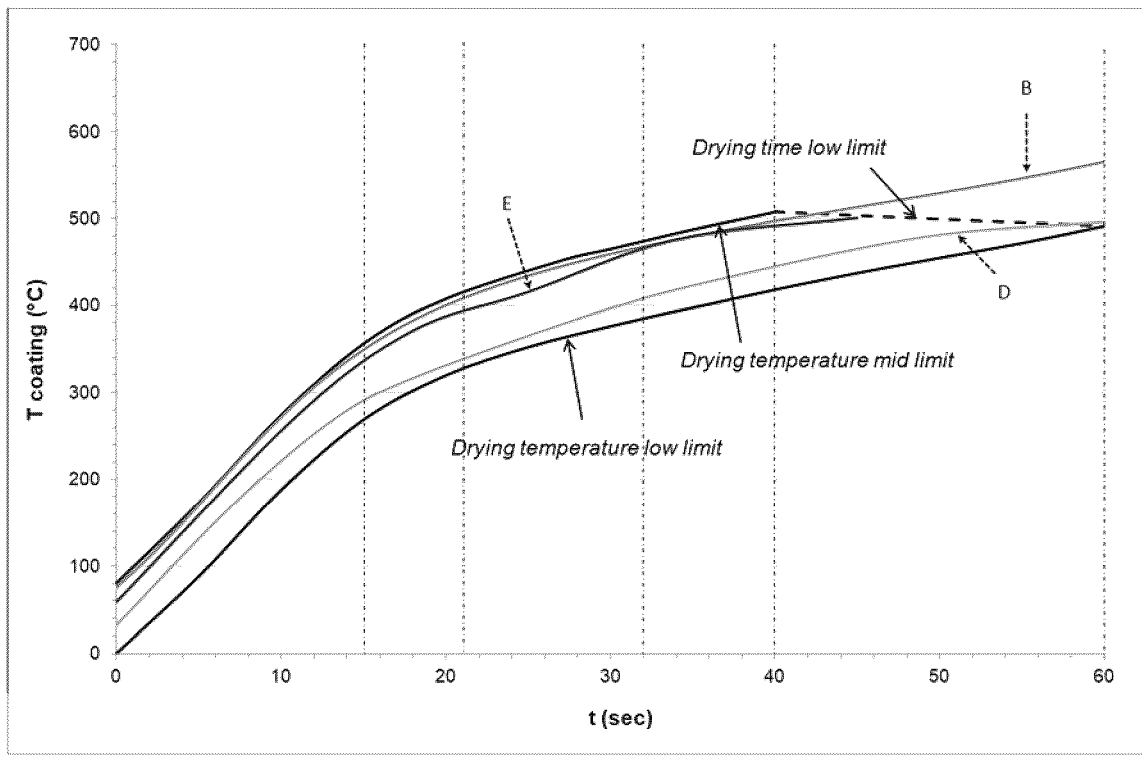
FIG. 25 illustrates temperature results obtained with intermediate substrate/aqueous priming composition (base coat), at 100° C. or less, and leading to undamaged dried coating.

The results of tests B, D and E fall within the temperature and heating rate limits as shown on FIG. 25 and Table 13, respectively. In all case the drying time limit was reached or exceeded. The top coatings from these tests were totally dried (1/R=0) without being damaged.

Figure 26:
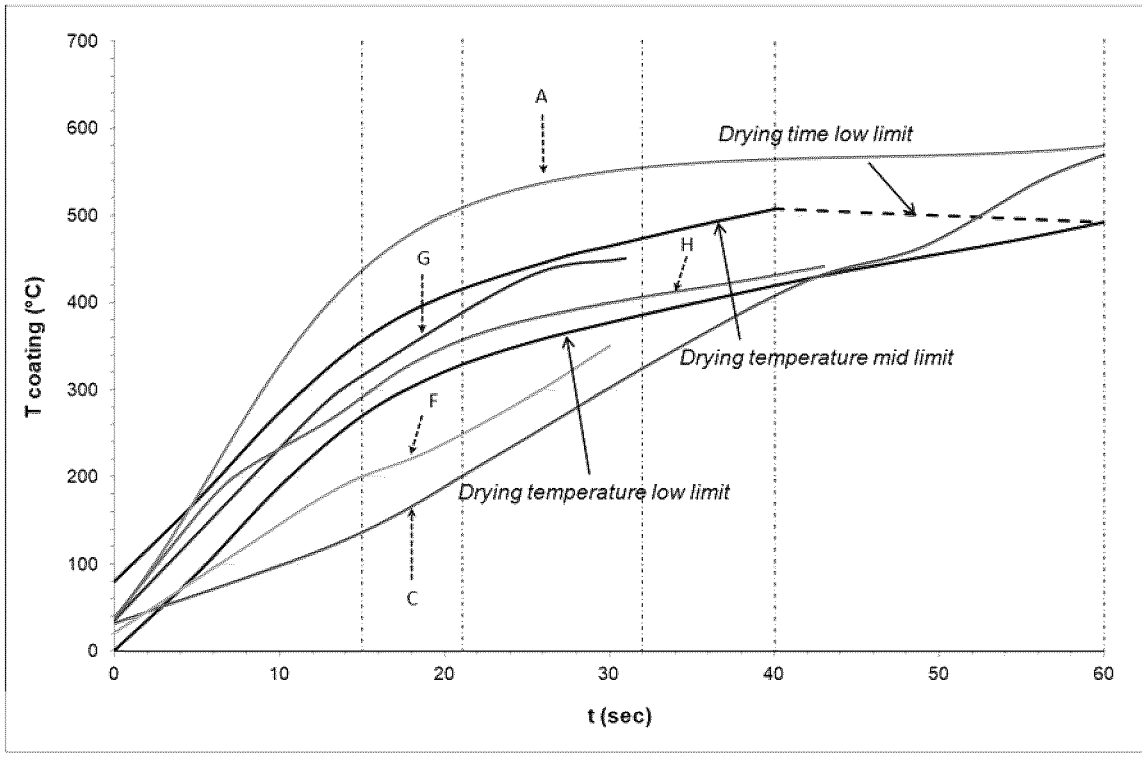
FIG. 26 illustrates temperature results obtained with intermediate substrate/aqueous priming composition (base coat), at 100° C. or less, and leading to damaged dried coating.

The results of tests G and H fall within the temperature limits as shown on FIG. 26 but exceed the heating rate limits according to Table 13 (grey cells indicate over values). The aqueous coating composition top coatings from these tests were not totally dried (1/R>0) and were damaged. As shown on FIG. 26, the results of tests A, C and F fall outside the temperature limits. The top coatings from these tests were either not totally dried or damaged.

| | Heating rate test results obtained with base coat at 100° C. or less | | | | | | | |
|---|---|---|---|---|---|---|---|---|
| Test Time (t) (sec) | A | B | C | D | E | F | G | H |
| | | | | Maximum heating rate (° C./sec) | | | | |
| 0 ≤ t ≤ 15 | NA | 16.53 | NA | 20.28 | 20.65 | NA | 19.57 | 24.40 |
| 15 < t ≤ 21 | NA | 12.32 | NA | 8.62 | 12.85 | NA | 12.31 | 14.39 |
| 21 < t ≤ 32 | NA | 6.58 | NA | 6.91 | 5.45 | NA | 11.69 | 7.20 |
| 32 < t ≤ 40 | NA | 3.57 | NA | 5.58 | 5.45 | NA | NA | 3.24 |
| 40 < t ≤ 60 | NA | 3.57 | NA | 3.99 | 1.90 | NA | NA | NA |
| 1/R (ohm$^{-1}$) | =0 | =0 | =0 | =0 | =0 | >0 | >0 | >0 |
| Damage | Spalling | Nil | Pop-out | Nil | Nil | Nil | Spalling | Spalling |

Time t is time elapsed since beginning of the method of drying.
NA = Not applicable.

TABLE 14

Heating rate test results obtained with base coast at above 100° C. and not higher than 113° C. Time t is time elapsed since beginning of the method of drying.

| Test Time (t) (sec) | I | J | K | L | M |
|---|---|---|---|---|---|
| | Maximum heating rate (° C./sec) | | | | |
| 0 ≤ t ≤ 15 | 26.91 | 18.46 | 35.32 | NA | 40.43 |
| 15 < t ≤ 21 | 22.29 | 9.25 | 3.69 | NA | 13.36 |
| 21 < t ≤ 32 | 7.37 | 6.98 | NA | NA | NA |
| 32 < t ≤ 40 | NA | NA | NA | NA | NA |
| 40 < t ≤ 60 | NA | NA | NA | NA | NA |
| 1/R (ohm$^{-1}$) | =0 | =0 | =0 | =0 | =0 |
| Damage | Nil | Nil | Nil | Pop-out | Bloating |

High Temperature Base Coat

A second series of tests (tests I to M) was conducted by applying the aqueous coating composition (top coat) on an intermediate substrate base coat surface having a temperature of more than 100° C. and less or equal to 113° C.

Figure 27:
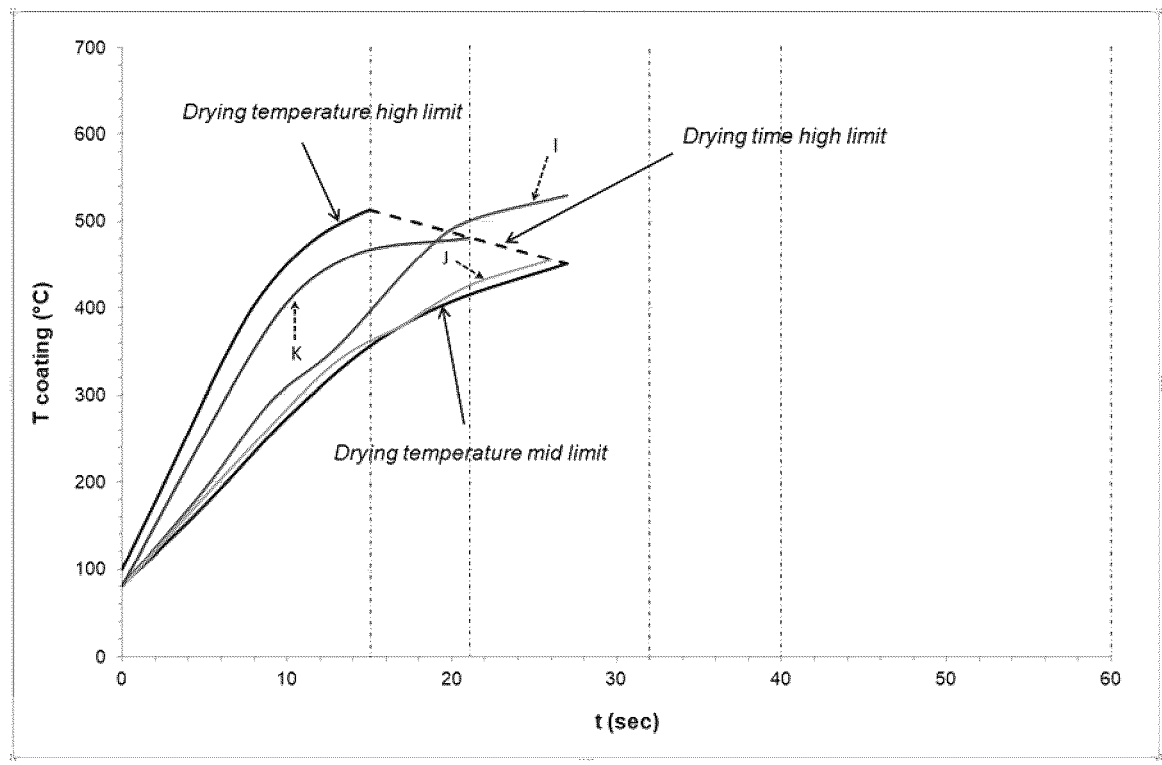
FIG. 27 illustrates temperature results obtained with intermediate substrate/aqueous priming composition (base coat), at above 100° C. and not higher than 113° C., and leading to undamaged dried coating.

The results of tests I, J and K fall within the temperature and heating rate limits as shown on FIG. 27 and Table 14, respectively. In all cases the drying time limit was reached or exceeded. The top coatings from these tests were totally dried without be damaged.

Figure 28:
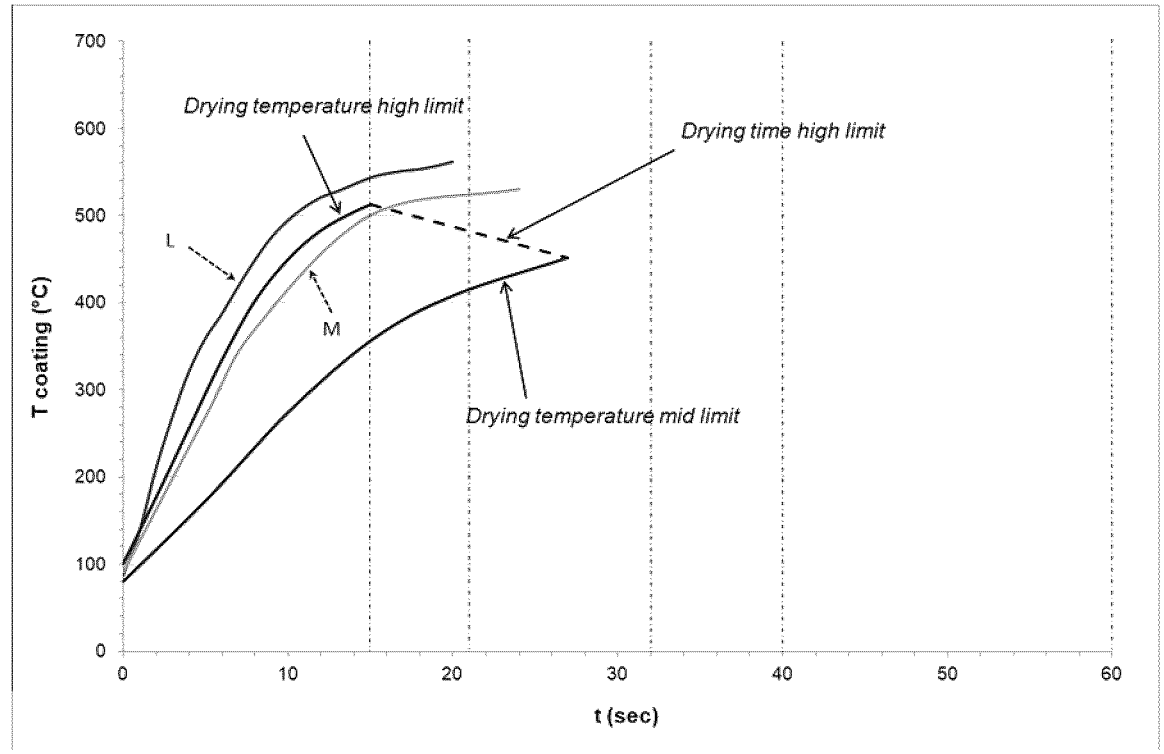
FIG. 28 illustrates temperature results obtained with intermediate substrate/aqueous priming composition (base coat), at above 100° C. and not higher than 113° C., and leading to damaged dried coating.
Figure 29:
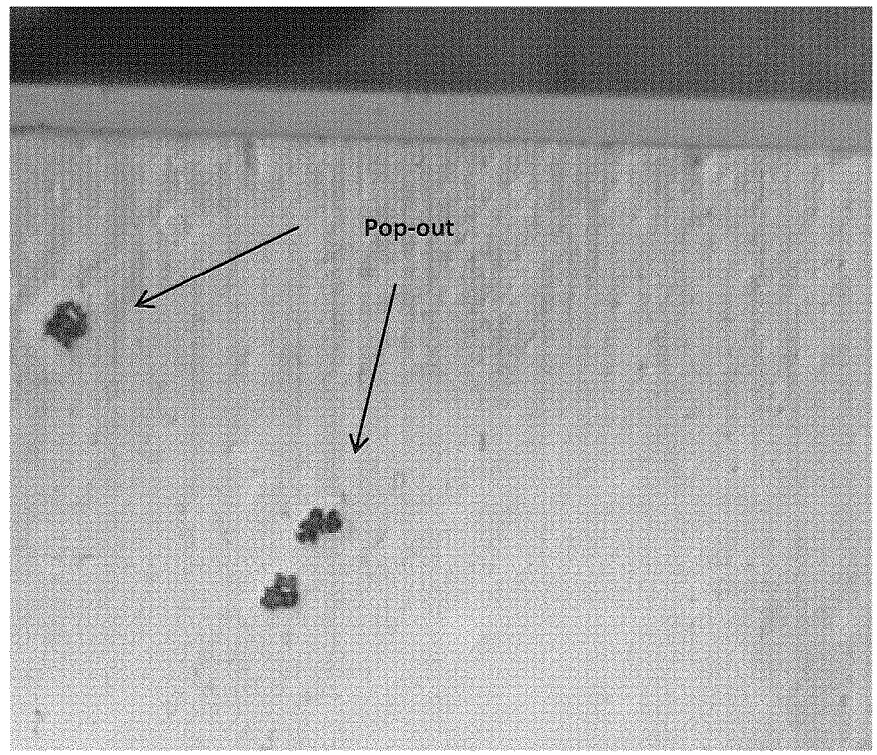
FIG. 29 illustrates example of pop-outs formed on the top coat during drying.

According to FIG. 28, the results of test L fall outside the temperature limits. Although the top coating was totally dried during the test, pop-outs were formed such as those shown on FIG. 29. While the results from test M fall within the temperature limits (sec FIG. 28), the heating rate limit was exceeded (sec Table 14) which led to coating damage. After the test, the coating was totally dried.

Example 6

Drying Process 4

The set-up shown in FIG. 14, with IR only (X=10 cm) and without Pyrex® box was used at maximum electric power to conduct two tests on full size anodes (about 155×65×64 cm). The data during the tests were collected from position P1 as shown in FIG. 17. The tests results are presented in Tables 16A and 16B and 17 below. The base coat temperature on drying in the above conditions reached 103° C. after 10 min and 132° C. after 20 min. The coating was totally dried after both periods (1/R=0). Concerning the top coat, it reached the temperature on drying of 115° C. after 15 min and 154° C. after 19 min. Only the latter case (154° C.) led to a complete free water removal from the material (1/R=0).

TABLE 16A

Paints application and drying procedures

| Test No. | Paint Type | Base-Layer 1 | | Base-Layer 2 | | | | | |
|---|---|---|---|---|---|---|---|---|---|
| | | Application (min) | Soaking (min) | Application (min) | Soaking (min) | Drying (min) | Soaking (min) | 1/R | Waving |
| B-1 | Base | ND | ND | ND | ND | 20.00 | 4.50 | =0 | NO |
| | Top | — | — | — | — | — | — | — | — |
| B-2 | Base | ND | ND | ND | ND | 10.00 | 3.50 | =0 | NO |
| | Top | — | — | — | — | — | — | — | — |

TABLE 16B

Paints application and drying procedures

| Test No. | Paint Type | Top | | | | | | | | |
|---|---|---|---|---|---|---|---|---|---|---|
| | | TTop (° C.) | TBase (° C.) | Application (min) | Soaking (min) | Drying (min) | 1/R | Waving | Powdering | Bloating |
| B-1 | Base | — | — | — | — | — | — | — | — | — |
| | Top | ND | 79.00 | 0.50 | 0.00 | 19.00 | =0 | NO | NO | NO |
| B-2 | Base | — | — | — | — | — | — | — | — | — |
| | Top | 53.00 | 101.64 | ND | 0.00 | 15.00 | >0 | ND | ND | ND |

TABLE 17

| | | Drying conditions | | |
|---|---|---|---|---|
| Test No. | Paint Type | T substrate (° C.) | T atm (° C.) | RH atm (%) |
| B-1 | Base | 132.00 | ND | ND |
| | Top | 154.00 | 28.50 | 49.10 |
| B-2 | Base | 103.00 | ND | ND |
| | Top | 115.00 | 24.00 | 56.80 |

Example 7

Drying Process 5

Figure 22:
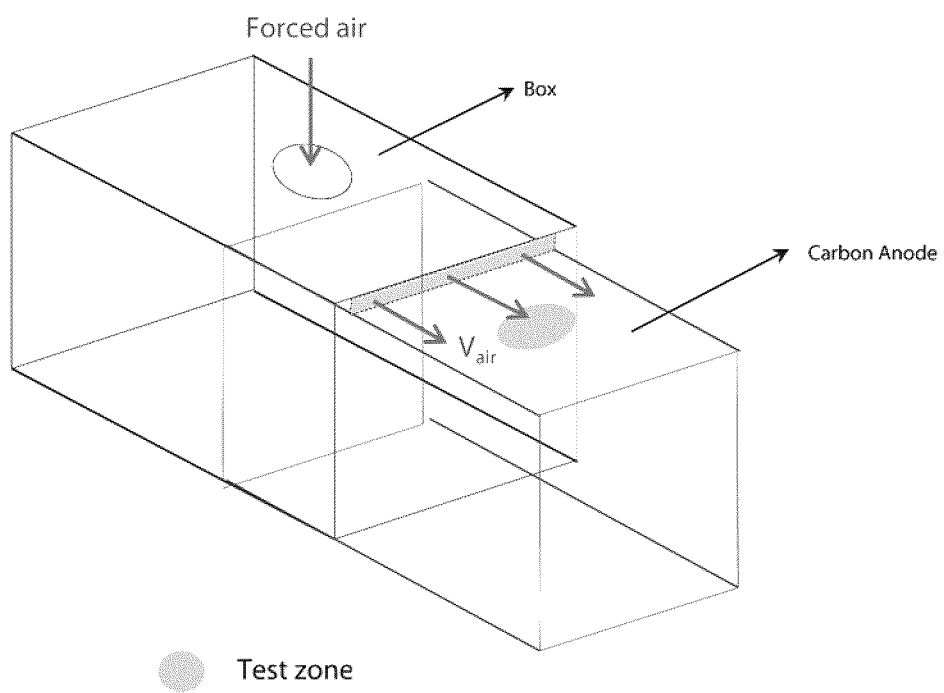
FIG. 22 illustrates an apparatus for testing under forced air only.

A full size anode (about 155×65×64 cm) was dried under forced air convection conditions, with the set-up shown in FIG. 22, after having been coated with the base and then with the top paint. This set-up was using the same blower and heating elements (operating at maximum power) as those used in the set-up shown in FIG. 4. The hot air was forced to flow through a 5 cm gap around the anode by the use of an external box as shown on the figure. The data during both paint drying were collected at a position located between P1 and P2, according to FIG. 17. By referring to Tables 18A and B and 19, the above drying conditions allowed to reach an air flow velocity of 3.18 to 3.55 m/sec at the tested position where the temperature of the substrates reaches between about 58 to 62° C. In such conditions, 60 to 63 minutes were required to totally dry the top coat (1/R=0), as compared to 20 to 25 minutes for the base coat.

TABLE 18A

| | | Paints application and drying procedures | | | | | | |
|---|---|---|---|---|---|---|---|---|
| | | Base-Layer 1 | | Base-Layer 2 | | | | |
| Test No. | Paint Type | Application (min) | Soaking (min) | Application (min) | Soaking (min) | Drying (min) | Soaking (min) | 1/R | Waving |
| B-3 | Base | ND | ND | ND | ND | 10.00 | ND | =0 | NO |
| | Top | — | — | — | — | — | — | — | — |
| B-4 | Base | 1.00 | 2.00 | 0.25 | 4.75 | 10.00 | 0.68 | =0 | NO |
| | Top | — | — | — | — | — | — | — | — |

TABLE 18B

| | | Paints application and drying procedures | | | | | | | |
|---|---|---|---|---|---|---|---|---|---|
| | | Top | | | | | | | |
| Test No. | Paint Type | TTop (° C.) | TBase (° C.) | Application (min) | Soaking (min) | Drying (min) | 1/R | Waving | Powdering | Bloating |
| B-3 | Base | — | — | — | — | — | — | — | — | — |
| | Top | 54.00 | 64.00 | 0.25 | 3.00 | 10.00 | =0 | ND | ND | ND |
| B-4 | Base | — | — | — | — | — | — | — | — | — |
| | Top | 57.00 | ND | 0.35 | 0.80 | 10.00 | =0 | ND | ND | ND |

TABLE 19

| | | Drying conditions | | | | | |
|---|---|---|---|---|---|---|---|
| Test No. | Paint Type | RH air (%) | T air (° C.) | V air (m/s) | T substrate (° C.) | T atm (° C.) | RH atm (%) |
| B-3 | Base | — | — | — | 125.00 | ND | ND |
| | Top | 11.5-12.4 | 69-71 | 21-25 | ND | ND | ND |
| B-4 | Base | — | — | — | ND | ND | ND |
| | Top | 10.5-10.6 | 81-84 | 21-23 | ND | ND | ND |

Example 8

Drying Process 6

Three layers of base paint were sprayed on a full size anodes (approximately 155×65×64 cm) within 10 to 20 minutes of one another. The anodes were then inserted in the set-up shown in FIG. 14, with IR only (X=5 cm) and without Pyrex® box, which was operated at maximum electric power. After 10 minutes drying, the anodes were removed from the set-up and allowed to cool until the base coat temperature reaches 60 to 80° C. At that moment, the top coat was sprayed on the base coat within the next 2 minutes. Next, within 5 minutes of spraying of the base coat, the anodes were brought inside a room where the temperature and relative humidity were maintained at 40 to 60° C. and 12 to 16%, respectively. After 48 hours drying in such conditions, the anodes coating was totally dried (1/R=0) and defect-free (no waving, no powdering and no bloating).

Example 9

Pyrex® Versus Pyroceram® Glass

Figure 30:
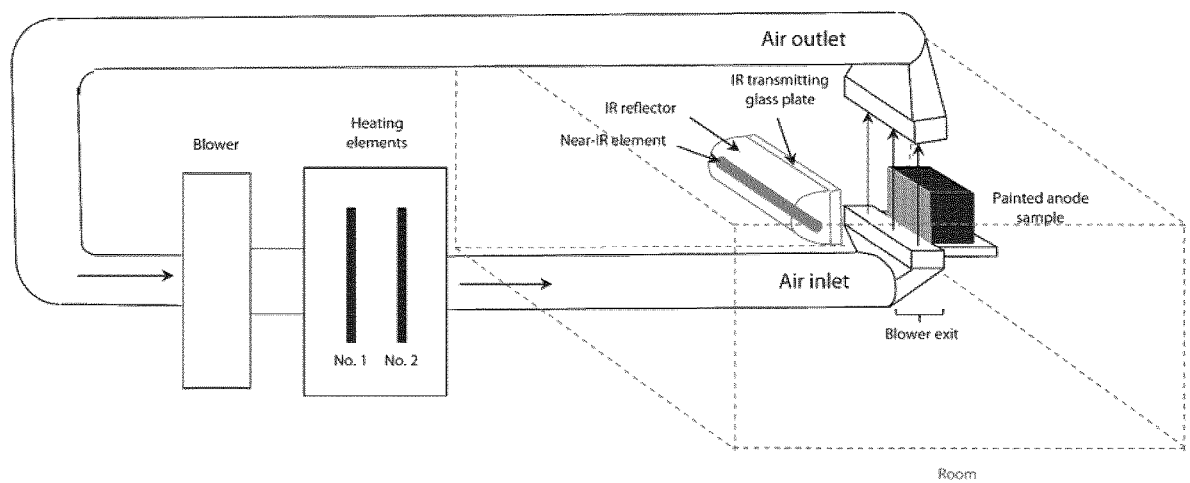
FIG. 30 illustrates a drying set-up used for testing small carbon anode samples under both forced air convection and IR radiation conditions, according to embodiments of the present invention.
Figure 31:
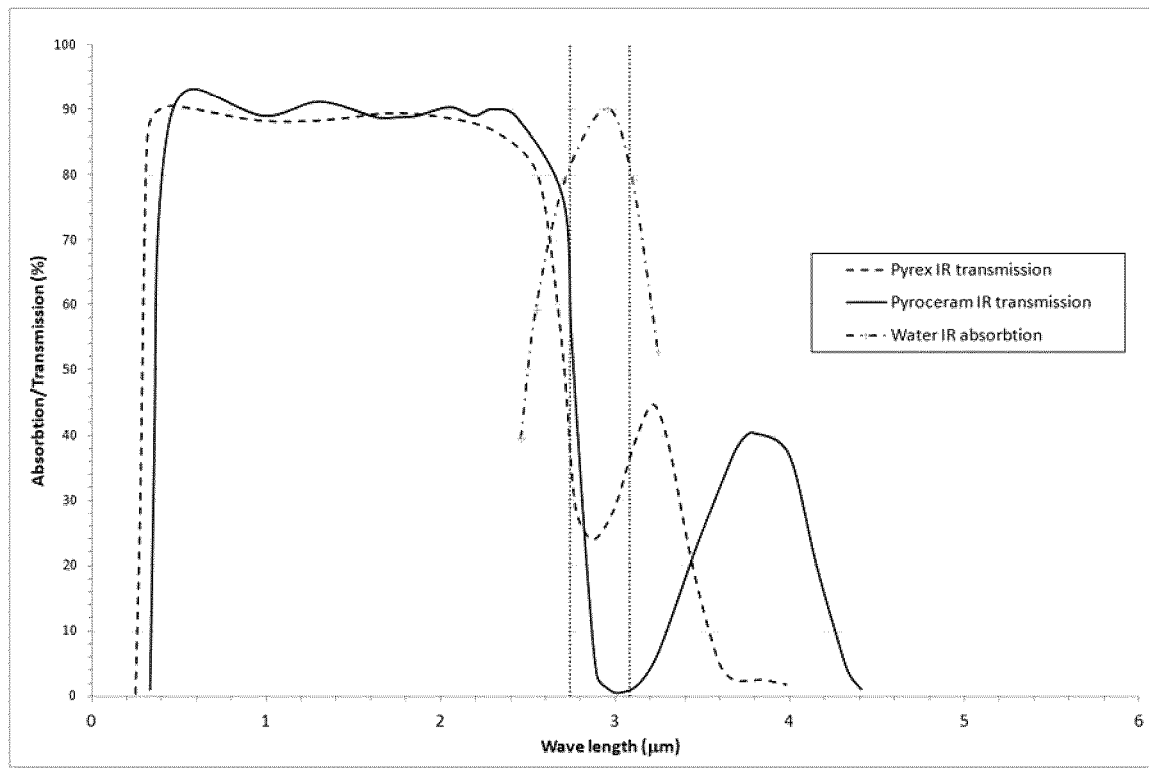
FIG. 31 illustrates a comparison between Pyrex® 7740 and Pyroceram® 9963 transmission of infrared radiation.

As mentioned previously, the encapsulation with Pyrex® glass of the infrared element used in the experimental set-up shown on FIG. 4 allows to increase by a factor of 3.64 the radiative energy absorption of water. This is due to an increase of the infrared element temperature from 407 to 667° C. after encapsulation, which is contributing to reduce the emitted wave length from 4.26 to 3.08 microns, respectively (sec FIG. 8). With the use of the set-up shown on FIG. 30, it was possible to reach with Pyrex® encapsulation an average element temperature of 786° C. According to Table 20 and FIG. 31, this allowed to reach a water absorbed energy factor of 6.29. The major difference between the above two set-ups is the position of the air outlet. On FIG. 4, the IR reflector and IR transmitting glass plate are more cooled by the action of the air flux, before it reaches the outlet, than on FIG. 30. The set-up room on FIG. 30 was also much more thermally insulated than that on FIG. 4. One major problem with Pyrex® plates is their relatively low thermal shock resistance. Several plates were in fact fractured during the cooling period following testing with both set-ups. As shown in Table 21, Pyroceram® 9963 (a glass-ceramic material) has a much higher thermal shock resistance mostly due to its much lower thermal expansion (about 10 times less). According to FIG. 31, this material unlike Pyrex® has a negligible IR transmission at close to 3 microns. However, its transmission between 1.9 to 2.8 microns is much higher. For example, this glass-ceramic material leads to a water absorbed energy ratio of 10.10 when considering an infrared element temperature of 786° C. (sec Table 20).

TABLE 20

Pyrex glass versus Pyroceram glass-ceramic
for IR elements encapsulation

| Condition | T (° C.) | I (mm) | Glass transmission (%) | Water absorbtion (%) | Water absorbed energy factor |
|---|---|---|---|---|---|
| w/o glass encapsulation | 407 | 4.26 | — | 30.00 | 1.00 |
| with Pyrex [1] | 667 | 3.08 | 36.00 | 83.00 | 3.64 |
| with Pyrex [1] | 786 | 2.74 | 39.32 | 81.63 | 6.29 |
| with Pyroceram [2] | 786 | 2.74 | 63.13 | 81.63 | 10.10 |

[1] No. 7740; [2] No. 9963.

TABLE 21

Comparative properties between Pyrex ®
and Pyroceram ® from Corning ®

| Properties | Pyrex 7740 Borosilicate | Pyroceram 9963 Glass-Ceramic |
|---|---|---|
| Density (g/cm³) | 2.23 | 2.56 |
| Thermal expansion (x10⁻⁷° C.⁻¹) | 32.50 | 3.00 |
| Thermal shock resistance (° C.) | | |
| .3 mm thick | about 180° C. | 700 |
| .5 mm thick | about 150° C. | 700 |

Example 10

Drying Process 7

Figure 32:
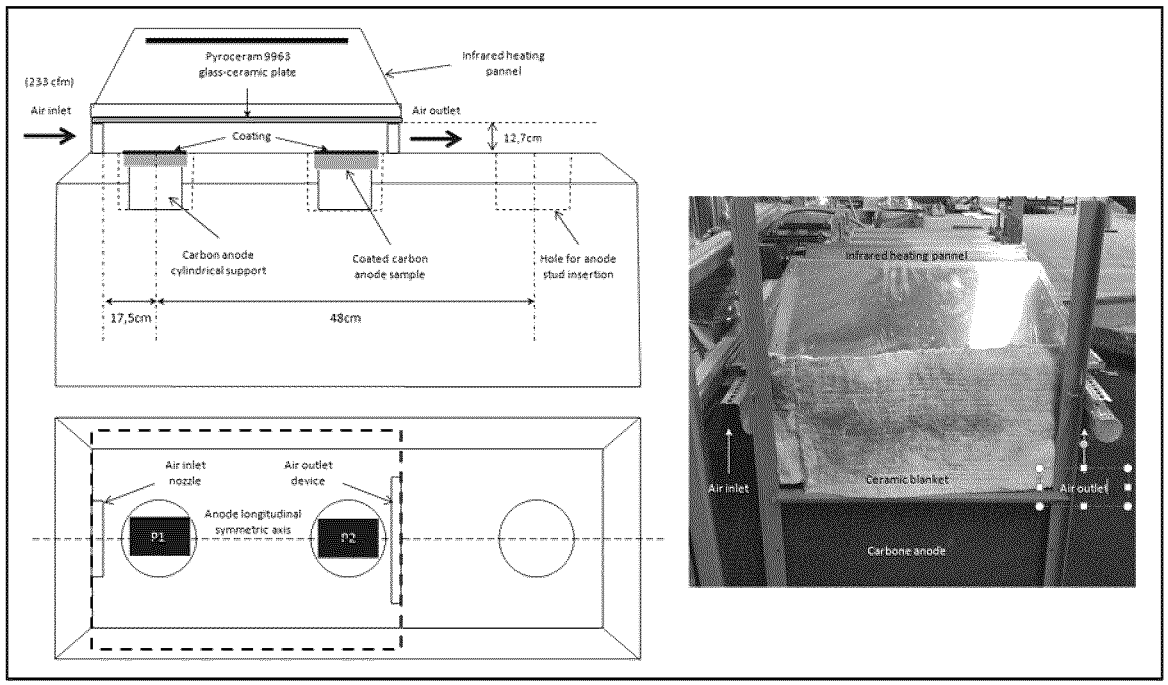
FIG. 32 illustrates a drying set-up used for testing full size carbon anodes under both forced air convection and IR irradiation conditions, according to embodiments of the present invention.

A full size anode (approximately 155×65×64 cm) was tested in the set-up shown on FIG. 32. The latter was using the same blower and heating elements as those used in the previous set-ups. In the actual set-up, hot air was forced to flow from a rectangular nozzle (at the air inlet) between the anode and an IR heating panel encapsulated with a 5 mm thick Pyroceram® (No. 9963) glass-ceramic plate (sec FIGS. 13 and 20). The dimensions of the nozzle were 3.81×25.4 cm (1.5×10 in). In this set-up, the air outlet device having a rectangular opening of 48.26×3.81 cm (19×1.5 in) is connected to the blower air inlet. To be able to study the effect of the distance between the anode coating position and the air inlet, along the anode longitudinal symmetric axis, the following procedure was applied:

1) A cylindrical piece of a carbon anode was first put into each of the two anode stud insertion holes below the IR heating panel. The height of the cylinders was such that one large face of a parallelipedic sample (about 15.6× 10.8×2.5 cm) could become flush to the anode surface after being mounted on top thereof.
2) The blower as well as the heating and IR elements were then started at maximum power. A maximum temperature of 123 to 126° C. was reached after about 15 min.
3) Two samples, about 15.6×10.8×2.5 cm each, after being coated first with the base coat and then with the top coat (on one of their large face) were successively dried in the set-up at positions P1 and P2.

The results are presented in Tables 22A and B and 23. It can be seen that with IR elements temperature of 821 to 823° C., base coat and top coat can be dried after 4.39 and 3.10 minutes, respectively, even at air velocity as low as 3 to 4 m/sec (Position No. 2).

TABLE 22A

Paints application and drying procedures

| Test No. | Position No. | Paint Type | Base-Layer 1 | | Base-Layer 2 | | | | | |
| | | | Application (min) | Soaking (min) | Application (min) | Soaking (min) | Drying (min) | Soaking (min) | 1/R | Waving |
|---|---|---|---|---|---|---|---|---|---|---|
| B-5 | P1 | Base | 0.49 | 3.52 | 0.34 | 1.97 | 4.39 | 1.07 | =0 | NO |
| | | Top | — | — | — | — | — | — | — | — |
| | P2 | Base | 0.42 | 3.43 | 0.34 | 1.58 | 4.39 | 1.26 | =0 | NO |
| | | Top | — | — | — | — | — | — | — | — |

TABLE 22B

Paints application and drying procedures

| Test No. | Position No. | Paint Type | TTop (° C.) | TBase (° C.) | Application (min) | Soaking (min) | Drying (min) | 1/R | Waving | Powdering | Bloating |
|---|---|---|---|---|---|---|---|---|---|---|---|
| B-5 | P1 | Base | — | — | — | — | — | — | — | — | — |
| | | Top | 45.00 | 85.00 | 0.19 | 0.55 | 3.10 | =0 | NO | NO | NO |
| | P2 | Base | — | — | — | — | — | — | — | — | — |
| | | Top | 45.00 | 88.00 | 0.19 | 0.36 | 3.10 | =0 | NO | NO | NO |

TABLE 23

Drying conditions

| Test No. | Position No. | Paint Type | RH air (%) | T air (° C.) | V air (m/s) | T IR element (° C.) | T Glass IN (° C.) | T Glass OUT (° C.) | T substrate (° C.) | T Room (° C.) | T atm (° C.) | RH atm (%) |
|---|---|---|---|---|---|---|---|---|---|---|---|---|
| B-5 | P1 | Base | ND | 123-126 | 6-7 | 821-823 | ND | ND | 111.00 | ND | ND | ND |
| | | Top | ND | 123-126 | 6-7 | 821-823 | ND | ND | 123.00 | ND | ND | ND |
| | P2 | Base | ND | 123-126 | 3-4 | 821-823 | ND | ND | 117.00 | ND | ND | ND |
| | | Top | ND | 123-126 | 3-4 | 821-823 | ND | ND | 144.00 | ND | ND | ND |

Example 11

Drying Process 8

Figure 33:
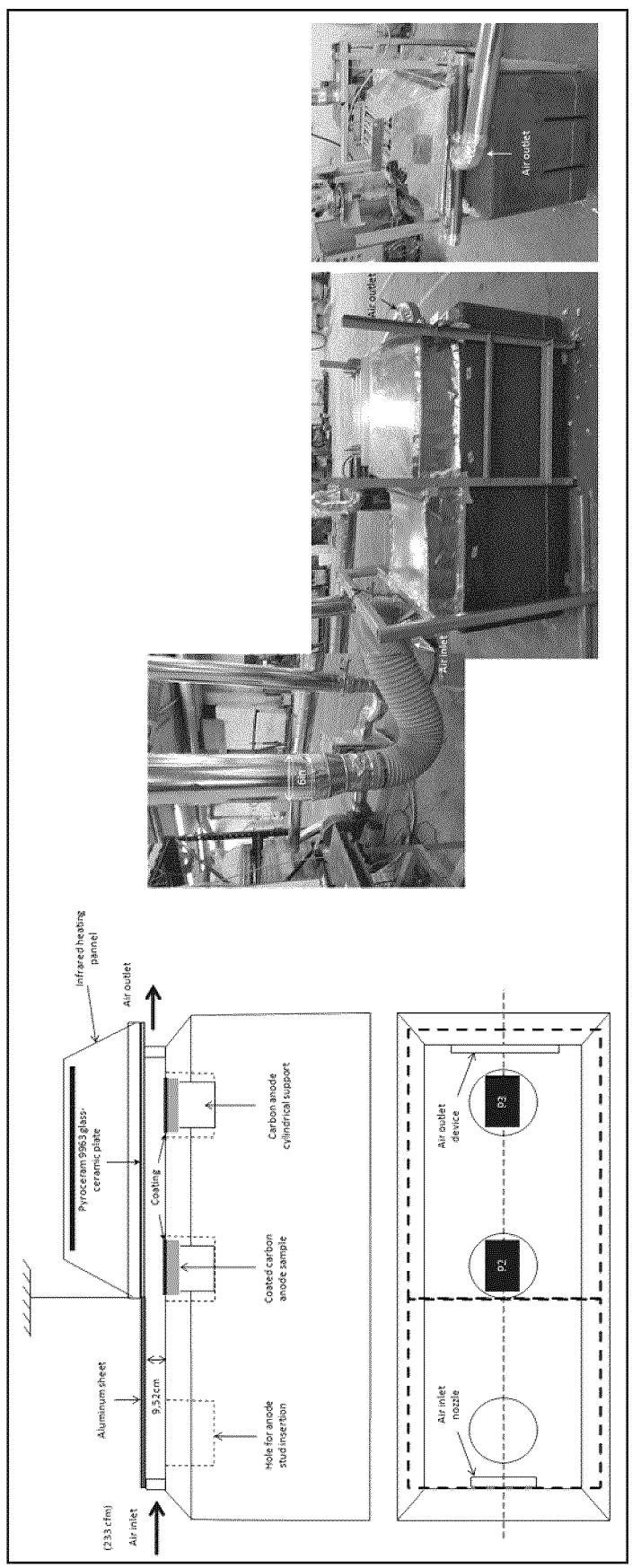
FIG. 33 illustrates a drying set-up used for testing full size carbon anodes under both forced air convection and IR radiation conditions, according to embodiments of the present invention.
Figure 34:
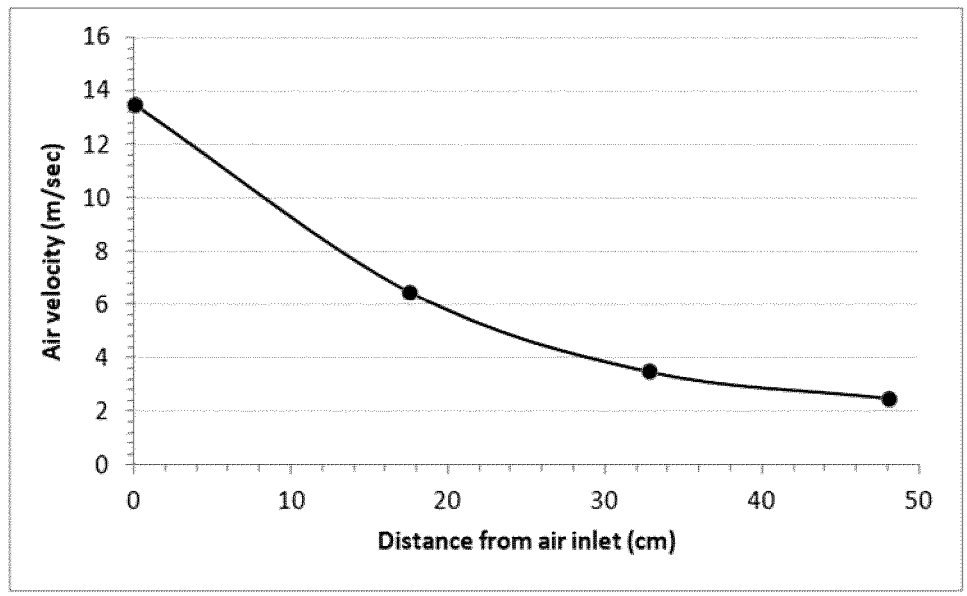
FIG. 34 illustrates the air velocity gradient along the anode longitudinal symmetric axis.

The set-up of FIG. 32 was modified as shown on FIG. 33. This allowed to perform tests at positions P2 and P3 (using same previous procedure) without changing the air inlet position. Two tests were conducted with this modified set-up using coated carbon anode samples with base coat only. The forced air temperature was maintained at 11000 in both cases by controlling the heating elements input power while operating the blower and the IR elements at maximum capacity.

As shown in Tables 24 and 25, 3 minutes drying in these conditions (Test No. 1) were not sufficient for completely removing the water from the sample's coating at both above positions (1/R>0). However, 5 minutes drying in these same conditions (Test No. 2) allowed to totally dry the coating at both positions (1/R=0), even at air velocity as low as 2 to 3 m/sec (Position No. 2). From the results obtained during test No. 7 to 9, the air velocity gradient along the anode longitudinal symmetric axis during both above tests could have been estimated assuming: (1)—a same average distance of 4.38 inches (11.11 cm) between the anode and the IR elements panel encapsulation plate, in both set-up versions and (2)—an air velocity of 13-14 m/sec in both cases although this value was obtained from measurements performed only.

TABLE 24

Paints application and drying procedures

| Test No. | Test No. | Position No. | Paint Type | RH air (%) | T air (° C.) | V air (m/s) | T IR element (° C.) | T Glass IN (° C.) | T Glass OUT (° C.) | T substrate (° C.) | T Room (° C.) | T atm (° C.) | RH atm (%) |
|---|---|---|---|---|---|---|---|---|---|---|---|---|---|
| B-6 | 1 | P2 | Base | ND | 110.00 | 3-4 | 808-809 | ND | ND | 75-90 | ND | ND | ND |
| | | P3 | Base | ND | 110.00 | 2-3 | 808-809 | ND | ND | 69-88 | ND | ND | ND |
| B-7 | 2 | P2 | Base | ND | 110.00 | 3-4 | 785-795 | ND | ND | 68-78 | ND | ND | ND |
| | | P3 | Base | ND | 110.00 | 2-3 | 785-795 | ND | ND | 68-80 | ND | ND | ND |

The invention claimed is:

1. A method of coating a carbon material with a chemical treatment for preventing or reducing air oxidation of said carbon material, said chemical treatment comprising a first layer carbon material; and a second layer, converting said first layer, comprising an aqueous coating composition, the method comprising the step of drying said aqueous priming coating composition covering said external surface exposed to air of said carbon material, to form said first layer thereon, the aqueous priming coating composition comprising a mixture of aluminum oxide ($Al_2O_3$), comprising a combination of aluminum oxide selected from the group consisting of calcined aluminum oxide, reactive aluminum oxide, and white fused aluminum oxide; and water; and the aqueous coating compostions comprising a combination of a sodium salt of carbonate and a potassium salt of carbonate providing an equivalent $Na_2O:K_2O$ molar ration of about 0.4 to about 2.0, and water, said aqueous coating composition having a melting temperature of up to about 600° C.;

the method comprising:
in an environment at a temperature of from about 74° C. to about 124° C., applying to said aqueous priming coating composition forced air at a temperature of from about 80° C. to about 126° C., a velocity of about 2 to about 20 m/s, and a relative humidity of 15% or less, in combination with actinic infrared radiation from a distance from said external surface of about 5 cm to about 15 cm, for a time sufficient to dry said aqueous priming coating composition.

2. The method of claim 1, further comprising a step of drying the aqueous coating composition, the method further comprising:
in an environment at a temperature of from about 108° C. to about 127° C., applying to said aqueous coating composition forced air at a temperature of from about 110° C. to about 275° C., a velocity of about 2 to about 22 m/s, and a relative humidity of 15% or less, in combination with actinic infrared radiation from a distance from said external surface of about 5 cm to about 15 cm, for a time sufficient to dry said aqueous coating composition.

3. A method of coating a carbon material with a chemical treatment for preventing or reducing air oxidation of said carbon material, said chemical treatment comprising a first layer comprising an aqueous priming coating composition covering an external surface exposed to air of said carbon material; and a second layer, covering said first layer, comprising an aqueous coating composition, the aqueous priming coating composition comprising a mixture of aluminum oxide ($Al_2O_3$), comprising a combination of aluminum oxide selected from the group consisting of calcined aluminum oxide, reactive aluminum oxide, and white fused aluminum oxide; and water, the aqueous coating composition comprising a combination of a sodium salt of carbonate and a potassium salt of carbonate providing an equivalent $Na_2O:K_2O$ molar ratio of about 0.4 to about 2.0, and water, said aqueous coating composition having a melting temperature of up to about 600° C.;

the method comprising:
a) applying said aqueous priming coating composition to said external surface exposed to air of said carbon material and in an environment at a temperature of from about 74° C. to about 124° C., applying to said aqueous priming coating composition forced air at a temperature of from about 80° C. to about 126° C., a velocity of about 2 to about 20 m/s, and a relative humidity of 15% or less, in combination with actinic infrared radiation from a distance from said external surface of about 5 cm to about 15 cm, for a time sufficient to dry said aqueous priming coating composition, to form said first layer, b) applying said aqueous coating composition to said first layer having a surface temperature of about 59° C. to about 100° C. and in an environment at a temperature of from about 108° C. to about 127° C., applying to said aqueous coating composition forced air at a temperature of from about 110° C. to about 275° C., a velocity of about 2 to 22 m/s, and a relative humidity of 15% or less, in combination with actinic infrared radiation from a distance from said external surface of about 5 cm to about 15 cm, for a time sufficient to dry said aqueous coating composition and form said second layer, or applying said aqueous coating composition to said first layer having a surface temperature of about 60° C. to about 80° C. and then introduce said carbon material in an environment at a temperature of from about 40° C. to about 60° C. and a relative humidity of 12 to 16% for a time sufficient to dry said aqueous coating composition and form said second layer.

4. The method of claim 1, wherein said relative humidity when drying or applying said aqueous priming coating composition is from about 10.5 to about 13.3%.

5. The method of claim 2, wherein said relative humidity when drying or applying said aqueous coating composition is from about 9.95 to 11.1%.

6. The method of claim 1, wherein said carbon material is a carbon anode, or a prebaked consumable carbon anode.

7. The method of claim 1, wherein said actinic infrared radiation is infrared radiation comprising a wavelength of about 2 μm to about 4 μm, or a combination thereof.

8. The method of claim 1, wherein said distance from said external surface is about 10 cm.

9. The method of claim 3, wherein said first layer comprises one or more application of said aqueous priming coating composition.

10. The method of claim 8, wherein a first aqueous priming coating composition layer is dried at room temperature for about 2 minutes or more.

11. The method of claim 10, wherein a second aqueous priming coating composition layer is dried at room temperature for about 45 second or more.

12. The method of claim 3, wherein in step a) said aqueous coating composition is applied at a temperature of 32° C. to 80° C. onto said first layer.

13. The method of claim 3, wherein in step b) when applying said aqueous coating composition to said first layer, said first layer has a surface temperature of about 74° C. to about 100° C.

14. The method of claim 2, wherein said layer of aqueous coating composition reaches a temperature of about 190° C. to about 210° C. within a first minute of drying, to provide a dried second layer.

15. The method of claim 2, wherein said actinic infrared radiation is provided with a shield configured to prevent cooling of an actinic infrared radiation source by said forced air, to maximize actinic infrared radiation wave energy.

16. The method of claim 15, wherein said shield is made from a glass or a glass material having a thermal expansion of from about $2\times10^{-7}$ °C.$^{-1}$ to about $33\times10^{-7}$ °C.$^{-1}$ and/or having a thermal shock of from about 150° C. to about 700° C., and/or having a density of from about 2 g/cm$^3$ to about 3 g/cm$^3$.

17. The method of claim 3, wherein said relative humidity when drying or applying said aqueous priming coating composition is from about 10.5 to about 13.3%.

18. The method of claim 3, wherein said relative humidity when drying or applying said aqueous coating composition is from about 9.95 to 11.1%.

19. The method of claim 3, wherein said carbon material is a carbon anode, or a prebaked consumable carbon anode.

20. The method of claim 3, wherein said actinic infrared radiation is infrared radiation comprising a wavelength of about 2 μm to about 4 μm, or a combination thereof.

21. The method of claim 3, wherein said distance from said external surface is about 10 cm.

\* \* \* \* \*